United States Patent [19]

Kaufman et al.

[11] Patent Number: 5,038,374
[45] Date of Patent: Aug. 6, 1991

[54] DATA TRANSMISSION AND STORAGE

[75] Inventors: Malcolm E. A. Kaufman, Los Angeles, Calif.; Gerald P. Selden, Blairstown, N.J.; Roger Booth, Chester, N.J.; James C. Wickstead, Mendham, N.J.; Peter D. Ellis, Needham, Mass.

[73] Assignee: Dynamic Broadcasting Network, Inc., Santa Monica, Calif.

[21] Appl. No.: 462,403

[22] Filed: Jan. 8, 1990

[51] Int. Cl.⁵ ............................................ H04M 11/00
[52] U.S. Cl. ...................................... 379/98; 379/104
[58] Field of Search ..................... 379/94, 96, 97, 98, 379/102, 104

[56] References Cited

U.S. PATENT DOCUMENTS 4,253,157  2/1981  Kirschner et al. ................ 379/100
4,814,972  3/1989  Winter et al. ......................... 379/96

OTHER PUBLICATIONS

Telecommunications, vol. 23, No. 3, Mar. 89 p. 30, Philips.
Mullard Research Laboratories Report by G. T. Sharpless et al., Jun. 1977, pp. 19.6-47-19.6-50.

Primary Examiner—Jin F. Ng
Assistant Examiner—Ahmad F. Matar
Attorney, Agent, or Firm—Christie, Parker & Hale

[57] ABSTRACT

A sequence of data groups are modulated at a central location and coupled to a telephone line in response to a call-up signal. The sequence is transmitted through the telephone lines to a remote computer. The computer receives the signals, demodulates them, and couples them to a moemory. The data is stored at a particular address, and in coupling the data to the memory, the computer checks a flag at that address to determine whether the data has already been written over. When the flags indicate that the data received corresponds to data already written over, it signals the end of a transmission. The data stored in the memory can be accessed by an operator using input controls.

11 Claims, 2 Drawing Sheets

DATA TRANSMISSION AND STORAGE

FIELD OF THE INVENTION

The present invention relates to the field of data transmission and storage and, in particular, to transmitting and receiving data over telephone lines asynchronously and then storing it for later retrieval and display.

BACKGROUND OF THE INVENTION

A variety of data transmission and storage schemes using telephone systems are available. These schemes normally require that the data transfer be done synchronously, i.e., that a known signal begins at a known location in a data stream and transmits through to a known end. Synchronicity is typically insured using a two-way handshake protocol. At the receiver, some hardware is dedicated to demodulating the received data and converting it to a binary signal, while other hardware is dedicated to the tasks of conducting the handshake and of assembling, sorting, and storing the data. These functions are all duplicated at the transmitter as well. The conventional transmission and storage schemes require expensive complex equipment at both the transmitting and receiving ends, together with two-way communication capability.

The expense and complexity of equipment required for existing schemes make it difficult to produce a portable information display which can be easily updated over the telephone, yet is still compact enough to be tucked in a pocket or purse.

SUMMARY OF THE INVENTION

The present invention allows a remote and preferably portable device to receive data over the phone line asynchronously and store it in memory for later recall. It provides for a small portable inexpensive device for displaying sorted stored data which can easily be updated by dialing a telephone number.

In one embodiment, the invention is a method for accessing data by the following steps. A data base arranged in date groups specifying addresses in the memory of the remote device is stored in binary form at a central location. One or more telephone lines are connected to the central location. The data base is modulated and coupled in a prescribed sequence of data groups to one of the telephone lines in response to a call-up signal. A call-up signal is sent to one of the telephone lines from a telephone terminal at a remote location. At the remote location, there is a computer with a memory for storing a data base in data groups at the addresses specified by the data at the central location. Each data group of the memory has a flag bit that is alternately in a set or reset state. The computer also has a screen for selectively displaying the stored data base. A plurality of input controls and a microprocessor coupled to the telephone terminal and programmed to retrieve selected data (selected by operating the input controls) from the memory and display such data on the screen.

When the call-up signal is sent to the central location by the telephone terminal, the flag bit of all of the data groups is set. When the telephone line is called up, the data base transmitted from the central location is received at the telephone terminal, the data base is demodulated, and then coupled from the telephone terminal to the memory of the computer to update the data base stored in the memory. This is done by storing the data group, at the specified address one data group at a time, and resetting the flag bit at that address. After all the flag bits have been reset, the end of transmission is signaled and finally the input controls are operated to access the data stored in the memory of the computer.

Preferably, the step of coupling the data base to the memory of the computer includes checking the flag bit at the specified address of each data group and overwriting the data stored at the specified address with the demodulated group only if the flag bit is set at the time of checking. Preferably, the step of coupling the data base also includes initiating the signaling step if the flag bit is reset at the time of checking.

In another embodiment, the invention is a method composed of the following steps. A data base is stored in binary form at a central location. One or more telephone lines are connected to the central location. The data base is modulated and coupled to one of the telephone lines in response to a call-up signal. A call-up signal is sent to one of the telephone lines from a telephone terminal. The telephone terminal is at a remote location and has a handset. There is also a computer resident at the remote location with a memory for storing the data base, a screen for displaying the data base, input controls, a microprocessor, and an acoustic coupler. The acoustic coupler is placed close to the speaker of the handset to receive the data base transmitted from the central location when the telephone line is called up. The acoustic coupler is connected through an amplifier to the microprocessor, and the microprocessor is programmed to store the received data base in the memory. The input controls are operated to access the data stored in the memory. The microprocessor is programmed to retrieve data from the memory and display it on the screen in response to operation of the input controls.

DETAILED DESCRIPTION OF THE INVENTION

Figure 1:
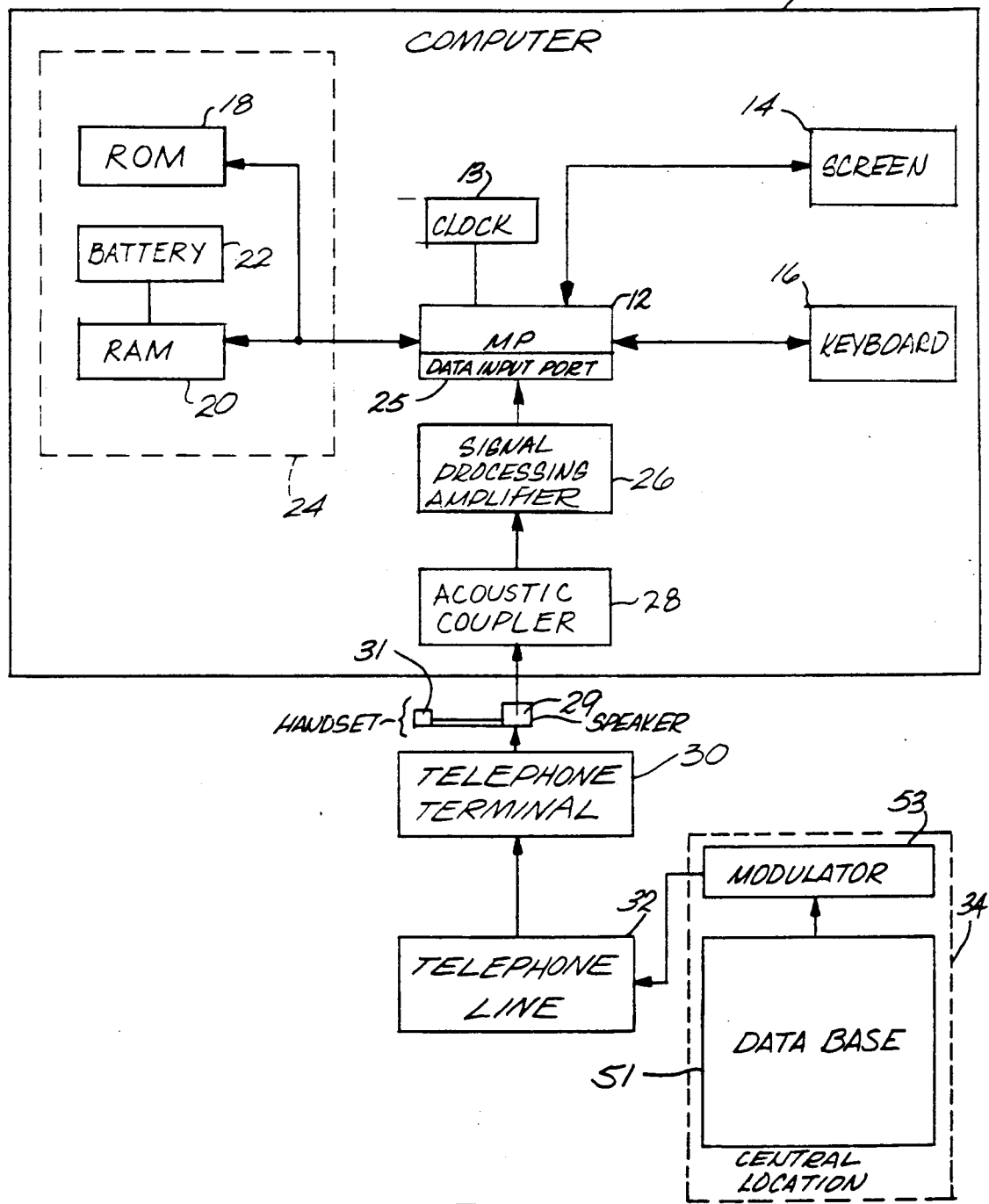
FIG. 1 is a block diagram showing a preferred apparatus for embodying the present invention.

FIG. 1 shows in block diagram form an apparatus for practicing the present invention. A handheld computer 10 is driven by a microprocessor 12 which has an internal clock 13. The microprocessor drives a screen 14 and receives commands through a keyboard 16. A NEC 7008 microprocessor is presently preferred for this embodiment. The programming instructions for the microprocessor are provided by a read only memory (ROM) 18. Data for manipulation by the microprocessor and display on the screen 14 are stored in a random access memory (RAM) 20. The RAM is normally powered by the computer's main power supply. However, when the power supply is shut off, the RAM data is maintained by a battery 22. The ROM, RAM and battery are provided on a removable replaceable cartridge 24. This allows the microprocessor 12 instructions in the ROM 18 and the data stored in the RAM 20 to be replaced by replacing the cartridge.

The microprocessor also has a data input port 25 to receive signals from a signal processing amplifier 26 which processes signals sent to it from an acoustic coupler 28. The acoustic coupler is typically an electret condenser microphone which is placed over the speaker 29 of a handset 31 of a conventional telephone terminal 30. The telephone terminal 30 receives information sent over a telephone line 32 from a central location 34. The central location 34 contains a data base 51 and hardware, including a modulator 53, which allows it to transmit information from the data base into the telephone line to the telephone terminal 30.

An example series of steps to be performed by the apparatus of FIG. 1 is set forth in the flow diagrams of Appendices 1 and 2. Further details are supplied by the source code listing of Appendix 3. The source code is suitable for use with a NEC 7008 microprocessor. Appendix 1 is a flow diagram for updating the data stored in the RAM 20 by transmitting data from the central location 34 over the telephone line 32 to the telephone terminal 30 where it is detected by the acoustic coupler 28, processed by the amplifier 26, converted to a binary bit sequence by the microprocessor 12, and then stored in the RAM 20. Appendix 2 is a flow chart showing a sequence of steps for selectively displaying the stored data on the screen 14 through operating the input controls on the keyboard 16. In the example of Appendices 1 and 2, the stored data is baseball player and team statistics. The Appendices require only a few input controls or keys on the keyboard. These keys are labeled softkey 1, softkey 2, and softkey 3 for selecting menu items, arrow key up, arrow key down, arrow key left, and arrow key right for moving a cursor on the screen, and a previous key for displaying a previous screen.

In the presently preferred embodiment, the computer 10 is updated when data is transmitted from the central location 34. The data is transmitted in the form of sine waves. Sine waves are preferred because they are best suited to telephone line transmission, however, any other waveform or signal format may be used. The central location contains a data base of the data which is to be transferred to the computer at its remote location. At the central location the data is drawn from the data base, modulated and then coupled to the phone lines. It is presently preferred to use 1200 hertz for a binary data 0, 1800 hertz for a binary data 1, and 2400 hertz for the start of a data packet. Sine waves at these frequencies are well suited to transmission over conventional telephone lines 32.

The sine waves of tones sent through the telephone line can be generated from a binary data base in response to each telephone call or they can be generated continuously and played simultaneously to any and all callers. The tone can also be generated once and then stored on an audio tape so that the audio tape is played into the telephone line when a call is connected. The tones on the audio tape are rerecorded when there is a change in the binary data.

The modulated signal is sent through the telephone line to the terminal where it is filtered, amplified, and converted to a stable square-wave function. This provides signal edges for the microprocessor to detect. The acoustic coupler 28 is preferably an isolated electret microphone which is placed over the earpiece or speaker of the telephone terminal handset. The unamplified sine wave is received from the handset speaker, and transmitted to the signal processing amplifier. It is then fed to an automatic gain control circuit for further filtering and amplification. The automatic gain control circuit provides a more steady signal over varying input amplitudes. The output of this is fed to a 30 to 1 gain stage to provide sharp clipped edges of the sine waves. Finally the amplified semisquare wave is fed through a capacitor and a bias set divider set into a Schmitt trigger. The output of the Schmitt trigger is a virtual square wave determined by the input bias set point. This virtual square wave is the output of the signal processing amplifier and fed to the microprocessor 12 through a standard buffer circuit where it is interpreted by the software. The circuitry described above can be implemented using techniques well known in the art. As described above, this circuitry receives and demodulates the data received over the telephone line, shaping the data base for processing along the lines outlined in Appendix 1. In general, amplifier 26 converts the signal transmitted over telephone line 32 to a form compatible with the input to microprocessor 12.

The updating process begins by setting a software control error flag associated with each data packet stored in the RAM 20. The data from the central location is received and stored in groups or blocks which shall be referred to as packets. In the example of Appendix 1, these packets correspond to the statistics for one baseball player i.e., each packet is a file for one particular player. In Appendix 1, each packet is called a player database. A software error flag is set in the RAM 20 for each player before any data is received from the central location. If any error flags are not reset during an updating cycle, the microprocessor can detect this and indicate to the user when the data is displayed that the corresponding player databases are not updated.

It is presently preferred that the system download information from a 900 prefix telephone service although any other telephone service may be used. Each downloading process will be two to three minutes in length and will preferably use an endless loop tape or other continuously cycling data storage device. The 900 service will open the phone line to this tape as soon as the call up signal is received. Therefore, the computer 10 must be able to start receiving data in the middle of a transmission at any point on the tape. In addition, there is no synchronization protocol or clock synchronizing protocol. The transmission is asynchronous. Assuming that the data stream is continuous, the end of a transmission cycle occurs when data has been written to one player data base twice. This is determined by examining the error flags in the RAM 20. A player is only written over when the error flag is set, indicating that the player has not yet been updated. The error flags can also be used to determine whether each player database has been updated and display this fact on the screen.

As mentioned above, data is frequency keyed using frequencies of 1200, 1800, and 2400 hertz. The data is formatted into a series of packets. Each packet begins with a 2400 hertz start signal. This is followed by a two-byte header. The header serves as an address to the RAM 20 in the computer and also contains the error flag in the reset state. Following the header is the player data to be stored in the RAM and finally an error detection code. Each data byte contains a start bit which is always zero, eight data bits and a stop bit which is always one, so that each new byte begins with a transition from one to zero. The error detection bits are used to determine whether the data has been accurately transmitted. Any simple error detection scheme could be used including parity and summing. The error detection bits are not stored in RAM 20. An error detection and correction sequence could be included as a part of the microprocessing functions, however, for simple and small databases it is less expensive to simply retransmit the data base from the central location when the transmission contains a large number of errors.

As diagrammed in Appendix 1, after the error flag is put in the set state for each current player data base, the microprocessor tests the previous key. If this is depressed, then the update sequence is exited. If it is not depressed, then the "checksum" or error detection register is cleared, the cycle counter and count registers are cleared, the "B pointer" or address register is zeroed and the bit counter is set to "start." The microprocessor then begins testing data received from the signal processing amplifier.

Figure 2:
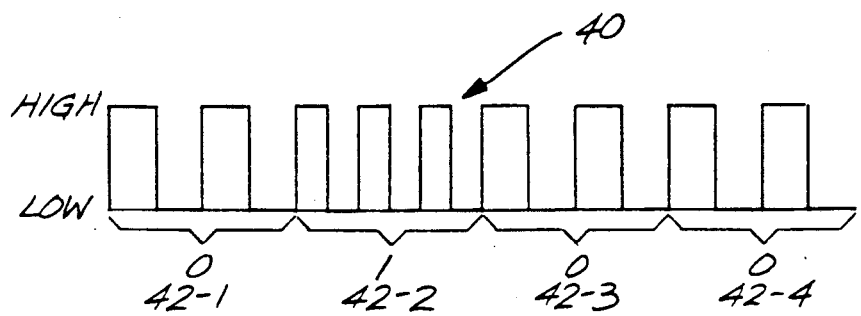
FIG. 2 is a graph showing typical waveforms for frequency shift keying according to the present invention.

FIG. 2 shows a graph of a portion of a typical frequency keyed microprocessor input signal as received from the signal processing amplifier 26. The square wave 40 is either a low or high state which can easily be recognized by the microprocessor. In Appendix 1, the low state is called "modem input=0" and the high state is called "modem input=1." The input level as a zero or one is tested at each microprocessor clock cycle. It is presently preferred that the microprocessor run at color burst clock speed or 3.5796 Megahertz. The "counts" register records the number of clock cycles between each transition. Since the clock cycles much faster than the high frequency 2400 hertz several counts are accumulated between each transition. After each transition the value of the "count" register is compared to the threshold values to determine the frequency of the received signal. If the count register is in a low range, then the "value" is a zero if it is in an intermediate range, then the "value" is a one, and if it is in a high range then the signal is a start signal, for a new packet of data.

As can be seen in FIG. 2, there are four half cycles for each low frequency or binary zero, 42-1; 42-2; 42-4, and six half cycles for each higher frequency binary one, 42-2. The microprocessor accordingly makes four or six time measurements before determining the valve of each binary bit. This helps eliminate errors, however, the data transmission speed can be increased by transmitting only four half cycles for each bit. The higher frequency binary one would then require less time to transmit than the lower frequency binary zero because its period is shorter.

When the microprocessor first begins receiving data over the telephone line, it waits until a high frequency 2400 hertz start signal is detected. Upon detecting the next following start bit at 1200 hertz, the microprocessor converts the rest of the data stream into a binary bit stream. After a packet has been transmitted and the error detection bits have been received, the processor tests the header to determine whether a positive address for the data packet has been received and then tests the error detection code against the data to determine if the data received is accurate. The header is used as an address to the RAM 20 where the error flag is retrieved. If the error flag at that address is set, then the new data is copied from a buffer into the player database at that address including the reset error flag. If the address is invalid, an error is detected, or the error flag is reset, then the player data base is not overwritten. These checks are the process subroutine of Appendix 1.

A reset error flag indicates that the corresponding player database has already been updated during the data transmission cycle. The reset error flag signals the end of a transmission cycle and prompts the microprocessor to indicate this to the user through the screen. The user then disconnects the acoustic coupler 28 and hangs up the telephone handset.

In the presently preferred embodiment, the process subroutine is executed during the start signal for the next data packet. The process subroutine can be performed while the start signal is being transmitted so that the microprocessor is ready to decode the next data packet before the start signal ends.

Figure 3:
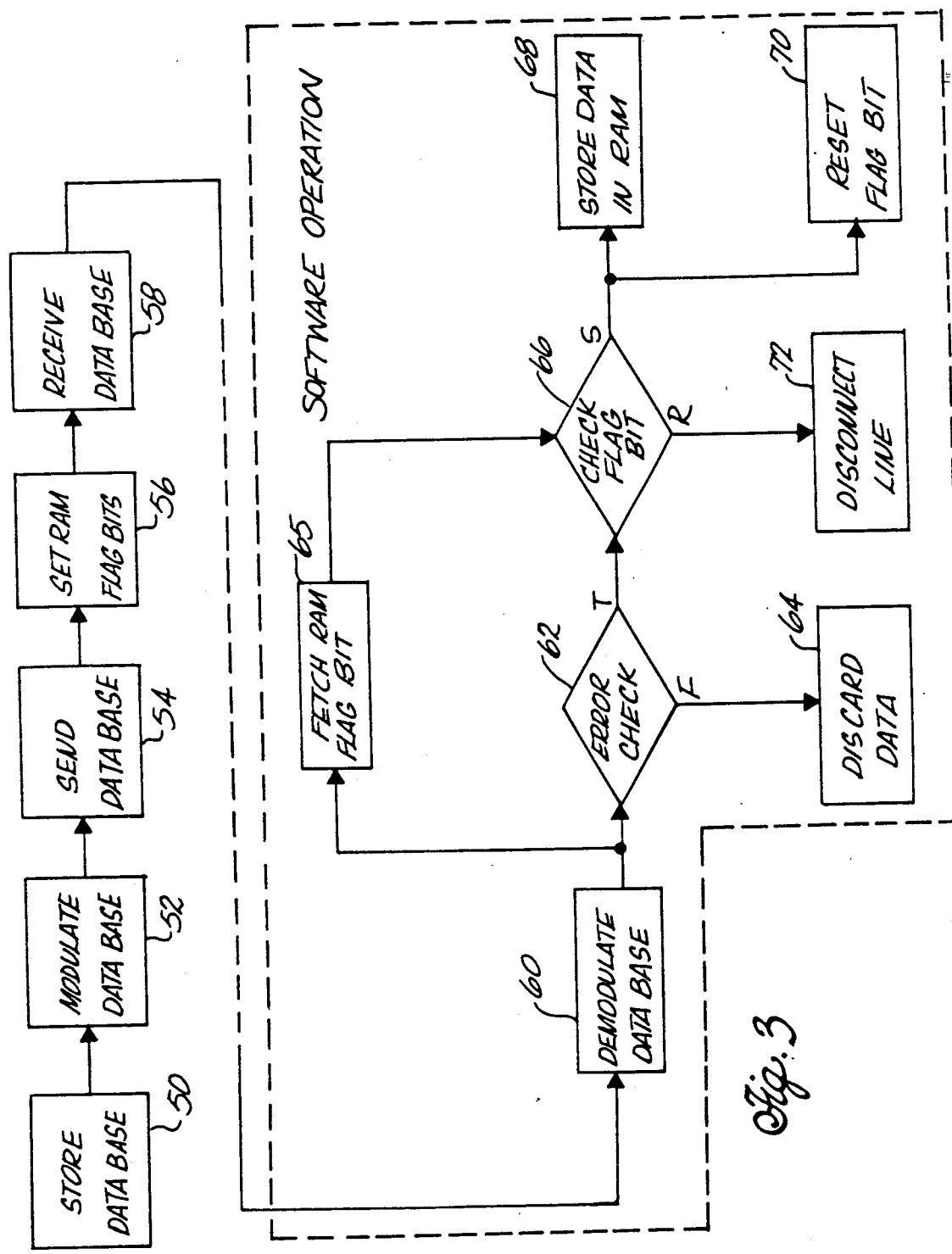
FIG. 3 is a block diagram illustrating the method for transmitting a data base from a central location over a phone line to a portable handheld computer.

In summary, a data base is transferred from central location 34 to RAM 20 by means of the following procedure which is illustrated in FIG. 3 in the preferred sequence. As depicted by a block 50, data base 51 is stored at central location 34 as the data base to be transmitted. As depicted by a block 52, data base 51 is modulated at central location 34 by modulator 53 when the user of computer 10 sends a call-up signal to central location 34. As depicted by a block 54, the modulated data base is sent over telephone line 32 to telephone terminal 30 and, as depicted in block 56, the flag bits at the memory locations of RAM 20 where the data base is to be stored are all set. As depicted by a block 58, the data base is received, data packet after data packet, at telephone terminal 30 and, as depicted by a block 60, it is demodulated by microprocessor 12. As depicted by a block 62, the error detection bits of each data packet are checked. If the error check is false (F), as depicted by a block 64, the data packet is discarded. As depicted by a block 65, the flag bit at the address in RAM 20 specified by the data packet is fetched, and as depicted by a block 66, the fetched flag bit is checked if the error check is true (T). As depicted by a block 68, if the checked flag bit is in a set state, the data packet is stored in RAM 20 at the specified address and, as depicted by a block 70, the flag bit at the specified address is reset. As depicted by a block 72, telephone line 32 is disconnected if the checked flag bit is already in a reset state, because this condition only obtains when all the data packets have already been received at telephone terminal 30. Blocks 60 to 72 represent software operations performed under the control of microprocessor 12.

It is presently preferred that the computer be used as a compact portable information display device. One application of the portable display device is as an information source at a baseball game, this is the application contemplated by Appendices 1 and 2. The entire device can be built into a foldable package no larger than a small stack of 5×8 cards. This can easily be slipped into a pocket or purse and brought to the grandstands at a baseball stadium. When the device is unfolded, the user has access to a variety of up-to-date and important statistics for all of the current season's players and teams in the major league. The arrow and soft keys allow the operator to interact with menus displayed on the screen to select precisely the statistics which he wants to view. Using only the previous, cursor direction and soft keys mentioned above, together with menu driven software like that diagrammed in Appendix 2, the operator can quickly and easily access a large variety of statistics. The computer can also include trivia questions answered by manipulating the keys.

The computer can also be adapted for different kinds of information. It can be used for football, basketball, or racing statistics, as well as updatable price information from wholesale or retail catalogs, corporate telephone books, or flight and scheduling information. By interchanging the removable battery-powered cartridge 24, a single computer can be used for a variety of applications. Since the program instructions are primarily stored in the ROM 18, replacing the cartridge can completely change the screen menus and information available from the computer.

The central location is preferably a conventional telephone answering device with an endless tale loop, although a wide variety of other devices could be used. Current statistics of the desired variety are periodically compiled, formatted, and stored. To update a computer an operator selects the update function from the menu options on his screen, dials the appropriate telephone number from a telephone terminal, coupled the acoustic coupler to the speaker of the handset of the telephone terminal and waits. The telephone terminal sends a call-up signal to the central location and the central location in response opens, establishes or sets up a telephone connection between the telephone terminal and the endless tape loop or other signal source. The computer then receives the signals from the tape loop, adapts them to be compatible with the input signal format in microprocessor 12, decodes them, and stores them as described above. By using the standard telephone network, a user can call the central location from any conventional telephone.

Only a few embodiments and variations have been disclosed in this description. The inventor intends in no way to abandon any subject matter thereby, nor to limit his invention to the embodiments disclosed. The scope of the invention extends to all subject matter within the scope of the claims as set forth below.

APPENDIX 3

```
; PRESTO SOFTWARE

STACK       EQU   0FFFFH

; DATABASE EQUATES FROM DATA.ASM
; EQUATES INTO DATABASE
;
;AVOCET SYSTEMS Z80 ASSEMBLER -    VERSION 1.03M    SERIAL #00200
;
;SOURCE FILE NAME: DATA.ASM
                                                          PAGE 98
;---- SYMBOL TABLE ----
;
;ALE        0015              ENLEAST   0106
ILEGLENS    EQU    07C6H
INUMPITS    EQU    3C33H
;NLW        0012ALW           0015ENLWEST    0118
IMLLEN      EQU    07CAH
IPD    EQU  2351H
;NLWEST     0106ALWEST        00DF
IALNEWS     EQU    0450H
INLNEWS     EQU    0118H
IPNAM       EQU    48F5H
SDATAB      EQU    0010H
;DASIZ      5425
IALRES      EQU    006DH
INLRES      EQU    0010H
ITEAMNAM    EQU    5316H
;EALWEST    00F4
;IGSTATS    EQU    07CFH
INPD   EQU  07CFH
EDATAB      EQU    5435H
IINITWL     EQU    0792H
INPNAM      EQU    3C35H
;NLE        0012ELEG          00DF
ILEG   EQU  00CAH
INUMNON     EQU    3C31H
;                  NLEAST    00F4

WIDTH 80
; WRITTEN BY ROGER BOOTH
```

```
; WITH ASSISTANCE FROM:
;           GERRY SELDON
;           ROGER RUNNALLS
; COPYRIGHT 1989, JAMES WICKSTEAD DESIGN ASSOCIATES
;
; COMPANY NAME: JAMES WICKSTEAD DESIGN ASSOCIATES
;               185 RIDGEDALE AVE.
;               CEDAR KNOLLS, NJ
;               (201) 267-2007
;

TRUE EQU    1
FALSE       EQU  0

LCD   EQU   TRUE

; LCD TRUE  = EXTERNAL LCD MONITOR INSTALL
; LCD FALSE = DESIGNED LCD DISPLAY ONLY
; CONSTANTS TO DEFINE ORGANIZATION OF DATA
MYNUMPLY    EQU  25    ;NUMBER OF PLAYER ON MY TEAM
MXTM EQU    32    ;MAX. NUMBER OF TEAMS
NUMDIV      EQU  4     ;NUMBER OF DIVISION ALE ALW NLE NLW

;SALE       EQU  0     ;START OF AL EAST
;SALW       EQU  7     ;START OF AL WEST
;SNLE       EQU  14    ;START OF NL EAST
;SNLW       EQU  20    ;START OF BL WEST
;TLEG       EQU  26    ;TOTAL NUMBER OF TEAMS

NLEGS       EQU  NUMDIV    ;4 DIVISIONS

HALFCHAR    EQU  '+'    ;HALF CHARACTER

; DISPLAY CONSTANTS
CR    EQU   0DH
LF    EQU   0AH

IPP   EQU   31H   ;CHARACTER FOR /1 /2 FOR PART INNINGS

CRUP EQU    5EH   ;CURSOR ARROW
CRDWN       EQU  76H   ;"
CRGHT       EQU  7EH   ;"
CRLFT       EQU  7FH   ;"
CRUPDN      EQU  7DH   ;CHARACTER FOR UP/DWN CURSOR

SCRNWID     EQU  26
;
;_____

;******************************************
;******************************************
; HARDWARE DISCRIPTION
;******************************************
;******************************************
;
; IO
;******************************************
; OUTPUT PORT
;******************************************
```

```
DSPDAT      EQU   1        ;DATA OUTPUT TO DISPLAY
LTCH EQU    0
;0 - ROW SELECT 0  (FUNCTION KEY SELECT)
;1 - ROW SELECT 1  (CURSOR KEYS) SEE BUFFER
;2 - OFF/ON MINUS SUPPLY OF MODEM -7 VOLTS?
;3 - OFF/ON POS SUPPLY OF MODEM 6 VOLTS
;4 - LC   LATCH CLOCK ONCE PER ROW
;5 - SC   SHIFT CLOCK ONCE PER DATA BYTE
;6 - MC   FRAME CLOCK   50HZ
;7 - DATA BIT TO START FRAME
LC    EQU   4
SC    EQU   5
SD    EQU   7
MC    EQU   6

; IN MODEM MODE,,, USE LATCH AS FOLLOWS
;0 - ROW SELECT 0  (FUNCTION KEY SELECT)
;1 - ROW SELECT 1  (CURSOR KEYS) SEE BUFFER
;2 - OFF/ON MINUS SUPPLY OF MODEM -7 VOLTS?   SHOULD BE ON
;3 - OFF/ON POS SUPPLY OF MODEM 6 VOLTS       ·SHOULD BE ON
;4 - LC   LATCH CLOCK ONCE PER ROW   USED AS MARK INDICATOR (0)
;5 - SC   SHIFT CLOCK ONCE PER DATA BYTE USED AS SPACE INDICATOR
(0)
;6 - MC   FRAME CLOCK   50HZ       X
;7 - DATA BIT TO START FRAME       X

IF LCD
LCDSETRS    EQU   82H   ;READING BUSY
LCDCLRRS    EQU   02H   ;READ BUSY BIT

;CONTROL
;WRITE =
;D7 0
;D6 0
;D5 1/0 DISPLAY ON/OFF
;D4 1

;D3
;D2
;00 - CURSOR OFF,
;01 - CURSOR ON,
;10 - CURSOR OFF CHARACTER BLANK,
;11 - CURSOR BLANK

;D1 1/0 GRAPHIC MODES/CHARACTER
;D0 1/0 EXTERNAL CGEN/INTERNAL CGEN
 ENDIF

;*******************************
; INPUT PORT
;*******************************
BUFFER      EQU   00
; KEY PAD
; KEYS ARE ACTIVE LOW
;0 - RS0* F1    RS1*  UP
;1 - RS0* F2    RS1*  DOWN
;2 - RS0* F3    RS1*  LEFT
;3 - RS0* F4    RS1*  RIGHT
;4 - DATA IN FROM MODEM.. EDGE TO EDGE FROM MODEM
```

```
;5 - NC
;6 - NC
;7 - NC

ONE     EQU   01H
ZERO    EQU   00H

NUMBITS  EQU  8
MINCYC   EQU  40
MAXCYC   EQU  80
MIDCYC   EQU  60
    ORG 0000H
CODE:
;*************************************
;INITIALIZATION
;*************************************

SUB   A
    DI
    JP    INIT
    ORG   08H
; RESTART 7 OUTCHR
OUTCH:
    JP    OUTCHR
    ORG   10H
CONV:
    ADD   A,L
    JR    NC,NIH
    INC   H
NIH:
    LD    L,A
    RET

;*************************************
; INTERRUPT CODE
;*************************************
    ORG 038H
    DI
    EX    AF,AF'
    EXX
; START OF INTERRUPT...
; GET LINE OF DATA OFFSET
; 20 BYTES..
    LD    A,(ITIME)
    INC   A
    AND   3FH
    LD    (ITIME),A
    JR    NZ,NKEYS   ;NO CHECK ON KEYS

LD    A,(HERTZ)
    INC   A
    LD    (HERTZ),A

LD    A,(LATCH)
    AND   0FEH
    OUT   (LTCH),A
; SELECT FUNCTION KEYS
    IN    A,(BUFFER)
    RLA
    RLA
```

```
        RLA
        RLA
        AND     0F0H
        LD      B,A             ;SAVE THEM IN B

LD      A,(LATCH)
        AND     0FDH
        OUT     (LTCH),A
        IN      A,(BUFFER)
        AND     0FH             ;ONLY LOW 4 BITS..
        OR.     B

LD      B,A
        LD      A,(KEY)
        XOR     B
        JR      Z,NKEYS         ;NO CHANGE ...
        LD      C,A
        LD      A,(KCHNG)
        OR      C
        LD      C,A
        LD      A,(KMASK)
        AND     C
        LD      (KCHNG),A ;WHAT CHANGED.
; KEY CHANGED..... SET FLAG
NCHNG:
        LD      A,B
        LD      (KEY),A         ;NEW KEY VALUE.
NKEYS:
; TOGGLE MCLK
        LD      A,(ITIME)
        RLA                     ;SHIFT LEFT WITH CARRY
        AND     40H
        LD      B,A
        LD      A,(LATCH)
        AND     0BFH
        OR      B               ;TOGGLE MCLK    50HZ
        LD      (LATCH),A
CTN:
        LD      A,(ITIME)
;INTERRUPT TIMER
;COUNTS 0-63
; MULT BY 20 TO GET OFFSET INTO DISPLAY MEMORY
        LD      HL,DSPTBL ;LOOK AT TABLE TO FIND POSITION
        AND     A       ;CLEAR CARRY
        RLA             ;SHIFT LEFT
        RST     CONV
        LD      A,(HL)          ;LOW BYTE
        INC     HL
        LD      H,(HL)          ;HIGH BYTE
        LD      L,A
; HL POINTS TO DISPLAY.
        LD      C,DSPDAT
        LD      B,20
        OTIR

; CHECK IF BOT OF SCREEN?

LD      A,(LATCH)
        LD      B,A     ;SAVE LATCH VALUE
```

```
        LD    A,(ITIME)
        CP    63
        JR    NZ,NSTRT   ;NOT START
        SET   SD,B
NSTRT:
        LD    A,B
        OUT   (LTCH),A
; OK TOGGLE BIT.
        OR    10H

;       SET   LC,A  ;SET LATCH CLOCK HIGH

OUT   (LTCH),A
        AND   04FH        ;SET LATCH CLOCK LOW

;       LD    A,(LATCH)

OUT   (LTCH),A

EXX

EX    AF,AF'

EI

RETI

ORG 0100H
BITPAIR:
        DB    01H,02H,04H,08H,10H,20H,40H,80H
;*****************************************
;*****************************************
; DISPLAY TABLE OFFSET FOR EACH LINE ADDRESS
; USED TO SPEED UP INTERRUPT ROUTINE
;*****************************************
;*****************************************
DSPTBL:
        DW    DSPADD
        DW    DSPADD+(20*01)
        DW    DSPADD+(20*02)
        DW    DSPADD+(20*03)
        DW    DSPADD+(20*04)
        DW    DSPADD+(20*05)
        DW    DSPADD+(20*06)
        DW    DSPADD+(20*07)
        DW    DSPADD+(20*08)
        DW    DSPADD+(20*09)
        DW    DSPADD+(20*10)
        DW    DSPADD+(20*11)
        DW    DSPADD+(20*12)
        DW    DSPADD+(20*13)
        DW    DSPADD+(20*14)
        DW    DSPADD+(20*15)
        DW    DSPADD+(20*16)
        DW    DSPADD+(20*17)
        DW    DSPADD+(20*18)
        DW    DSPADD+(20*19)
        DW    DSPADD+(20*20)
        DW    DSPADD+(20*21)
```

```
        DW      DSPADD+(20*22)
        DW      DSPADD+(20*23)
        DW      DSPADD+(20*24)
        DW      DSPADD+(20*25)
        DW      DSPADD+(20*26)
        DW      DSPADD+(20*27)
        DW      DSPADD+(20*28)
        DW      DSPADD+(20*29)
        DW      DSPADD+(20*30)
        DW      DSPADD+(20*31)
        DW      DSPADD+(20*32)
        DW      DSPADD+(20*33)
        DW      DSPADD+(20*34)
        DW      DSPADD+(20*35)
        DW      DSPADD+(20*36)
        DW      DSPADD+(20*37)
        DW      DSPADD+(20*38)
        DW      DSPADD+(20*39)
        DW      DSPADD+(20*40)
        DW      DSPADD+(20*41)
        DW      DSPADD+(20*42)
        DW      DSPADD+(20*43)
        DW      DSPADD+(20*44)
        DW      DSPADD+(20*45)
        DW      DSPADD+(20*46)
        DW      DSPADD+(20*47)
        DW      DSPADD+(20*48)
        DW      DSPADD+(20*49)
        DW      DSPADD+(20*50)
        DW      DSPADD+(20*51)
        DW      DSPADD+(20*52)
        DW      DSPADD+(20*53)
        DW      DSPADD+(20*54)
        DW      DSPADD+(20*55)
        DW      DSPADD+(20*56)
        DW      DSPADD+(20*57)
        DW      DSPADD+(20*58)
        DW      DSPADD+(20*59)
        DW      DSPADD+(20*60)
        DW      DSPADD+(20*61)
        DW      DSPADD+(20*62)
        DW      DSPADD+(20*63)

CHARGEN:
        DB      000H,000H,000H,000H,000H,000H,000H,000H ; 0
        DB      07EH,081H,0A5H,081H,0BDH,099H,081H,07EH ; 1
        DB      07EH,0FFH,0DBH,0FFH,0C3H,0E7H,0FFH,07EH ; 2
        DB      036H,07FH,07FH,07FH,03EH,01CH,008H,000H ; 3
        DB      008H,01CH,03EH,07FH,03EH,01CH,008H,010H ; 4
        DB      01CH,03EH,01CH,07FH,07FH,03EH,01CH,03EH ; 5
        DB      008H,008H,01CH,03EH,07FH,03EH,01CH,03EH ; 6
        DB      000H,000H,018H,03CH,03CH,018H,000H,000H ; 7
        DB      0FFH,0FFH,0E7H,0C3H,0C3H,0E7H,0FFH,0FFH ; 8
        DB      000H,03CH,066H,042H,042H,066H,03CH,000H ; 9
        DB      0FFH,0C3H,099H,0BDH,0BDH,099H,0C3H,0FFH ; 10
        DB      0F0H,0E0H,0F0H,0BEH,033H,033H,033H,01EH ; 11
        DB      03CH,066H,066H,066H,03CH,018H,07EH,018H ; 12
        DB      0FCH,0CCH,0FCH,00CH,00CH,00EH,00FH,007H ; 13
        DB      0FEH,0C6H,0FEH,0C6H,0C6H,0E6H,067H,003H ; 14
```

```
DB      099H,05AH,03CH,07EH,07EH,03CH,05AH,099H  ; 15
DB      001H,007H,01FH,07FH,01FH,007H,001H,000H  ; 16
DB      040H,070H,07CH,07FH,07CH,070H,040H,000H  ; 17
DB      018H,03CH,07EH,018H,018H,07EH,03CH,018H  ; 18
DB      066H,066H,066H,066H,066H,000H,066H,000H  ; 19
DB      0FEH,0DBH,0DBH,0DEH,0D8H,0D8H,0D8H,000H  ; 20
DB      07CH,0C6H,01CH,036H,036H,01CH,033H,01EH  ; 21
DB      000H,000H,000H,000H,07EH,07EH,07EH,000H  ; 22
DB      018H,03CH,07EH,018H,07EH,03CH,018H,0FFH  ; 23
DB      018H,03CH,07EH,018H,018H,018H,018H,000H  ; 24
DB      018H,018H,018H,018H,07EH,03CH,018H,000H  ; 25
DB      000H,018H,030H,07FH,030H,018H,000H,000H  ; 26
DB      000H,00CH,006H,07FH,006H,00CH,000H,000H  ; 27
DB      000H,000H,003H,003H,003H,07FH,000H,000H  ; 28
DB      000H,024H,066H,0FFH,066H,024H,000H,000H  ; 29
DB      000H,018H,03CH,07EH,0FFH,0FFH,000H,000H  ; 30
DB      000H,0FFH,0FFH,07EH,03CH,018H,000H,000H  ; 31
DB      000H,000H,000H,000H,000H,000H,000H,000H  ; 32
DB      00CH,01EH,01EH,00CH,00CH,000H,00CH,000H  ; 33
DB      036H,036H,036H,000H,000H,000H,000H,000H  ; 34
DB      036H,036H,07FH,036H,07FH,036H,036H,000H  ; 35
DB      00CH,03EH,003H,01EH,030H,01FH,00CH,000H  ; 36
DB      000H,063H,033H,018H,00CH,066H,063H,000H  ; 37
DB      01CH,036H,01CH,06EH,03BH,033H,06EH,000H  ; 38
DB      006H,006H,003H,000H,000H,000H,000H,000H  ; 39
DB      018H,00CH,006H,006H,006H,00CH,018H,000H  ; 40
DB      006H,00CH,018H,018H,018H,00CH,006H,000H  ; 41
DB      000H,066H,03CH,0FFH,03CH,066H,000H,000H  ; 42
DB      000H,00CH,00CH,03FH,00CH,00CH,000H,000H  ; 43
DB      000H,000H,000H,000H,000H,00CH,00CH,006H  ; 44
DB      000H,000H,000H,03FH,000H,000H,000H,000H  ; 45
DB      000H,000H,000H,000H,000H,00CH,00CH,000H  ; 46
DB      060H,030H,018H,00CH,006H,003H,001H,000H  ; 47
DB      03EH,063H,073H,07BH,06FH,067H,03EH,000H  ; 48
DB      00CH,00EH,00CH,00CH,00CH,00CH,03FH,000H  ; 49
DB      01EH,033H,030H,01CH,006H,033H,03FH,000H  ; 50
DB      01EH,033H,030H,01CH,030H,033H,01EH,000H  ; 51
DB      038H,03CH,036H,033H,07FH,030H,078H,000H  ; 52
DB      03FH,003H,01FH,030H,030H,033H,01EH,000H  ; 53
DB      01CH,006H,003H,01FH,033H,033H,01EH,000H  ; 54
DB      03FH,033H,030H,018H,00CH,00CH,00CH,000H  ; 55
DB      01EH,033H,033H,01EH,033H,033H,01EH,000H  ; 56
DB      01EH,033H,033H,03EH,030H,018H,00EH,000H  ; 57
DB      000H,00CH,00CH,000H,000H,00CH,00CH,000H  ; 58
DB      000H,00CH,00CH,000H,000H,00CH,00CH,006H  ; 59
DB      018H,00CH,006H,003H,006H,00CH,018H,000H  ; 60
DB      000H,000H,03FH,000H,000H,03FH,000H,000H  ; 61
DB      006H,00CH,018H,030H,018H,00CH,006H,000H  ; 62
DB      01EH,033H,030H,018H,00CH,000H,00CH,000H  ; 63
DB      03EH,063H,07BH,07BH,07BH,003H,01EH,000H  ; 64
DB      00CH,01EH,033H,033H,03FH,033H,033H,000H  ; 65
DB      03FH,066H,066H,03EH,066H,066H,03FH,000H  ; 66
DB      03CH,066H,003H,003H,003H,066H,03CH,000H  ; 67
DB      01FH,036H,066H,066H,066H,036H,01FH,000H  ; 68
DB      07FH,046H,016H,01EH,016H,046H,07FH,000H  ; 69
DB      07FH,046H,016H,01EH,016H,006H,00FH,000H  ; 70
DB      03CH,066H,003H,003H,073H,066H,07CH,000H  ; 71
DB      033H,033H,033H,03FH,033H,033H,033H,000H  ; 72
DB      01EH,00CH,00CH,00CH,00CH,00CH,01EH,000H  ; 73
```

```
        DB      078H,030H,030H,030H,033H,033H,01EH,000H  ; 74
        DB      067H,066H,036H,01EH,036H,066H,067H,000H  ; 75
        DB      00FH,006H,006H,006H,046H,066H,07FH,000H  ; 76
        DB      063H,077H,07FH,07FH,06BH,063H,063H,000H  ; 77
        DB      063H,067H,06FH,07BH,073H,063H,063H,000H  ; 78
        DB      01CH,036H,063H,063H,063H,036H,01CH,000H  ; 79
        DB      03FH,066H,066H,03EH,006H,006H,00FH,000H  ; 80
        DB      01EH,033H,033H,033H,03BH,01EH,038H,000H  ; 81
        DB      03FH,066H,066H,03EH,036H,066H,067H,000H  ; 82
        DB      01EH,033H,007H,00EH,038H,033H,01EH,000H  ; 83
        DB      03FH,02DH,00CH,00CH,00CH,00CH,01EH,000H  ; 84
        DB      033H,033H,033H,033H,033H,033H,03FH,000H  ; 85
        DB      033H,033H,033H,033H,033H,01EH,00CH,000H  ; 86
        DB      063H,063H,063H,063H,07FH,077H,063H,000H  ; 87
        DB      063H,063H,036H,01CH,01CH,036H,063H,000H  ; 88
        DB      033H,033H,033H,01EH,00CH,00CH,01EH,000H  ; 89
        DB      07FH,063H,031H,018H,04CH,066H,07FH,000H  ; 90
        DB      01EH,006H,006H,006H,006H,006H,01EH,000H  ; 91
        DB      003H,006H,00CH,018H,030H,060H,040H,000H  ; 92
        DB      01EH,018H,018H,018H,018H,018H,01EH,000H  ; 93
        DB      008H,01CH,036H,063H,000H,000H,000H,000H  ; 94
        DB      000H,000H,000H,000H,000H,000H,000H,0FFH  ; 95
        DB      00CH,00CH,018H,000H,000H,000H,000H,000H  ; 96
        DB      000H,000H,01EH,030H,03EH,033H,06EH,000H  ; 97
        DB      007H,006H,006H,03EH,066H,066H,03BH,000H  ; 98
        DB      000H,000H,01EH,033H,003H,033H,01EH,000H  ; 99
        DB      038H,030H,030H,03EH,033H,033H,06EH,000H  ; 100
        DB      000H,000H,01EH,033H,03FH,003H,01EH,000H  ; 101
        DB      01CH,036H,006H,00FH,006H,006H,00FH,000H  ; 102
        DB      000H,000H,06EH,033H,033H,03EH,030H,01FH  ; 103
        DB      007H,006H,036H,06EH,066H,066H,067H,000H  ; 104
        DB      00CH,000H,00EH,00CH,00CH,00CH,01EH,000H  ; 105
        DB      030H,000H,030H,030H,030H,033H,033H,01EH  ; 106
        DB      007H,006H,066H,036H,01EH,036H,067H,000H  ; 107
        DB      00EH,00CH,00CH,00CH,00CH,00CH,01EH,000H  ; 108
        DB      000H,000H,033H,07FH,07FH,06BH,063H,000H  ; 109
        DB      000H,000H,01FH,033H,033H,033H,033H,000H  ; 110
        DB      000H,000H,01EH,033H,033H,033H,01EH,000H  ; 111
        DB      000H,000H,03BH,066H,066H,03EH,006H,00FH  ; 112
        DB      000H,000H,06EH,033H,033H,03EH,030H,078H  ; 113
        DB      000H,000H,03BH,06EH,066H,006H,00FH,000H  ; 114
        DB      000H,000H,03EH,003H,01EH,030H,01FH,000H  ; 115
        DB      008H,00CH,03EH,00CH,00CH,02CH,018H,000H  ; 116
        DB      000H,000H,033H,033H,033H,033H,06EH,000H  ; 117
        DB      000H,000H,033H,033H,033H,01EH,00CH,000H  ; 118
        DB      000H,000H,063H,06BH,07FH,07FH,036H,000H  ; 119
        DB      000H,000H,063H,036H,01CH,036H,063H,000H  ; 120
        DB      000H,000H,033H,033H,033H,03EH,030H,01FH  ; 121
        DB      000H,000H,03FH,019H,00CH,026H,03FH,000H  ; 122
        DB      038H,00CH,00CH,007H,00CH,00CH,038H,000H  ; 123
        DB      018H,018H,018H,000H,018H,018H,018H,000H  ; 124
        DB      007H,00CH,00CH,038H,00CH,00CH,007H,000H  ; 125
        DB      06EH,03BH,000H,000H,000H,000H,000H,000H  ; 126
        DB      000H,008H,01CH,036H,063H,063H,07FH,000H  ; 127
        DB         0,0,0,0,0,0,0,0  ;used for temp storage for 80h and
above
```

```
        PAGE

CITYNAM:
;       (5 BITS)
;RANGE 0-TOTLEG
;ALEAST
TEXTAL:
        DB      'AL',0
TEXTNL:
        DB      'NL',0
TEXTEAST:
        DB      'EAST',0
TEXTWEST:
        DB      'WEST',0

; END OF DATABASE PARAMETERS LOADED INTO RAM...
POSNUM:
; (4 BITS ) RANGE (0-12)
; POSITION NUMBER DEFINITION
;   POSITION
        DB      'P '    ;0 PITCHER
        DB      'C '    ;1 CATCHER
        DB      '1B'    ;2 FIRST BASE
        DB      '2B'    ;3  2 BASE
        DB      '3B'    ;4 3 BASE
        DB      'SS'    ;5 SHORT STOP
        DB      'LF'    ;6 LEFT FIELD
        DB      'CF'    ;7 CENTER FIELD
        DB      'RF'    ;8 RIGHT FIELD
        DB      'DH'    ;9 DESINATED HITTER
        DB      'OF'    ;10 OUT FIELD
        DB      'IF'    ;11 IN FIELD
        DB      '--'    ;SPARE PLAYER
    PAGE

DOWNLOAD:
;       DB      '01234567890123456789'
        DB      'DOWNLOAD COMPLETE'
        DB      0FFH

;*********************************
;*********************************
CLRSCRN:
;*********************************
;*********************************
; SUPER FAST CLEAR SCREEN ROUTINE
        PUSH    HL
        PUSH    DE
        PUSH    BC
        PUSH    AF

LD      A,' '
        LD      (SCREEN),A
```

```
        LD    HL,SCREEN
        LD    DE,SCREEN+1
        LD    BC,SCRNSIZ-1

LDIR

SUB   A
        LD    (DISPLAY),A
        LD    HL,DISPLAY
        LD    DE,DISPLAY+1
        LD    BC,DISIZE-1
        LDIR

IF LCD
        LD    A,10  ;REG 10 CURSOR LOW ADDRESS
        OUT   (LCDSETRS),A
        SUB   A
        OUT   (LCDCLRRS),A

LD    A,11  ;REG 11 CURSOR LOW ADDRESS
        OUT   (LCDSETRS),A
        SUB   A
        OUT   (LCDCLRRS),A

LD    A,12   ;CLEAR SCREEN
        OUT   (LCDSETRS),A

LD    BC,43*16   ;6*8 CHARACTER MATRIX
                         ;256 PIXELS H = 42.6 /LINE
                         ;128 PIXEL V = 16 LINES
DCLRS:
        LD    A,' '
        OUT   (LCDCLRRS),A
        DEC   BC
        LD    A,B
        OR    C
        JR    NZ,DCLRS

ENDIF
        LD    HL,0
        LD    (CURSOR),HL            ;HOME CURSOR
        JP    RESTORE                ;RESTORE REG.

;***************************
;***************************
OUTCHR:
;***************************
;***************************
; THIS ROUTINE PUTS THE CONTAIN OF ACC = ASCII 0-7F
; TO DISPLAY MEMORY @ LOCATION OF CURSOR.
; SEE CURSOR FOR DETAILS ON CURSOR POSITION

; ALL REGISTER ALL SAVED
        PUSH  HL
        PUSH  DE
        PUSH  BC
        PUSH  AF
```

```
; CHECK IF KEY WAS HIT
        LD    A,(KHIT)
        XOR   0FFH        ;SEE IF ANYONE KEY
        JP    NZ,RESTORE  ;ALREADY HIT.

LD    A,(KCHNG)
        AND   A
        JR    Z,NKDET
        LD    B,A
        LD    A,(KEY)
        AND   B
        JP    NZ,NHITS    ;NO KEY  CONTINUE
        LD    A,(KEY)
        XOR   0FFH
        AND   B
CBI:
        RLA
        JR    NC,CBI      ;ONLY ONE KEY HIT

AND   A
        JR    NZ,NHITS

; SAVE THE KEY THAT HIT...

LD    A,(KEY)
        LD    (KHIT),A    ;SAVE WHAT WAS..

JP    RESTORE
NHITS:
        SUB   A
        LD    (KCHNG),A   ;GOING UP DON'T CARE
; KEY WENT UP, DON'T CARE.
NKDET:
        LD    HL,SCREEN
;CURSOR  DS    2      ; WHERE IF LD  BC(CURSOR)
;                     ; B = X CHARACTER POSITION (0-19)
;                     ; C = Y LINE NUMBER 0-7
        LD    BC,(CURSOR)
 IF LCD
; SET CURSOR ADDRESS
        PUSH HL
;
        LD    A,(HN)
        INC   A          ;ADD 1
        LD    E,A
        LD    D,0

PUSH DE          ;SAVE NUMBER

ADD   A,A  ;4 LINES DOWN. MULT BY 4
        ADD   A,A
        LD    L,A
        LD    H,0

LD    A,C
        INC   A

DX:
        ADD   HL,DE
        DEC   A
```

```
        JR      NZ,DX
        AND     A
        POP     DE
        SBC     HL,DE
        EX      DE,HL
        POP     HL

; MULT BY (HN)...
; ADD X
        LD      A,B
        ADD     A,8         ;CENTER DISPLAY    4 LINES BY 8
                            ;CURSORS
        ADD     A,E
        LD      E,A
        JR      NC,NICD
        INC     D
NICD:
        LD      A,10 ;REG 10 CURSOR LOW ADDRESS
        OUT     (LCDSETRS),A
        LD      A,E
        OUT     (LCDCLRRS),A

LD      A,11 ;REG 11 CURSOR LOW ADDRESS
        OUT     (LCDSETRS),A
        LD      A,D
        OUT     (LCDCLRRS),A
;
        LD      A,12 ;REG 12
        OUT     (LCDSETRS),A
; IF REVID = FF THEN ADD 40 H IF LETTER
        LD      A,(REVID)
        LD      D,A
        POP     AF
        PUSH    AF
        BIT     0,D
        JR      Z,NSOT
        CP      'A'
        JR      C,NSOT      ;< 'A'
        ADD     20H
NSOT:
        OUT     (LCDCLRRS),A
;
 ENDIF
        LD      A,C     ;GET X
; GET Y VALUE MULT BY SCRNWID....> 26
        ADD     A,A     ;MULT 2
        LD      D,A     ; D CONTAINS *2
        ADD     A,A     ;*4
        ADD     A,A     ;*8
        LD      E,A     ; E CONTAINS *8
        ADD     A,A     ;*16
        ADD     A,E     ; +8
        ADD     A,D     ; +2  => 26
        RST     CONV
; OK NOW ADD X * 8
        LD      A,B     ;ADD X VALUE
        RST     CONV

POP     AF              ;RESTORE CHARACTER ...
        PUSH    AF              ;SAVE CHARACTER
```

```
        AND  7FH
        LD   (HL),A              ;TURN CHARACTER IN MEMORY
; GET WHICH CHARACTER ADDRESS..
; MULT BY 8 ASCII VALUE
        LD   HL,CHARGEN
        LD   E,A
        LD   D,0
        SLA  E
        RL   D
        SLA  E
        RL   D
        SLA  E
        RL   D
        ADD  HL,DE
; HL POINTS TO CHARACTER IN QUESTION
        LD   (CHARPO),HL         ;SAVE CHARACTER CGEN POSITION
; OK LET'S SET UP TO DRAW FIRST LINE OF CHARACTER
; NEED TO CALULATE POSITION INTO XY VALUE
; FIRST DO Y
; H = X CHARACTER POSITION (0-25)
; L = Y LINE NUMBER 0-7
        LD   HL,(CURSOR)
; H CONTAINS CHARACTER WHERE =26X
; L CONTAINS Y = 8*V
        LD   A,L
        ADD  A,A
        ADD  A,A
        ADD  A,A
        LD   C,A       ;X 8
;
; X = 26*H
;
        LD   A,H
        ADD  A,A      ; SIX TIMES
        LD   B,A
        ADD  A,A
        ADD  A,B
        LD   B,A       ;6 PIXEL/CHARACTER

LD   (XY),BC

LD   DE,(CHARPO)   ;GET CGEN ADDRESS

LD   C,8       ;8 LINES OF DATA
CTOP:
        PUSH HL        ;SAVE XY

LD   A,(REVID) ;REVERSE VIDEO..
        LD   B,A
        LD   A,(DE)
        XOR  B

LD   B,6       ;6 DOTS ACROSS

;       LD   A,(DE)
LOOPB:
        RR   A
        CALL C,PUTDOT
;       CALL NC,CLRDOT
;
```

```
        LD    HL,(XY)         ;MOVE OVER 1
        INC   H
        LD    (XY),HL
;INC X POSITION
        DJNZ  LOOPB

POP   HL    ;RESTORE XY
;       LD    HL,(XY)
        INC   L     ;INC Y
        LD    (XY),HL

INC   DE              ;NEXT CHARACTER LINE

DEC   C
        JR    NZ,CTOP

LD    HL,(CURSOR)
        INC   H     ;INC X
        LD    A,H
        CP    SCRNWID
        JR    C,SLES
        LD    H,0
        INC   L
        LD    A,L
        CP    8
        JR    C,SLES
        LD    L,0
SLES:
        LD    (CURSOR),HL
RESTORE:
; RESTORE ALL REGISTERS
        POP   AF
        POP   BC
        POP   DE
        POP   HL
        RET

;****************************
;****************************
PUTDOT:
;****************************
;****************************
; THIS SUBROUTINE PUTS A DOT @ LOCATION POINTED BY X,Y REG
;
        PUSH  HL
        PUSH  DE
        PUSH  BC
        PUSH  AF
        LD    BC,(XY)
        CALL  BITPO
        LD    A,(DE)
        OR    (HL)
        JR    WRSCRN
;****************************
;****************************
CLRDOT:
;****************************
;****************************
        PUSH  HL
        PUSH  DE
        PUSH  BC
        PUSH  AF
```

```
        LD      BC,(XY)
        CALL    BITPO
        LD      A,(DE)          ;GET BIT MASK
        XOR     0FFH            ;COMPLEMENT MASK TO ERASE
        AND     (HL)            ;AND WITH DISPLAY
WRSCRN:
        LD      (HL),A          ;SAVE IT
        JP      RESTORE

; DISPLAY FORMAT
; 160X64 MATRIX
; EACH ROW HAS 20 BYTES
; BIT ASSIGNMENTS ARE AS FOLLOWS
; BIT 0 ->     1- 20
; BIT 1 ->    21- 40
; BIT 2 ->    41- 60
; BIT 3 ->    61- 80
; BIT 4 ->    81-100
; BIT 5 ->   101-120
; BIT 6 ->   121-140
; BIT 7 ->   141-160

;****************************
;****************************
BITPO:
;****************************
;****************************
; THIS SUBROUTINE FIND LOCATION IN MEMORY OF
; BIT POSITION POINTED TO BY B - X, C - Y PIXEL POSITION
; RETURNS WITH HL POINTING TO ADDRESS IN DISPLAY MEMORY
;           AND DE POINTING TO BIT MASK POSITION
;
; BC CONTAINS LOCATION DISTROYED..
; FIND X VALUE...
;
        LD      HL,DSPTBL
        LD      A,C             ;GET Y VALUE
        ADD     A,A
        RST     CONV

LD      A,(HL)
        INC     HL
        LD      H,(HL)
        LD      L,A             ;HL POINTS TO START OF LINE
; OK NOW FIND WHICH BIT...

LD      DE,BITPAIR

LD      A,B
;
LOFX:
        SUB     20
        JR      C,XLESS
        INC     E
        JR      LOFX
;
```

```
XLESS:
      ADD  A,20        ;OFFSET INTO Y
      JP   CONV
INIT:
      LD   HL,STRAM    ;CLEAR RAM.
      LD   DE,STRAM+1
      LD   BC,ERAM-STRAM
LOOPF:
      SUB  A
      LD   (HL),A
      LDIR
BEGIN:
      LD   SP,STACK    ;RESET STACK POINTER

IM 1             ;ENABLE INTERRUPT MODE 1, IE
                       ;EXECUTE INTERRUPT @ 38H
      LD   A,03H       ;INIT LATCH DATA TO $FF
      LD   (LATCH),A   ;KEYPAD NOT SELECTED,+/- SUPPLY
                       ;ON AND
      OUT  (LTCH),A

CALL CLRSCRN     ;CLEAR SCREEN ROUTINE

LD   A,0FFH
      LD   (KMASK),A   ;ENABLE ALL KEYS
      LD   (KHIT),A    ;CLEAR KEY HIT BYTE
;
      SUB  A
      LD   (REVID),A   ;NORMAL SCREEN
; LOADS LEGLENS & MLLEN
;     LD   HL,SDATAB
;     LD   DE,RSDATAB           ;INITIAL VARIABLES IN RAM
;DASIZ EQU  EDATAB-SDATAB
;     LD   BC,DASIZ
;;NUMDIV+NUMDIV+1
;     LDIR                      ;INITIAL PARAMETERS
; INIT BLOCK FOR TEAM STANDINGS....
;
; 26 TEAMS
;
;***DATABASE TESTPATTERN
;     LD   DE,GAMSTND  ;GOING TO
;     LD   HL,INITWL   ;BLOCK OF DATA

;     LD   A,(MLLEN+NUMDIV)
;     ADD  A,A
;     LD   C,A
;     LD   B,0
;     LD   BC,2*TLEG
;     LDIR ;UNSORTED...
;
; MAKE A LIST OF TEAMS IN ORDER
;
      LD   A,(MLLEN+NUMDIV)
      LD   B,A
      ADD  A,A
      LD   HL,DISPLAY+DBUFFER
      RST  CONV

;     LD   B,TLEG      ;NUMBER OF TEAMS
      SUB  A
      LD   C,A
```

```
;       LD      HL,TSTND
NXTM1:
        LD      (HL),A          ;LSB
        INC     HL
        LD      (HL),C          ;MSB
        INC     HL
        INC     A
        DJNZ    NXTM1

; CALULATE % WINS FOR ALL TEAMS

SUB     A
        LD      (DISPLAY),A     ;START DOING PERCENTAGE OF TEAMS
NEXTEAM:
        LD      A,(DISPLAY)     ;COUNTER
        CALL    GETPER
; RESULTS IN TMP(0-1) LSB - MSB
        PUSH    HL              ;SAVE RESULTS

LD      A,(DISPLAY)     ;GET TEAM NUMBER
        ADD     A,A     ;MULT BY 2
        LD      HL,DISPLAY+DBUFFER
        RST     CONV

POP     DE      ;GET RESULTS

LD      (HL),E
        INC     HL
        LD      (HL),D

LD      A,(DISPLAY)
        INC     A
        LD      (DISPLAY),A

LD      L,A             ;SAVE IT
        LD      A,(MLLEN+NUMDIV)        ;MAX VALUE
        DEC     A       ;TAKE 1 AWAY..
        CP      L
        JR      NC,NEXTEAM      ;> THAN CONTINUE.

;       CP      TLEG  ;TOTAL NUMBER OF TEAMS
;       JR      C,NEXTEAM
; DONE....
; SORT BY HIGHEST PERCENTAGE
; FOR EACH DIVISION / LEAGUE

SUB     A
        LD      (DISPLAY),A
LEGSORT:
; SORT BY HIGHEST PERCENTAGE....
; WHERE DISPLAY IS SAME FORMAT AS "LEAGUE"
        LD      A,(DISPLAY)
        LD      HL,LEGLENS      ;LENGTH OF LEAGUE
        RST     CONV            ;START OF LEAGUE OFFSET
; HL
        LD      C,(HL)          ;LENGTH OF DATA

LD      A,(DISPLAY)
        LD      HL,MLLEN        ;GET OFFSET INTO PERCENT TABLE
        RST     CONV            ;BY LEAGUE
```

```
        LD    A,(HL)
        ADD   A,A       ;MULT BY 2
        PUSH  AF        ;SAVE OFFSET FOR TEAM LIST

LD    HL,DISPLAY+DBUFFER
        RST   CONV      ;GET TEAM PERCENTAGE START

;ADDRESS BY LEAGUE

; START OF DATA
        LD    (DISPLAY+SDAT),HL      ;START OF LIST

LD    HL,DISPLAY+DBUFFER  ;+TLEG+TLEG
        LD    A,(MLLEN+NUMDIV)
        ADD   A,A
        RST   CONV

POP   AF    ;FIND TEAM LIST ADDRESS
;       LD    HL,DISPLAY+DBUFFER+TLEG+TLEG
;       LD    HL,TSTND   ;TEAM STANDING LIST

RST   CONV

PUSH  HL         ;SAVE ADDRESS
        PUSH  BC         ;SAVE LENGTH

LD    (DISPLAY+TDAT),HL   ;DATA SORTED BY TEAM NAME

; SORT PERCENTAGE AND TEAM NAME ACCORDINGLY
; DATA TO BE SORTED IN ORDER
; POINTED TO BY (DISPLAY+SDAT)
;         THE POINTERS ASSOCIATED WITH DATA
;         SORTED IN ORDER POINTED TO BY (DISPLAY+TDAT)

SUB   A    ;MAX - MIN SORT
        CALL  SORT
; OK COPY IN STANDINGS
        POP   BC   ;COUNT IN C
        POP   DE   ;ADDRESS OF DATA

LD    B,C  ;PUT COUNT IN B
        RES   7,B

LD    A,(DISPLAY)
        LD    HL,MLLEN  ;GET OFFSET INTO PERCENT TABLE
        RST   CONV      ;BY LEAGUE
        LD    A,(HL)    ;OFFSET GET.
        LD    HL,TSTND  ;POINT HL TO STANDING
        RST   CONV
CSTNDN:
        LD    A,(DE)    ;GET VALUE
        LD    (HL),A    ;PUT IN STANDING
        INC   HL   ;NEXT STANDING
        INC   DE        ;SKIP MSB
        INC   DE        ;NEXT STANDING
        DJNZ  CSTNDN    ;DEC COUNT

LD    A,(DISPLAY)
        INC   A
        LD    (DISPLAY),A
        CP    NLEGS           ;NUMBER OF LEAUGES
```

```
        JR    NZ,LEGSORT
;***DATABASE TESTPATTERN...ABOVE TEAM STANDINGS

; INITIALIZE START OF PITCHERS ID'S
        LD    HL,1000         ;PITCHER START AFTER 64
        LD    (SPITCH),HL
; TOTAL NUMBER OF NONPITCHERS IN DATABASE
;       LD    HL,503
;       LD    (NUMNON),HL
; TOTAL NUMBER OF PITCHERS IN DATABASE
;       LD    HL,309
;       LD    (NUMPITS),HL

; SORT TEAMS...
        LD    HL,ROSTER ;POINTS TO ROSTER
; GO THOUGH TEAM NAMES AND FIND EACH OCCURS
        SUB   A
        LD    (TYPE),A  ;

LD    A,(MLLEN) ;START WITH TEAM 1
        LD    C,A
LST:
        LD    DE,0
        LD    (PLAYER),DE     ;INIT PLAYERS NAME
        LD    B,0       ;TEAM LENGTH
LFTM:
; SAVE HL ROSTER POINTER
; SAVE BC   B = TEAM LENGTH, C = TEAM SEARCHING FOR
        PUSH  HL
        PUSH  BC
        LD    A,TMDATA  ;REQUEST TEAM DATA FROM DATABASE
        CALL  GETDATA        ;GET TEAM NAME...
        LD    A,L
        AND   1FH       ;ONLY TEAM NAME REMOVE ERROR BIT AND QL
                        ; CHECK MAX LIMITS
        POP   BC
        POP   HL
        LD    D,A       ;SAVE TEAM NUMBER IN B
        LD    A,(MLLEN+NUMDIV)    ;GET LAST TEAM NUMBER
        CP    D         ;COMPARE AGAIN HIS TEAM NUMBER
        JR    C,SKHIM      ;OK SKIP HIM , NOT VALID TEAM NUMBER
        LD    A,C
        CP    D
        JR    NZ,SKHIM  ;NOT LOOKING FOR THIS TEAM
        LD    DE,(PLAYER)
        LD    (HL),E         ;SAVE PLAYERS NUMBER IN ROSTER
        INC   HL
        LD    (HL),D
        INC   HL
        INC   B         ;INC TEAM LENGTH
SKHIM:
        LD    DE,(PLAYER)
        INC   DE        ;NEXT PLAYER
        LD    (PLAYER),DE    ;SAVE PLAYERS ID
;       DETERMINE IF @ END OF NONPITCHERS
;           OR END OF PITCHERS
; SAVE HL WHICH POINTS TO ROSTER LIST
        PUSH  HL        ;SAVE HL

EX    DE,HL           ;HL CONTAINS PLAYER NUMBER
```

```
        LD    DE,(SPITCH)        ;> 1000 IS PITCHER
        AND   A
        SBC   HL,DE
        JR    NC,ISTSPIT         ;ITS A PITCHER
;
        LD    HL,(PLAYER)
        LD    DE,(NUMNON)        ; TOTAL NUMBER OF NONPITCHERS
        AND   A
        SBC   HL,DE
        JR    C,LFTM1            ;OK HL < DE SO CONTINUE LOOP
; OK DONE WITH THIS .. RESTART WITH PITCHERS
        LD    HL,(SPITCH)
        LD    (PLAYER),HL
LFTM1:
        POP   HL
        JR    LFTM
ISTSPIT:
        LD    DE,(NUMPITS)       ;TOTAL NUMBER OF PITCHERS
        AND   A
        SBC   HL,DE
        JR    C,LFTM1
; DONE WITH THIS TEAM.... NEXT TEAM
; NEXT TEAM
        LD    HL,TMLEG           ;TEAM LENGTH
        LD    A,C                ;TEAM NUMBER
        CALL  CONV
        LD    (HL),B             ;NUMBER OF PLAYERS ON TEAM

POP   HL

INC   C

; CHECK LIMIT
        LD    A,(MLLEN+NUMDIV)   ;GET MAX VALUE
        DEC   A
        CP    C
        JR    NC,LST
;
; TMLEG+TLEG....
; NO TEAMS
;       LD    A,23               ;23 PLAYERS TEST...!!!
;       LD    (TMLEG+TLEG),A
;
; START OF PITCHERS ID'S

JP    INTLCD

SORT:
        PUSH AF     ;SAVE A
; MAX SURE C > 0
        LD    A,C
        AND   A
        JR    NZ,PASTST
; NOTHING TO SORT... ERROR.
        POP   AF
        RET
PASTST:
        POP   AF
; ASSUMES C > 1 < 255
```

```
;
; A CONTAINS LIST LENGTH
; BIT 7 = 0 SORTS MAX - MIN
;         1 SORTS MIN - MAX
; BIT 6 IS USED IN ROUTINE

; ASSUMES (DISPLAY+SDAT) POINTS TO 16 BIT ARRAY TO BE ARRANGE
;       IN ORDER
;           (DISPLAY+TDAT) POINTS TO A POINTER ARRAY TO BE ARRANGE
;           BY ABOVES ORDER
;
LOOP:
    RES   6,A
    LD    IX,(DISPLAY+SDAT)    ;IX POINTS TO DATA
    LD    IY,(DISPLAY+TDAT)

LD    E,(IX)
    LD    D,(IX+1)             ;GET START VALUE

LD    B,C
    DEC   B
    RET   Z

BLOOP:
    INC   IX
    INC   IX             ;INC POINTERS NEXT WORD   DATA
    INC   IY
    INC   IY             ;INC POINTERS NEXT WORD   POINTER
    LD    L,(IX)
    LD    H,(IX+1)       ;GET NEW DATA
    AND   A
    SBC   HL,DE          ;DE CONTAINS TOP OF LIST
    JR    C,BIGR         ;TOP IS BIGGER  HL-DE < 0
; HL-DE > 0 TOP IS SMALLER
; NEW VALUE IS BIGGER
    BIT   7,A            ;CHECK DIRECTION
    JR    NZ,DOTHN
; ZERO SWAP IT
; REMEMBER THIS DATA.
SMLR:
    SET   6,A            ;SET BIT TO SWAP
    LD    (DISPLAY+REMEM),IX
    LD    (DISPLAY+REMEM+2),IY
    LD    E,(IX)
    LD    D,(IX+1)
    JR    DOTHN
BIGR:
; HL - DE < 0 TOP IS BIGGER
    BIT   7,A
    JR    NZ,SMLR    ;NEW IS BIGGER THAN TOP REMEMBER
DOTHN:
    DJNZ  BLOOP
;
    BIT   6,A        ;TEST IF SWAP
    JR    Z,NSWP             ;NO SWAP

LD    IX,(DISPLAY+REMEM)
    LD    IY,(DISPLAY+SDAT)
    PUSH  AF
    LD    A,(IX)
```

```
        LD      D,A
        LD      A,(IY)
        LD      (IX),A
        LD      A,D
        LD      (IY),A

LD      A,(IX+1)
        LD      D,A
        LD      A,(IY+1)
        LD      (IX+1),A
        LD      A,D
        LD      (IY+1),A

LD      IX,(DISPLAY+REMEM+2)
        LD      IY,(DISPLAY+TDAT)

LD      A,(IX)
        LD      B,A
        LD      A,(IY)
        LD      (IX),A
        LD      A,B
        LD      (IY),A

LD      A,(IX+1)
        LD      B,A
        LD      A,(IY+1)
        LD      (IX+1),A
        LD      A,B
        LD      (IY+1),A

POP     AF
NSWP:
        LD      HL,(DISPLAY+TDAT)       ;INC POINTER
        INC     HL
        INC     HL
        LD      (DISPLAY+TDAT),HL

LD      HL,(DISPLAY+SDAT)       ;INC POINTER
        INC     HL
        INC     HL
        LD      (DISPLAY+SDAT),HL

DEC     C

JP      NZ,LOOP

RET
; PUTS UP PLAYERS NAME
;    CITY FOR STAT'S SCREEN. BASIC ON (PLAYER), (WLEAGUE)
HEADER:
        LD      HL,(PLAYER)
        CALL    SETNAMS         ;PUT OUT TEXT FROM CRUNCH DATABASE
        CALL    DOCR
        LD      A,(FLAG)        ;SEE IF DISPLAYING MY TEAM
        BIT     SHOW,A
        JR      Z,NOSHOW
        LD      HL,(PLAYER)     ;PLAYERS NUMBER
        SUB     A
        LD      (TYPE),A
        LD      A,TMDATA
        CALL    GETDATA
```

```
        AND     1FH
        JR      GCITYY
NOSHOW:
        LD      A,(WLEAGUE)
GCITYY:
        LD      DE,TEAMNAMES    ;POINTER TO CRUNCHED TEXT
        LD      L,A     ;HL COUNT
        LD      H,0
        CALL    TXTDCH          ;SEND THAT STUFF OUT
        JP      DOCR

; GOT THE LENGTH NOW, ADD UP ALL LENGTHS TO SEE
; WHERE DATA STARTS
; USING WLEAGUE AS TEAM NUMBER
; EXITS WITH

GETROFF:
        LD      HL,0
        LD      (TMP),HL        ;OFFSET VALUE INTO ROSTER

LD      HL,TMLEG        ;LENGTH OF TEAM
        LD      B,0             ;COMPARE WITH WLEAGUE
FSOF:
        LD      A,(WLEAGUE)
        CP      B
        JR      Z,SOFF
        LD      A,(TMP)
        ADD     A,(HL)          ;ADD LENGTH OF TEAM
        LD      (TMP),A

LD      A,(TMP+1)
        ADC     A,0
        LD      (TMP+1),A

INC     HL              ;NEXT TEAM LENGTH
        INC     B
        JR      FSOF
SOFF:
; TMP = OFFSET INTO ROSTER
        LD      A,(HL)          ;GET CURRENT TEAM LENGTH
        LD      (TMP+2),A ;
; MULT BY 2 TEMP FOR OFFSET INTO ROSTER
        LD      HL,(TMP)
        SLA     L
        RL      H
        LD      (TMP),HL
; TMP+2 = LENGTH OF TEAM
; POINTING INTO TEAM NAME NOW. OFFSET BY C
        LD      DE,ROSTER
        ADD     HL,DE           ;GET OFFSET.
        RET

;DATABASE CONSTANT TO GET DATA OUT
;GDATA      EQU     0       ;GAME
;RDATA      EQU     1       ;RUNS
;RBIDATA    EQU     2       ;RBI
;BBDATA     EQU     3       ;BASEONBALLS
;SODATA     EQU     4       ;STIKE OUT
;SBDATA     EQU     5       ;STOKEN BASE
;CSDATA     EQU     6       ;COTCH STEALING
;ABDATA     EQU     7       ;AT BAT
;B2DATA     EQU     8       ;2B
```

```
;B3DATA    EQU    9     ;3B
;HRDATA    EQU    10    ;HR
;TMDATA    EQU    11    ;TEAM
;HDATA     EQU    12    ;HIT
;EDATA     EQU    13    ;ERROR

GDATA      EQU    0
SODATA     EQU    1
BBDATA     EQU    2
HDATA      EQU    3
ABDATA     EQU    4
TMDATA     EQU    5

WADATA     EQU    6
ERDATA     EQU    7
KDATA      EQU    8
HADATA     EQU    9
WINDATA    EQU    10
IPDATA     EQU    11
LOSDATA    EQU    12
GSDATA     EQU    13
CGDATA     EQU    14
SVDATA     EQU    15
SHODATA    EQU    16

RDATA      EQU    6
RBIDATA    EQU    7
SBDATA     EQU    8
CSDATA     EQU    9
B2DATA     EQU    10
B3DATA     EQU    11
HRDATA     EQU    12
EDATA      EQU    13

ERRDATA    EQU    17    ;DATA LOCATION ERROR BIT
QLDATA     EQU    18    ;QUALIFY BIT

P1WHERE:
    DB     05     ;G     1070  APPEARS
    DB     2      ;SO    2597  PBSTRIKEOUTS
    DB     3      ;BB    2056  PBASEONBALLS
    DB     10     ;H     4256  PHITS
    DB     13     ;AB    14053
    DB     15     ;TEAM  26    WITH QL AND ERROR IN PLACE

DB     0      ;WA    2355  WALKSALLOWED
    DB     1      ;ER    4096
    DB     4      ;K     5000  PSTRIKEOUTS
    DB     6      ;HA    8191  HITSALLOWED
    DB     7      ;W     511   WINS
    DB     8      ;IP    7356*3 INNINGPITCHED
    DB     7      ;L     313   LOST
    DB     11     ;GS    1070  STARTS
    DB     11     ;CG    751   COMPLETEGAMES
    DB     12     ;SV    341   SAVES
    DB     14     ;SHO   110   SHUTOUTS

PLWHERE:
    DB     7      ;G     1070  APPEARS
    DB     3      ;SO    2597  PBSTRIKEOUTS
    DB     4      ;BB    2056  PBASEONBALLS
```

```
        DB      16      ;H      4256 PHITS
        DB      20      ;AB     14053
        DB      00      ;TEAM         26    NA

DB      0       ;WA     2355        WALKSALLOWED
        DB      1       ;ER     4096
        DB      6       ;K      5000 PSTRIKEOUTS
        DB      9       ;HA     8191 HITSALLOWED
        DB      13      ;W      511 WINS
        DB      12      ;IP     7356*3 INNINGPITCHED
        DB      15      ;L      313 LOST
        DB      10      ;GS     1070 STARTS
        DB      17      ;CG     751 COMPLETEGAMES
        DB      19      ;SV     341 SAVES
        DB      22      ;SHO    110 SHUTOUTS

; TREND OFFSET..
PTWHERE:
        DB      00      ;G      1070 APPEARS
        DB      00      ;SO     2597 PBSTRIKEOUTS
        DB      00      ;BB     2056 PBASEONBALLS
        DB      00      ;H      4256 PHITS
        DB      00      ;AB     14053
        DB      00      ;TEAM         26

DB      5       ;WA     2355        WALKSALLOWED
        DB      4       ;ER     4096
        DB      0       ;K      5000 PSTRIKEOUTS
        DB      2       ;HA     8191 HITSALLOWED
        DB      1       ;W      511 WINS
        DB      0       ;IP     7356*3 INNINGPITCHED
        DB      0       ;L      313 LOST
        DB      00      ;GS     1070 STARTS
        DB      00      ;CG     751 COMPLETEGAMES
        DB      2       ;SV     341 SAVES
        DB      00      ;SHO    110 SHUTOUTS

NP1WHERE:
        DB      0       ;G
        DB      4       ;SO     =       8 /189          12/2597
        DB      3       ;BB     =       8 /170          12/2056
        DB      11      ;H      =       9 /257          13/4256
        DB      7       ;AB     =       10 /750         14/14053
        DB      9       ;TEAM   =          5 / 26             NA

DB      1       ;R
        DB      2       ;RBI    =       8 /190          12/2293
        DB      5       ;SB     =       8 /130          10/938
        DB      6       ;CS     =       8 /<255         10/<1024
        DB      12      ;2B     =       7 / 67          10/793
        DB      8       ;3B     =       6 / 36           9/312
        DB      13      ;LHR    =       6 / 61          10/755
        DB      9       ;E      =       9 / <512        11/<2048
        DB      00
        DB      00
        DB      00
        DB      00
        DB      00
```

```
        DB      00

; TREND INFO.
NPTWHERE:
        DB      0       ;G
        DB      0       ;SO    =       8 /189          12/2597
        DB      0       ;BB    =       8 /170          12/2056
        DB      3       ;H     =       9 /257          13/4256
        DB      2       ;AB    =      10 /750          14/14053
        DB      0       ;TEAM  =       5 /  26               NA

DB      0       ;R
        DB      1       ;RBI   =       8 /190          12/2293
        DB      0       ;SB    =       8 /130          10/938
        DB      0       ;CS    =       8 /<255         10/<1024
        DB      0       ;2B    =       7 /  67         10/793
        DB      0       ;3B    =       6 /  36          9/312
        DB      3       ;LHR   =       6 /  61         10/755
        DB      0       ;E     =       9 / <512        11/<2048

NPLWHERE:
        DB      0       ;G
        DB      6       ;SO    =       8 /189          12/2597
        DB      4       ;BB    =       8 /170          12/2056
        DB      17      ;H     =       9 /257          13/4256
        DB      10      ;AB    =      10 /750          14/14053
        DB      00      ;TEAM  =       5 /  26               NA

DB      1       ;R
        DB      3       ;RBI   =       8 /190          12/2293
        DB      7       ;SB    =       8 /130          10/938
        DB      8       ;CS    =       8 /<255         10/<1024
        DB      13      ;2B    =       7 /  67         10/793
        DB      11      ;3B    =       6 /  36          9/312
        DB      14      ;LHR   =       6 /  61         10/755
        DB      15      ;E     =       9 / <512        11/<2048
;******************************
BMASKS:
        DW      01H     ; 0
        DW      03H     ; 1
        DW      07H     ; 2
        DW      0FH     ; 3
        DW      1FH     ; 4
        DW      3FH     ; 5
        DW      7FH     ; 6
        DW      0FFH    ; 7
        DW      1FFH    ; 8
        DW      3FFH    ; 9
        DW      7FFH    ; A
        DW      0FFFH   ; B
        DW      1FFFH   ; C
        DW      3FFFH   ; D
        DW      7FFFH   ; E
        DW      0FFFFH  ; F
```

```
;   xx SHIFT BYTE
;   BIT 7-4 MASK POINTER.
;   BITS 0-3 NUMBER OF TIMES TO SIZE MAX 15
P1SHIFT:
        DB      61H     ;G      1070 APPEARS
        DB      70H     ;SO     2597 PBSTRIKEOUTS
        DB      70H     ;BB     2056 PBASEONBALLS
        DB      80H     ;H      4256 PHITS
        DB      93H     ;AB     14053
        DB      61H     ;TEAM        26

DB      70H     ;WA     2355    WALKSALLOWED
        DB      70H     ;ER     4096
        DB      80H     ;K      5000 PSTRIKEOUTS
        DB      80H     ;HA     8191 HITSALLOWED
        DB      51H     ;W      511 WINS
        DB      0A5H    ;IP     7356*3 INNINGPITCHED
        DB      57H     ;L      313 LOST
        DB      51H     ;GS     1070 STARTS
        DB      57H     ;CG     751 COMPLETEGAMES
        DB      55H     ;SV     341 SAVES
        DB      35H     ;SHO    110 SHUTOUTS
;   xx SHIFT BYTE
;   BIT 7-4 MASK POINTER.
;   BITS 0-3 NUMBER OF TIMES TO SIZE MAX 15
PTSHIFT:
        DB      00H     ;G      1070 APPEARS
        DB      00H     ;SO     2597 PBSTRIKEOUTS
        DB      00H     ;BB     2056 PBASEONBALLS
        DB      00H     ;H      4256 PHITS
        DB      00H     ;AB     14053
        DB      00H     ;TEAM        26

DB      70H     ;WA     2355    WALKSALLOWED
        DB      70H     ;ER     4096
        DB      83H     ;K      5000 PSTRIKEOUTS
        DB      87H     ;HA     8191 HITSALLOWED
        DB      53H     ;W      511 WINS
        DB      0A0H    ;IP     7356*3 INNINGPITCHED
        DB      00H     ;L      313 LOST
        DB      00H     ;GS     1070 STARTS
        DB      00H     ;CG     751 COMPLETEGAMES
        DB      51H     ;SV     341 SAVES
        DB      00H     ;SHO    110 SHUTOUTS
;   xx SHIFT BYTE
;   BIT 7-4 MASK POINTER.
;   BITS 0-3 NUMBER OF TIMES TO SIZE MAX 15
PLSHIFT:
        DB      0A5H    ;G      1070 APPEARS
        DB      0B0H    ;SO     2597 PBSTRIKEOUTS
        DB      0B4H    ;BB     2056 PBASEONBALLS
        DB      0C1H    ;H      4256 PHITS
        DB      0D1H    ;AB     14053
        DB      00      ;TEAM        26 NA

DB      0B0H    ;WA     2355    WALKSALLOWED
        DB      0B4H    ;ER     4096
        DB      0C0H    ;K      5000 PSTRIKEOUTS
        DB      0C0H    ;HA     8191 HITSALLOWED
        DB      087H    ;W      511 WINS
        DB      0E0H    ;IP     7356*3 INNINGPITCHED
```

```
        DB      080H    ;L      313 LOST
        DB      0A5H    ;GS     1070 STARTS
        DB      096H    ;CG     751 COMPLETEGAMES
        DB      080H    ;SV     341 SAVES
        DB      060H    ;SHO    110 SHUTOUTS
;   xx SHIFT BYTE
; BIT 7-4 MASK POINTER.
; BITS 0-3 NUMBER OF TIMES TO SIZE MAX 15
NP1SHIFT:
        DB      70H     ;G
        DB      70H     ;SO  =      8 /189           12/2597
        DB      70H     ;BB  =      8 /170           12/2056
        DB      80H     ;H   =      9 /257           13/4256
        DB      090H    ;AB  =     10 /750           14/14053
        DB      060H    ;TEAM =      5 / 26                 NA

DB      070H    ;R
        DB      070H    ;RBI =      8 /190           12/2293
        DB      070H    ;SB  =      8 /130           10/938
        DB      070H    ;CS  =      8 /<255          10/<1024
        DB      061H    ;2B  =      7 / 67           10/793
        DB      052H    ;3B  =      6 / 36            9/312
        DB      050H    ;LHR =      6 / 61           10/755
        DB      087H    ;E   =      9 / <512         11/<2048

;   xx SHIFT BYTE
; BIT 7-4 MASK POINTER.
; BITS 0-3 NUMBER OF TIMES TO SIZE MAX 15
NPTSHIFT:
        DB      00H     ;G
        DB      00H     ;SO  =      8 /189           12/2597
        DB      00H     ;BB  =      8 /170           12/2056
        DB      80H     ;H   =      9 /257           13/4256
        DB      090H    ;AB  =     10 /750           14/14053
        DB      000H    ;TEAM =      5 / 26                 NA

DB      000H    ;R
        DB      070H    ;RBI =      8 /190           12/2293
        DB      070H    ;SB  =      8 /130           10/938
        DB      000H    ;CS  =      8 /<255          10/<1024
        DB      000H    ;2B  =      7 / 67           10/793
        DB      000H    ;3B  =      6 / 36            9/312
        DB      052H    ;LHR =      6 / 61           10/755
        DB      000H    ;E   =      9 / <512         11/<2048

;   xx SHIFT BYTE
; BIT 7-4 MASK POINTER.
; BITS 0-3 NUMBER OF TIMES TO SIZE MAX 15

NPLSHIFT:
        DB      0B0H    ;G
        DB      0B0H    ;SO  =      8 /189           12/2597
        DB      0B4H    ;BB  =      8 /170           12/2056
        DB      0C0H    ;H   =      9 /257           13/4256
        DB      0D0H    ;AB  =     10 /750           14/14053
        DB      00H     ;TEAM =      5 / 26                 NA

DB      0B4H    ;R
        DB      0B0H    ;RBI =      8 /190           12/2293
        DB      094H    ;SB  =      8 /130           10/938
```

```
        DB      096H    ;CS   =      8 /<255          10/<1024
        DB      090H    ;2B   =      7 / 67           10/793
        DB      086H    ;3B   =      6 / 36            9/312
        DB      092H    ;LHR  =      6 / 61           10/755
        DB      0A5H    ;E    =      9 /<512          11/<2048

;*****************************
; PACKET SIZE FOR EACH DATABASE..
STYPE:
        DB      14      ;NONPITCHER PACKET
        DB      16      ;PITCHER PACKET
        DB      19      ;LIFETIME NONPITCHER PACKET
        DB      23      ;LIFETIME PITCHER PACKET
        DB      6       ;TREND INFO
        DB      6       ;TREND INFO
; MASK DATA AND SHIFT
SHIFTPAT:
        DW      NP1SHIFT
        DW      P1SHIFT
        DW      NPLSHIFT
        DW      PLSHIFT
        DW      NPTSHIFT
        DW      PTSHIFT
; OFFSET INTO PACKETS
WHEREPAT:
        DW      NP1WHERE
        DW      P1WHERE
        DW      NPLWHERE
        DW      PLWHERE
        DW      NPTWHERE
        DW      PTWHERE
; FAKE DATA.. FOR TESTING....
STDATA:
        DW      NPD
        DW      PD
        DW      LNONPITCH
        DW      LPITCHER
        DW      TNONPITCH
        DW      TPITCHER

INCLUD DATABASE.ASM

COPTREND:
; COPY IN TREND DATA TO NEW LOCATION
; SET ERROR BIT
        LD      HL,0
        LD      (PLAYER),HL
; START NUMBER OF PLAYER
; FIRST .... NONPITCHERS
NVANON:
        LD      A,HDATA
        CALL    REWRITE         ;WRITE CURRENT DATA INTO TREND
        LD      A,ABDATA
        CALL    REWRITE
        LD      A,HRDATA
        CALL    REWRITE
        LD      A,SBDATA
        CALL    REWRITE
        LD      A,RBIDATA
```

```
        CALL REWRITE

SUB   A
        LD    (TYPE),A
        LD    A,TMDATA
        CALL  GETDATA
        LD    A,L
        OR    40       ;ERROR FLAG
        LD    L,A

CALL  WRTDATA           ;WRITE ERROR BIT IN CURRENT DATA

LD    HL,(PLAYER)
        INC   HL
        LD    (PLAYER),HL
; CHECK IF PITCHER OR NONPITCHER

LD    DE,(NUMNON)    ;LOAD NUMBER OF NONPITCHER
        AND   A
        SBC   HL,DE
        JR    C,NVANON   ;NEXT NON PITCHER PLEASE

; PITCHERS DATA MOVE INTO TRENDS

LD    HL,(SPITCH)
        LD    (PLAYER),HL    ;GO THROUGH PITCHERS NOW..

; PITCHERS STUFF
DPIT:
        LD    A,WINDATA
        CALL  REWRITE          ;COPY PITCHERS DATA INTO TREND INFO.
        LD    A,SVDATA
        CALL  REWRITE
        LD    A,ERDATA
        CALL  REWRITE
        LD    A,IPDATA
        CALL  REWRITE
        LD    A,HADATA
        CALL  REWRITE
        LD    A,WADATA
        CALL  REWRITE
        SUB   A
        LD    (TYPE),A   ;CURRENT DATABASE
        LD    A,TMDATA   ;GET TEAM WHICH INCLUDES QL AND ERR BITS
        CALL  GETDATA
        LD    A,L
        OR    40H        ;SET ERROR BITS
        LD    L,A
        CALL  WRTDATA

LD    HL,(PLAYER)
        INC   HL
        LD    (PLAYER),HL

LD    DE,(NUMPITS)
        AND   A
        SBC   HL,DE
        JR    C,DPIT

RET
```

; GET CURRENT DATA REQUESTED BY ACC
; ASSUMES PLAYER AND TYPE IS SET UP CORRECTLY

```
REWRITE:
      PUSH AF
      SUB  A
      LD   (TYPE),A    ;CURRENT DATA.
      POP  AF
      CALL GETDATA     ;GET FROM CURRENT DATABASE HITS
      LD   A,2
      LD   (TYPE),A    ;SET TO TREND
      JP   WRTDATA
      LD   HL,1        ;SET ERROR BIT
      SUB  A
      LD   (TYPE),A    ;INTO CURRENT DATABASE

LD   A,ERDATA
      LD   (REQUEST),A
      JP   WRTDATA     ;WRITE ERROR BIT IN CURRENT DATA

SHFTPT:
      LD   HL,SHIFTPAT
      RST  CONV
      LD   A,(HL)
      INC  HL
      LD   H,(HL)
      LD   L,A

LD   A,(REQUEST)
      RST  CONV

; NOW ADD REQUEST.....
      LD   A,(HL)           ;LSB IS NUMBER OF TIMES TO SHIFT DE
                            ;RIGHT
      RET

PRTDATA:
      LD   A,(TYPE)    ;0,1,2
      AND  03H
      ADD  A,A         ;0,2,4
      INC  A           ;1,3,5
      LD   DE,(SPITCH)    ;START OF PITCHERS ID'S
      LD   HL,(PLAYER)    ;PLAYERS ID
      AND  A              ;CLEAR CARRY
      SBC  HL,DE          ; PITCHER OR NONPITCHER
      JR   NC,NPITCHR     ;NON-PITCHER
      DEC  A              ;NONPITCHER INC A - 0,2,4
      LD   HL,(PLAYER)    ;NONPITCHER
NPITCHR:
      LD   (TBASE),A      ;SAVE TYPE... OF DATABASE 0-5
      PUSH HL             ;SAVE VALUE  * TIMES TO MULTPLY

LD   HL,STYPE       ;GET SIZE OF DATA PACKET
```

```
        RST  CONV
; HL POINTING TO SIZE INFORMATION
        LD   C,(HL)           ;BC = SIZE OF PACKET
        LD   B,0
; SEE HOW MANY TIMES TO MULTPLY TO GET OFFSET FROM
; START OF A DATABASE
        POP  HL    ;NUMBER OF PACKETS OFF START
        CALL MULTPLY

LD   DE,(TMP)   ;GET RESULTS OF MULTPLY

LD   A,(TBASE) ;RESTORE TYPE OF DATABASE.
        ADD  A,A
        LD   (TBASE),A     ;SAVE TYPE * 2

LD   HL,STDATA ;LOCATION OF START THIS DATABASE
        RST  CONV
        LD   A,(HL)
        INC  HL
        LD   H,(HL)
        LD   L,A
        ADD  HL,DE            ;POINTING TO DATA. BLOCK IN QUESTION

EX   DE,HL            ;DE POINTING TO LOCATION

LD   A,(TBASE) ;RESTORE TYPE*2 OF DATABASE

LD   HL,WHEREPAT
        RST  CONV

LD   A,(HL)
        INC  HL
        LD   H,(HL)
        LD   L,A

LD   A,(REQUEST)
        RST  CONV
; NOW ADD REQUEST.....
        LD   A,(HL)           ;OFFSET TO DE

EX   DE,HL            ;HL ADDRESS TO DATA START
        RST  CONV      ;ADD OFFSET
        RET            ;HL POINTS TO DATA...
WRTDATA:
; OK WRITE DATA IN HL
; FORMAT THIS DATA...
; DATA IN DE...
        PUSH DE         ;SAVE DATA
        CALL SHFTPT             ;A CONTAINS SHIFT AND ROLATE VALUE
; RETURNS SHIFT VALUE FOR DATA
        LD   (TMP),A
        RRA
        RRA
        RRA
        AND  1EH
        LD   HL,BMASKS
        RST  CONV
        LD   A,(HL)
        INC  HL
        LD   H,(HL)
```

```
        LD    L,A

POP   DE
SLFTP:
        AND   0FH
        JR    Z,NSHFTIT    ;DON'T SHIFT IT
        SLA   L
        RL    H
        SLA   E
        RL    D
        DEC   A
        JR    SLFTP
NSHFTIT:
; OK DATA
        LD    A,0FFH
        XOR   L
        LD    L,A
        LD    A,0FFH
        XOR   H
        LD    H,A          ;COMPLEMENT DATA MASK
        PUSH  HL           ;SAVE COMPLEMENTED DATA MASK
        PUSH  DE           ;DATA VALUE

CALL  PRTDATA
; HL POINTS TO DATA....
        POP   BC           ;RETURN DATA
        POP   DE           ;RETURN COMPLEMENTED DATA MASK

LD    A,(HL)
        AND   E
        OR    C
        LD    (HL),A
        INC   HL
        LD    A,(HL)
        AND   D
        OR    B
        LD    (HL),A
        RET

GETBA:
        LD    A,HDATA       ;GET HITS
        CALL  GETDATA
        PUSH  HL
        LD    A,ABDATA
        CALL  GETDATA
        POP   DE
        PUSH  HL     ;SAVE @ BATS
        EX    DE,HL
        LD    BC,2000
        CALL  MULTPLY
        POP   HL
        JP    DIVIDE
GETHR:
        LD    A,HRDATA
        JP    GETDATA
GETRBI:
        LD    A,RBIDATA
        JP    GETDATA
GETSO:
        LD    A,SODATA
        JP    GETDATA
```

```
GETH:
        LD      A,HDATA
        JP      GETDATA
GETK:
        LD      A,KDATA
        JP      GETDATA
GETSV:
        LD      A,SVDATA
        JP      GETDATA
GETWIN:
        LD      A,WINDATA
        JP      GETDATA
GETERA:
        LD      A,ERDATA
        CALL    GETDATA
        PUSH    HL              ;SAVE IT
        LD      A,IPDATA
        CALL    GETDATA
        POP     DE
        PUSH    HL
        EX      DE,HL
        LD      BC,2000*3*9     ;<<<<< ERA...
        CALL    MULTPLY
        POP     HL
        JP      DIVIDE
GETPR:
        LD      A,IPDATA
        CALL    GETDATA
        PUSH    HL              ;SVAE IP
        LD      A,HADATA
        CALL    GETDATA
        PUSH    HL
        LD      A,WADATA
        CALL    GETDATA
        POP     DE
        ADD     HL,DE
        POP     DE
        PUSH    HL
        EX      DE,HL
        LD      BC,2000*3
        CALL    MULTPLY
        POP     HL
        JP      DIVIDE
PITSORT:
        DW      GETERA          ;FUNCTION
        DB      80H             ;TYPE SORT, MIN-MAX
        DW      GETK
        DB      00              ;MAX - MIN
        DW      GETSV
        DB      00
        DW      GETWIN
        DB      00
        DW      GETPR
        DB      00
BATSORT:
        DW      GETBA
        DB      00
        DW      GETHR
        DB      00
```

```
        DW      GETRBI
        DB      00
        DW      GETSO
        DB      00
        DW      GETH
        DB      00

; ENTER WITH NUMBER TO SORT FOR..
;0 -ERA  SORT MIN - MAX
;1 - K'S  SORTED MAX-MIN
;2 - SV  SORTED MAX-MIN
;3 - WINS SORTED MAX
;4 - PITCHING RATIO

;5 - BA AVERAGE
;6 - HR
;7 - RBI
;8 - SO
;9 - H

WHOQUAL:
        LD      (CATSCRN),A     ;SAVE WHICH CATAGORY SORTING FOR.

LD      HL,(SPITCH)
ABVPIT  EQU     (BATSORT-PITSORT)/3    ;THIS SHOULD = 5?
        CP      ABVPIT          ;PITCHERS OR NONPITCHERS?

JR      C,LDPTCH        ;LOAD PLAYERS STARTING WITH
        LD      HL,00           ;NONPITCHERS DATABASE START
LDPTCH:
        LD      (PLAYER),HL

LD      B,A
        ADD     A,A
        ADD     A,B             ;MULT BY 3
        LD      HL,PITSORT      ;FUNCTION AND TYPE OF SORT
        RST     CONV
        LD      E,(HL)          ;GET FUNCTION
        INC     HL
        LD      D,(HL)
        INC     HL
        LD      A,(HL)          ;MAX-MIN   MIN-MAX SORT
        LD      (TSORT),A
        LD      (FUNCTION),DE
; WRITE THE DATA TO DATABASE IN QUESTION....
; LET'S MAKE A LIST OF ALL PLAYERS THAT HAVE QL BIT SET
; MOVE INTO DISPLAY+DBUFFER MEMORY
; ENTER WITH PLAYER @ START OF MEMORY
; DISPLAY(0) POINTER OF NEXT PLAYER
; DATA -> DISPLAY+2 -
        SUB     A
        LD      (DISPLAY+PRT1),A
        LD      (TYPE),A
        LD      HL,0
LCHK:
        LD      A,TMDATA        ;GET TEAM NAME
; WHICH CONTAINS QL BIT
```

```
        CALL GETDATA
        LD   A,(MLLEN+NUMDIV)     ;GET MAX TEAM NAME
        LD   B,A
        LD   A,L
        AND  1FH
        CP   B
        JR   NC,NEXTBI ;NO GOOD , CITY NAME TOO BIG
        BIT  5,L          ;QL BIT IS
        JR   Z,NEXTBI

LD   A,(DISPLAY+PRT1)
        LD   HL,DISPLAY+DBUFFER
        ADD  A,A
        JR   NC,NIH5
        INC  H
NIH5:
        RST  CONV

LD   DE,(PLAYER)
        LD   (HL),E
        INC  HL
        LD   (HL),D

LD   A,(DISPLAY+PRT1)
        INC  A
        LD   (DISPLAY+PRT1),A
NEXTBI:
        LD   HL,(PLAYER)
        INC  HL
        LD   (PLAYER),HL
; DETERMINE IF PITCHER OR NONPITCHER
        LD   DE,(SPITCH)
        AND  A
        SBC  HL,DE
        JR   NC,PCHER   ;IT A PITCHER
        LD   HL,(PLAYER)     ;GET NONPITCHER NUMBER
        LD   DE,(NUMNON)     ;TOTAL NUMBER OF NONPITCHER
        AND  A
        SBC  HL,DE
        JR   C,LCHK
        JR   CATSORT
PCHER:
        LD   DE,(NUMPITS)
        AND  A
        SBC  HL,DE
        JR   C,LCHK
;*******************************************
; THIS ROUTINE SORTS PLAYER NAMES STORED IN
; DISPLAY+DBUFFER
; LENGTH OF ARRAY = DISPLAY+PRT1
; HL CONTAIN THE FUNCTION CALL THAT THIS PLAYER
;      STAT NEEDS TO BE GENERATED...
; A CONTAINS 0 - SORT MAX - MIN OR 80H FOR MIN TO MAX
CATSORT:
; LIST IS IN DISPLAY+2, MAX VALUE IN DISPLAY
; LET'S GO GENERATE ERA
        SUB  A
        LD   (TYPE),A   ;CURRENT SEASON
        LD   (DISPLAY+PRT2),A
;
```

```
; IF DISPLAY = 0 THEN DON'T DO ANYTHING
    LD    A,(DISPLAY+PRT1)
    LD    (NLIST),A
    AND   A
    RET   Z              ;NO SORT..
LPROCS:
    LD    A,(DISPLAY+PRT2)
    LD    HL,DISPLAY+DBUFFER
    ADD   A,A
    JR    NC,NIH3
    INC   H
NIH3:
    RST   CONV
    LD    E,(HL)
    INC   HL
    LD    D,(HL)
    LD    (PLAYER),DE

CALL  GETFUNC
; DATA IN HL
    EX    DE,HL          ;DATA IN DE
    LD    HL,DISPLAY+DBUFFER
    LD    A,(DISPLAY+PRT2)
    RST   CONV
    LD    A,(DISPLAY+PRT2)
    RST   CONV
    LD    A,(DISPLAY+PRT1)
    RST   CONV
    LD    A,(DISPLAY+PRT1)
    RST   CONV
    LD    (HL),E
    INC   HL
    LD    (HL),D

LD    A,(DISPLAY+PRT2)
    INC   A
    LD    (DISPLAY+PRT2),A

LD    B,A
    LD    A,(DISPLAY+PRT1)
    CP    B
    JR    NZ,LPROCS      ;CONTINUE UNTIL DONT
; NUMBER TO SORT
    LD    C,A

LD    HL,DISPLAY+DBUFFER
    LD    (DISPLAY+TDAT),HL    ;PLAYER NAMES
    LD    A,(DISPLAY+PRT1)
    RST   CONV
    LD    A,(DISPLAY+PRT1)
    RST   CONV
    LD    (DISPLAY+SDAT),HL    ;PLAY

LD    A,(TSORT)

CALL  SORT
; OK FIRST 10 MOVE THEM....
    LD    BC,2*10
    LD    HL,DISPLAY+DBUFFER
```

```
        LD    DE,LISTP
        LDIR

LD    A,(DISPLAY+PRT1)    ;HOW MANY
        CP    10
        JR    C,LESS10
        LD    A,10
LESS10:
        LD    (NLIST),A            ;WHO MANY IN LIST
        RET

GETFUNC:
        LD    HL,(FUNCTION)
        JP    (HL)

; REQUEST SHOULD BE THE SAME.
GETDATA:
        LD    (REQUEST),A          ;SAVE REQUEST
; CHECK IF LIFETIME
        LD    A,(TYPE)
        AND   03H
        CP    1         ;LIFETIME
        JR    NZ,NLIFE  ;NOT LIFE TIME
; GET LIFETIME + CURRENT
        CALL  NLIFE     ;GET LIFE TIME
        PUSH  HL        ;SAVE DATA
        SUB   A
        LD    (TYPE),A
        CALL  NLIFE
        POP   DE        ;RESTORE LIFETIME
        ADD   HL,DE     ;ADD CURRENT
        LD    A,1       ;RESTORE TYPE TO LIFETIME
        LD    (TYPE),A
        RET
NLIFE:
; TYPE = 0 1 2
; 0 = CURRENT STATS
; 1 = LIFE TIME STATS
; 2 = TREND STATS
; (SPITCH) ID##'S THAT START PITCHERS
; (PLAYER) = PLAYERS ID
; SHIFTPAT TABLE OF ADDRESS TO SHIFT AND MASK INFO
; WHEREPAT TABLE OF ADDRESS TO OFFSET INTO PACKET INFO
; STYPE TABLE OF PACKET SIZES IN DATABASE ORDER DESCIBED BELOW
; STDATA TABLE OF ADDRESS TO START OF DATABASES
; TBASE IS USED TO RETRIAN DATABASE WE ARE LOOKING @
; THERE ARE 6 DATABASES
; 1 NONPITCHERS CURRENT DATABASE
; 2 PITCHERS CURRENT DATABASE
; 3 NONPITCHERS LIFETIME DATABASE
; 4 PITCHERS LIFETIME DATABASE
; 5 NONPITCHERS TREND DATABASE
; 6 PITCHERS TREND DATABASE

CALL  PRTDATA             ;POINT TO DATA

LD    A,(HL)              ;LOAD HL WITH DATA.
        INC   HL
        LD    H,(HL)
```

```
        LD    L,A

EX    DE,HL         ;SAVE IN DE   DATA IN DE . NOW DO SHIFT

LD    A,(TBASE)     ;RESTORE TYPE * 2
        CALL  SHFTPT

LD    (TMP),A
        AND   0FH
        JR    Z,DSHFT
        LD    B,A
SRGHT:
        SRL   D
        RR    E
        DJNZ  SRGHT
DSHFT:
; NOW MASK OF BITS...
        LD    A,(TMP)
        RRA
        RRA
        RRA
        AND   1EH           ;TOP NIBBLE * 2

LD    HL,BMASKS     ;GET 16 BIT MASK PATTERN
        RST   CONV

LD    A,E
        AND   (HL)          ;LSB
        LD    E,A
        INC   HL
        LD    A,D           ;MSB
        AND   (HL)
        LD    D,A

EX    DE,HL         ;DATA IN HL

RET

;GET PERCENT WIN'S
GETPER:
        ADD   A,A           ;MULT BY 2
        LD    HL,GAMSTND
        RST   CONV
        EX    DE,HL         ;DE POINTING TO WINS.
; CALULATE WIN/WIN+LOST PERCENTAGE
; TO DETERMINE QUICK STANDINGS...
; SCRATCH PAD BEING SCREEN OR DISPLAY BUFFER
        LD    A,(DE)        ;GET WINS
        LD    C,A    ;BC = WINS
        LD    B,0
        LD    HL,2000       ;HL 1000   USE EXTRA BIT TO ROUND OFF
        PUSH  DE
        CALL  MULTPLY       ;WIN*1000
        POP   DE    ;GET BACK WINS
        LD    A,(DE)        ;GET WINS
        LD    L,A
        LD    H,0
        INC   DE
        LD    A,(DE)        ;GET LOSES
```

```
        RST   CONV   ;ADD WINS AND LOSES
; HL CONTAINS WIN+LOSTS
        JP    DIVIDE        ;WIN*1000/(WIN+LOSES)

; INITIALIZE 61830 LCD DISPLAY BOARD

INTLCD:

IF LCD
        LD    HL,INITLCD
        LD    B,LOW(ELIST-INITLCD)
NXBIT:
        LD    C,LCDSETRS
        OUTI                ;SET REGISTER
        LD    C,LCDCLRRS
        OUTI                ;SEND DATA
        JR    NZ,NXBIT

INITLCD:
        DB    00
        DB    30H     ;0 CHARACTER MODE
        DB    01
        DB    75H     ;1 8X8 CHARACTER MATRIX
        DB    02
HN:
        DB    41      ;2 42 CHARACTER/LINE
        DB    03
        DB    3FH     ;3 64 COLUMN
        DB    04
        DB    01H     ;4 CURSOR ADDRESS
        DB    08
        DB    00      ;8 START ADDRESS OF DISPLAY
        DB    09
        DB    00      ;9 START ADD OF DSP HIGH BYTE
        DB    10
        DB    00      ;10 START ADD OF CURSOR LOWER
        DB    11
        DB    00      ;11 ""   HIGH
ELIST:

ENDIF

EI                  ;ENABLE INTERRUPT..

LD    HL,0
        LD    (CURSOR),HL
; SHOULD OUTCHR INC X,Y?
        SUB   A
        LD    (KCHNG),A
        DEC   A
        LD    (KHIT),A
        JP    SMAIN         ;GOTO START..

KEY2:
        DI

; CLEAR ROW SELECT...
```

```
;4 - LC  LATCH CLOCK ONCE PER ROW
;5 - SC  SHIFT CLOCK ONCE PER DATA BYTE
;6 - MC  FRAME CLOCK  50HZ
;7 - DATA BIT TO START FRAME

; OK SHUT DOWN LCD
      LD   B,21
; CLEAR ROW
      SUB  A
CROW:
      OUT  (DSPDAT),A
      DJNZ CROW

LD   B,65
CRLT:
      LD   A,10H
      OUT  (LTCH),A

SUB  A
      OUT  (LTCH),A
      OUT  (DSPDAT),A      ;SEND ZERO DATA TO SHIFT.
      DJNZ CRLT
; TURN ON + POWER SUPPLY TO MODEM...
;3 - OFF/ON POS SUPPLY OF MODEM 6 VOLTS
      SUB  A               ;TURN ON +/- SUPPLY..
      OUT  (LTCH),A
      LD   (LATCH),A  ;TURN THEM ALL TO ZERO..

*****************************************************************

*                                          *
*    carrier detect routine                       *
*    dis-able interrupts                  *
*                                *
*****************************************************************

CARDET:
; INIT
      LD   BC,0
      LD   HL,0
      LD   DE,0

EXX
      LD   HL,DISPLAY      ;POINT INTO SCREEN MEMROY
      LD   B,0
      LD   DE,0
      EXX
      ; PUT TEST LIGHT OUT HERE INDICATING NO CARRIER

LD   A,30H
      OUT  (LTCH),A
; H CONTAINS VALUE TO WRITE TO PORT
; L CONTAINS LAST VALUE
; C CONTAIN NUMBER OF CYCLES @ LAST FREG.
; B X COUNTER
; E NUMBER OF CYCLE PER BIT CELL
; D CONTAINS BYTE INFORMATION

; exchange registers
; HL POINTS TO LOCATION TO PUT DATA. (INBUF)= 8800H
```

```
;       L IS ONLY INCREMENTED
; B = BIT NUMBER 0= START
;                1-X = NUMBER OF BITS
;                WHERE X = NUMBITS
; C = TEMP BUFFER.

GOTCAR:

; PUT TEST LIGHT ON HERE INDICATING CARRIER DETECT

;       LD   A,(LATCH)
;       AND  01FH
;       LD   (LATCH),A
;       OUT  (LTCH),A

; C CONTAINS NUMBER OF CYCLES
                       ;3 CYCLES = 1
                       ;2 CYCLES = 0 @ 600 BAUD
                       ;ASSUMING SPACE = 1200HZ
                 ;        MARK  = 1800HZ
KEEPLK:
    CALL CHKCYC
    JP   C,CARDET   ;IF SCREWED UP THEN TRY OVER (AND OVER) AGAIN
    LD   (TMP),A
    LD   E,02
    LD   H,20H
    CP   A,MIDCYC   ;SEE IF A ZERO OR ONE
    JP   C,ITMARK   ;IF NOT A ZERO THEN ITS A MARK
    LD   H,10H
    LD   E,1
ITMARK:
; GET OUTPUT VALUE
    LD   A,H
    CP   L          ;SEE IF CHANGED?
    JR   Z,SBORF    ;SAME AS BEFORE
    LD   L,H        ;MAKE SAME
    LD   C,0FFH
SBORF:
    INC  C          ;INC CYCLE COUNT
    LD   A,L
    OUT  (LTCH),A   ;OUTPUT BIT
; TEST IF BIT ?
    LD   A,C
    CP   E          ;SAVE
    JR   C,KEEPLK   ;KEEP GOING...
    LD   C,0FFH             ;RESET C BACK TO FF
; = > THAN...
; OK IF SHOULD BE START THEN
    EXX
    LD   A,B        ;CHECK BIT CELL = START BIT?
    EXX
    AND  A
    JR   NZ,COLLECT
    LD   A,E
    AND  01         ;SHOULD BE ZERO!
    JR   Z,SKIP
; FORCE SO ALWAY LOOK
```

```
        LD      C,3     ;MAX NUMBER...
        JR      KEEPLK
COLLECT:
        LD      A,E
        RRA             ;SHOULD BE 1 OR 2...
        RR      D       ;ROLL CARRY INTO LSB OF D REG
; SEE IF BYTE IS COMPLETE?
SKIP:
        LD      A,D
        EXX
        LD      C,A             ;SAVE CHARACTER
        INC     B
        LD      A,B
        CP      NUMBITS+1 ;NUMBER OF BITS + 1
        JR      C,KPLK
        LD      B,0
        LD      A,C
        LD      (HL),A
        CP      0FFH            ;SEE IT FF
        JR      NZ,NPE
        INC     D
        LD      A,D
        CP      3               ;3 FF'S IN A ROW..
        JR      C,NEXITM ;NOT 3 DON'T EXIT
; OK ALL DONE DOWN LOADING...
        JR      DOEXIT          ;DO EXIT ROUTINE

NPE:
        SUB     A
        LD      D,A     ;RESET FF COUNTER
NEXITM:
        INC     L
KPLK:
        EXX
        JP      KEEPLK
DOEXIT:
        CALL    CLRSCRN         ;CLEAR SCREEN
        LD      HL,804H  ; MIDDLE OF SCREEN
;       LD      L,4
        LD      (CURSOR),HL
        LD      HL,DOWNLOAD
        CALL    LINEOUT
        JP      BEGIN
;
;***************************************************************
; SUBROUTINE TO PUT OUT LINE OF INFORMATION
; POINTED TO BY (CURSOR)
; HL POINTS TO DATA.
; A AND HL ARE DESTORIED.
;***************************************************************
LINEOUT:
        LD      A,(HL)
        CP      0FFH
        RET     Z               ;RETURN IF 0FFH
        RST     OUTCH
        INC     HL
        JR      LINEOUT
```

```
CHKCYC:
      CALL  GETCYC         ; THIS CALL IS USED TO GET ACTUAL TIME
      JR    C,LSTCAR       ; IF WAVE DURATION IS TOO LONG THEN LOST
      LD    A,B
      CPL                  ; COMPLIMENT FOR COUNT
      CP    A,MINCYC
      JP    C,LSTCAR       ; IF WAVE DURATION SAYS TOO SHORT THEN LOST
      CP    A,MAXCYC
      JP    NC,LSTCAR      ; IF WAVE DURATION SAYS TOO LONG THEN LOST
      AND   A              ; CLEAR CARRY IF ALL IS WELL
      RET
LSTCAR:
      SCF
      RET

;*****************************************************************
;*                                                               *
;*    GETCYC:   GET CYCLE TIME                                   *
;*    ENTERED: NO DATA BUT MUST SHORTLY FOLLOW FALLING EDGE      *
;*    RETURNS: B reg =  (&HFF-COUNT) IF THE CARRY IS CLEAR       *
;*             CARRY WILL BE SET IF B = 0                        *
;*                                                               *
;*    THIS ROUTINE MEASURES THE TIME FROM ENTRY TO THE           *
;*    FALLING EDGE OF THE MODEM SIGNAL                           *
;*                                                               *
;*    IT MUST BE CALLED SHORTLY AFTER A FALLING EDGE             *
;*    IN ORDER TO BE ACCURATE                                    *
;*****************************************************************
;
GETCYC:
      LD    B,0
 WTRISE:
      IN    A,(BUFFER)
      AND   10H
      JR    NZ,WTFALL
      DJNZ  WTRISE
      JP    NOCARR
 WTFALL:
      IN    A,(BUFFER)
      AND   10H
      JR    Z,FINCYC
      DJNZ  WTFALL
      JP    NOCARR
 FINCYC:
      AND   A
      RET
 NOCARR:
      SCF
      RET ;****************************津
;****************************
; SET NAME
;****************************
;****************************
SETNAMS:
      PUSH  BC
```

```
        LD    BC,PNAM         ;PITCHERS NAMES
        LD    DE,(SPITCH)     ;START OF PITCHERS
        AND   A
        SBC   HL,DE
        JR    NC,INA

LD    HL,(PLAYER)
        LD    BC,NPNAM
INA:
        PUSH  BC
        POP   DE
        POP   BC
        JR    TXTDCH
SPOOLER:
; ENTER WITH HL = NUMBER
        LD    DE,BEGIN   ;CRUNCHED PLAYERS NAMES
TXTDCH:
        LD    C,0
NSPLYER:
        LD    A,H
        OR    L
        JR    Z,DECOM
        DEC   HL         ;NEXT PLAYERS NAME
        LD    A,(DE)            ;GET BYTE NAME LENGTH
        AND   0FH
        ADD   A,E        ;ADD TO CURRENT NAME
        LD    E,A
        JR    NC,NSPLYER
        INC   D
NIDE:
        JR    NSPLYER
DECOM:
; OK POINT HL TO BUFFER
;     SCREEN:
; DE POINTS TO DATA TO BE DECRUNCHED
; HL SCREEN            ;POINT TEXT TO SCREEN
        LD    A,(DE)
        AND   0FH   ;LENGTH OF TEXT
        ADD   A,E
        LD    B,A   ;SAVE END OF LIST
        LD    C,1

; DE-COMPRESS TEXT POINTED TO BY DE
; INTO BUFFER POINTED TO BY HL
; FOR LENGTH B
;
; RULES
; MOST FREQUENT LETERS
; A,D,E,H,I,L,N,O,R,T,S,U
; NUMBER ASSIGNMENTS
; 0 1 2 3 4 5 6 7 8 9 A B
; C - ESCAPE INTO OTHER CHARACTERS
; D - ESCAPE INTO NUMBERS
; E - ESCAPE INTO OTHER SYMBOLS
; WHERE ESCAPE "C"
; B,C,F,G,J,K,M,P,Q,V,W,X,Y,Z, , ,
; 0,1,2,3,4,5,6,7,8,9,A,B,C,D,E,F
; WHERE ESCAPE 'D'
; 0,1,2,3,4,5,6,7,8,9,:,;,<,=,>,?
; 0,1,2,3,4,5,6,7,8,9,A,B,C,D,E,F
```

```
; WHERE ESCAPE 'E'
;    ,!,",#,$,%,&,',(,),*,+,,,-,.,/
DELOOP:
      LD    HL,BASEL   ;BASE CHARACTER
      CALL  GETDCHR            ;GET CHARACTER FROM COMPRESSION
      CP    LOW(ESCC-BASEL)              ;RANGE OF BASE STUFF
      JR    NC,OTHSET ;ESCAPE FUNCTION >
GIVE:
      RST   CONV ;ADD TO BASE
      LD    A,(HL)     ;GET VALUE
      BIT   1,C  ;DETERMINE IF RETURN OR NOT
      RET   NZ
      RST   OUTCH      ;PUT THE STUFF TO THE SCREEN
      LD    A,E
      CP    B
      JR    NZ,DELOOP
      RET
OTHSET:
      SUB   LOW(ESCC-BASEL)              ;WHICH ONE?
; 0,1,2,3
      ADD   A,A        ;MULT BY 2
      LD    HL,GTBLP   ;GET LIST OF OPTIONS
      RST   CONV       ;CONVERT IT. ADD  TO BASE VAUE
      LD    A,(HL)              ;GET NEW TABLE ADDRESS LOW
      INC   HL
      LD    H,(HL)              ;GET NEW TABLE HIGH ADD
      LD    L,A
      CALL  GETDCHR             ;GET NEXT NIBBLE
      JR    GIVE
GTBLP:
      DW    ESCC
      DW    ESCD
      DW    ESCE
GETDCHR:
      LD    A,(DE)
      BIT   0,C  ;SEE IF TOPHALF, OR BOTTOM
      JR    Z,BOTHALF
      RES   0,C
      RRA
      RRA
      RRA
      RRA
      INC   DE
      JR    HALF
BOTHALF:
      SET   0,C
HALF:
      AND   0FH  ;LOWER NIBBLE
      RET
BASEL:
      DB    041H,044H,045H,048H,049H,04CH,04EH
      DB    04FH,052H,054H,053H,055H,020H
ESCC:
      DB    042H,043H,046H,047H,04AH,04BH,04DH,050H
      DB    051H,056H,057H,058H,059H,05AH,00DH,020H
ESCD:
      DB    030H,031H,032H,033H,034H,035H,036H,037H
      DB    038H,039H,03AH,03BH,03CH,03DH,03EH,03FH
ESCE:
      DB    021H,027H,023H,040H,024H,025H,026H,027H
```

```
        DB      028H,029H,02AH,02BH,02CH,02DH,02EH,02FH
;BASEL:
;       DB      'ADEHILNORTSU '
;ESCC:
;       DB      'BCFGJKMPQVWXYZ'
;       DB      CR,' '
;ESCD:
;       DB      '0123456789:;<=>?'
;ESCE:
;       DB      '!"#$%&()*+,'
;       DB      '-./'

; ENTER WITH NUMBER IN HL
; DE WITH THE NUMBER TO DIV BY
; RESULT IS HL REMAINER
; A = ASCII HOPEFULLY 0-9
; BIT 0 OF B SET WILL CHECK FOR '0' AND IF Z THEN SPACE
BCDCONV:
        LD      A,'0'
LP1000:
        AND     A
        SBC     HL,DE
        JR      C,IW1000
        INC     A
        JR      LP1000
IW1000:
        ADD     HL,DE
        CP      '0'             ;CHECK IF ZERO
        JR      NZ,SETB0        ;NOPE DISPLAY IT
        BIT     0,B
        JP      NZ,OUTCH        ;DISPLAY ALL ZERO
        LD      A,' '           ;DISPLAY SPACE INSTEAD
        JP      OUTCH
SETB0:
        LD      B,1             ;ALL ZERO AFTER WILL DISPLAY
        JP      OUTCH

;*** DATABASE NEED TO CHANGE THIS PROGRAM...
;       CONSTANTS CHANGE....
MSKOFF:
; ENTER WITH LEAGUE
;RETURNS STANDINGS IN LEAGUE
        PUSH    HL      ;SAVE HL
        LD      HL,MLLEN+2      ;START OF OTHER DIVISION
        SUB     (HL)    ;SNLE    ;STRT NAT. EST
        JR      NC,INATL
        ADD     A,(HL)  ;SNLE
        DEC     HL
        SUB     (HL)    ;SALW
        JR      NC,EPOP ;RET NC
APOP:
        ADD     A,(HL)
EPOP:
        POP     HL
        RET
INATL:
```

```
        ADD   A,(HL)
        INC   HL
        SUB   (HL)
        JR    NC,EPOP
        ADD   A,(HL)
        DEC   HL
        SUB   (HL)
        JR    EPOP
;       SUB   SNLW-SNLE  ;STRT NL WEST
;ADD A,(HL)
;
;       RET   NC
;       ADD   SNLW-SNLE
;       RET
GETLEND:
;*** DATABASE NEED TO CHANGE THIS PROGRAM...
        LD    HL,MLLEN+1    ;POINTS TO END OF LEAGUE
        JR    EELEG
GETLEAL:
;*** DATABASE NEED TO CHANGE THIS PROGRAM...
        LD    HL,LEGLENS    ;LENGTH OF LEAGUE/DIVISION
EELEG:
;*** DATABASE NEED TO CHANGE THIS PROGRAM...
        LD    A,(LEAGUE)
GETLEN:
        PUSH  HL
        LD    HL,MLLEN+2
        CP    (HL) ;SNLE    ;START OF NATIONAL LEAGUE
        JR    NC,INAT
        DEC   HL
        CP    (HL) ;SALW
        JR    C,EPOP
;       RET   C
BPOP:
        POP   HL
        INC   HL
        RET
INAT:
        POP   HL
        INC   HL
        INC   HL
        PUSH  HL
        LD    HL,MLLEN+3    ;SNLW
        CP    (HL) ;SNLW
        JR    C,EPOP
        JR    BPOP
;
;       INC   HL
;       RET
;KEY  DS    1
; ACTIVE LOW SENSE
;0 - UP
;1 - DOWN
;2 - LEFT
;3 - RIGHT
;4 - F1
;5 - F2
;6 - F3
;7 - F4
;KCHNG    DS    1
```

; INTERRUPT WRITTEN ABOVE

```
;KEY   DS    1
; ACTIVE LOW SENSE
;0 - UP
;1 - DOWN
;2 - LEFT
;3 - RIGHT
;4 - F1
;5 - F2
;6 - F3
;7 - F4
;KCHNG  DS   1
; INTERRUPT WRITTEN ABOVE
WAITKEY:
WFKEY:
       LD    A,(KHIT)
       XOR   0FFH
       LD    B,A
       JR    NZ,GKEY
       LD    A,(KCHNG)
       AND   A
       JR    Z,WFKEY
   OK GOT A KEY IS IT ACTIVE
       LD    B,A
       SUB   A
       LD    (KCHNG),A

LD    A,(KEY)
       AND   B
       JR    NZ,WAITKEY       ;NOPE NOT ACTIVE
       LD    A,(KEY)
       XOR   0FFH
       AND   B
SOUT:
       RL    A
       JR    NC,SOUT
       AND   A                ;SHOULD BE ZERO NOW..
       JR    NZ,WAITKEY       ;MORE THAN ONE KEY ERROR

GKEY:
       LD    A,B
       LD    (ACC),A          ;OK SAVE KCHNGE
       SUB   A
       LD    (KCHNG),A
       DEC   A
       LD    (KHIT),A         ;CLEAR KEY

JP    MAIN
GOTO:
       LD    A,(DE)           ;GET LOW BYTE
       LD    L,A
       INC   DE
       LD    A,(DE)
       LD    H,A
       LD    (POINTER),HL     ;MODIFY POINTER
       JP    MAIN
WAITSEC:

LD    A,(DE)           ;GET NUMBER OF BYTES
```

```
                            ;INC TO NEXT COMMAND
        INC   DE
        LD    (POINTER),DE
        LD    B,A
WAITS:
; GET NUMBER OF SECONDS TO WAIT FOR
        SUB   A
        LD    (HERTZ),A  ;HERTZ COUNTS 1/50 SEC
W50TH:
        LD    A,(KHIT)
        XOR   0FFH
        LD    C,A
        JR    Z,NKHIT
        SUB   A
        LD    (KCHNG),A
        DEC   A
        LD    (KHIT),A

JP    MAIN
NKHIT:
        LD    A,(KCHNG)
        AND   A
        JR    Z,NGBL

LD    C,A

SUB   A
        LD    (KCHNG),A

LD    A,(KEY)
        AND   C
        JP    Z,MAIN

SUB   A
        LD    (KCHNG),A  ;CLEAR KEY.
NGBL:
        LD    A,(HERTZ)
        CP    50
        JR    C,W50TH

DEC   B          ;1 SEC
        JR    NZ,WAITS
        JP    MAIN

THENIF:
        LD    A,(ACC)
        LD    B,A
        LD    A,(DE)
        INC   DE         ;POINT TO ADD
        LD    (POINTER),DE
        CP    B
        JR    Z,GOTO
        INC   DE
        INC   DE
        LD    (POINTER),DE
        JP    MAIN

CLRSCREN:
        CALL  CLRSCRN
        LD    DE,(POINTER)
```

```
        LD    A,(DE)
        LD    (KMASK),A
        INC   DE
        LD    (POINTER),DE
        LD    (KMASK),A    ;MASK OFF KEYS
        JP    MAIN
CALLSUB:
        LD    A,(DE)
        LD    L,A
        INC   DE
        LD    A,(DE)
        LD    H,A
        INC   DE
        LD    (POINTER),DE
        JP    (HL)         ;SAME AS GOTO BUT?? DOESN'T
                           ;CHANGE POINTER
PUTEAM:
; FIRST WHICH WAS SELECTED
NGOTA:
        LD    A,(WLEAGUE)
;*** DATABASE NEED TO CHANGE THIS PROGRAM...POINTER INTO RAM.
        LD    DE,TEAMNAMES   ;POINTER TO CRUNCHED TEXT
        LD    L,A   ;HL COUNT
        LD    H,0
        CALL  TXTDCH         ;SEND THAT STUFF OUT
        JP    MAIN

PUTTEAMS:
;*** DATABASE NEED TO CHANGE THIS PROGRAM...
        LD    C,0   ;MAX
; ONLY PUT UP 3 @ ONE TIME
TELOP:
        CALL  GETLEND        ;HL POINTS TO END OF LEAGUE

LD    A,(LEAGUE)
        NEG
        ADD   A,(HL)
        DEC   A
        JR    NZ,NONE   ;NOT ONE.

CALL  DOCR
; CHECK IF THIS IS POINTING TO  6
NONE:
        LD    A,(LEAGUE)
; MASK OFF NAT OR EAST WEST
        CALL  MSKOFF
        AND   07H            ;ASSUMING < 8 TEAMS
        ADD   A,C
        ADD   A,'1'
        RST   OUTCH
        LD    A,'.'
        RST   OUTCH
        LD    A,' '
        RST   OUTCH

LD    A,(LEAGUE)
        ADD   A,C
        LD    L,A
```

```
        LD    H,0
;*** DATABASE NEED TO CHANGE THIS PROGRAM...
        LD    DE,TEAMNAMES
        PUSH  BC
        CALL  TXTDCH

POP   BC

CALL  DOCR          ;DO CARRAIGE RETURN

INC   C             ;R WE DONE?
        LD    A,3
        CP    C
        JP    Z,BOTLIN      ;DONE BOTTOM LINE

CALL  GETLEND
        LD    A,(LEAGUE)
        ADD   A,C
        SUB   (HL)  ;HL POINTS TO START OF NEXT LEAGUE
        JR    NZ,TELOP
BOTLIN:
; IF 3 ENTER NORM
; IF 2 ENTERY SPLIT
; IF 1 ENTERY MIDDLE
        CALL  GETLEND              ;GET START OF NEXT LEAGUE

; @ LEAST 1 2 OR 3

LD    A,(LEAGUE)     ;CURRENT POSITION
        NEG
        ADD   A,(HL)
        DEC   A
        JR    NZ,CTWO
; SPECIAL CASE..

SUB   A
        LD    (CHOICE),A
        LD    BC,0D07H   ;MIDDLE OF SCREEN
        LD    (CURSOR),BC
        LD    A,(LEAGUE)
        CALL  MSKOFF
        ADD   A,'1'
        RST   OUTCH
        JP    MAIN
CTWO:
        DEC   A
        JR    NZ,NSPIC1
        LD    A,1
        LD    (CHOICE),A
; SPLIT SCREEN....
        LD    BC,0007H
        LD    (CURSOR),BC
        LD    A,(LEAGUE)
        CALL  MSKOFF
        LD    D,A
        ADD   A,'1'
        RST   OUTCH
        LD    BC,1A07H   ;END OF SCREEN
        LD    (CURSOR),BC
```

```
        LD      A,D
        ADD     A,'2'
        RST     OUTCH
        JP      MAIN

NSPIC1:
        LD      A,2
        LD      (CHOICE),A
        LD      BC,0007H
        LD      (CURSOR),BC
        LD      A,(LEAGUE)
        CALL    MSKOFF
        LD      D,A
        ADD     A,'1'

RST     OUTCH

LD      BC,0D07H        ;MIDDLE OF SCREEN
        LD      (CURSOR),BC
        LD      A,D
        ADD     A,'2'
        RST     OUTCH

LD      BC,1A07H        ;END OF SCREEN
        LD      (CURSOR),BC
        LD      A,D
        ADD     A,'3'
        RST     OUTCH
        JP      MAIN

DOCR:
        SUB     A
        LD      (REVID),A       ;CLEAR REVERSE VIDEO MASK
        LD      HL,(CURSOR)
        INC     L
        BIT     3,L
        JR      Z,CLDCR
        LD      L,0             ;ROLLED OVER THE BOTTOM
CLDCR:
        LD      H,0
        LD      (CURSOR),HL
        RET

CARRIAGE:
                ; B = X CHARACTER POSITION (0-19)
                ; C = Y LINE NUMBER 0-7
        CALL    DOCR
        JP      MAIN

SETALNL:
        LD      A,(MLLEN+2)     ;SNLE            ;START OF NATIONAL LEAGUE
ALOG:
        LD      (LEAGUE),A
        SUB     A
        LD      (ROSTOFF),A     ;OFFSET INTO ROSTERS
        JP      MAIN
CLRALNL:
        LD      A,(MLLEN) ;SALE      SUB  A
        JR      ALOG
```

```
PUTUPALNL:
;*** DATABASE NEED TO CHANGE THIS PROGRAM...
    LD   HL,TEXTAL
    PUSH HL
    LD   HL,MLLEN+2
    LD   A,(LEAGUE)
    CP   (HL)
    POP  HL           ;SNLE              ;<<
    JR   C,UNAT       ;UP AMERICAN LEAGUE
    LD   HL,TEXTNL
UNAT:
    LD   A,(HL)
    AND  A
    JP   Z,MAIN
    RST  OUTCH
    INC  HL
    JR   UNAT
SETETWT:
    PUSH HL
    LD   HL,MLLEN+2
    LD   A,(LEAGUE)
    CP   (HL) ;SNLE                      ;<<
    POP  HL
    JR   C,IAMC
    LD   A,(MLLEN+3)    ;SNLW            ;<<
    JR   ALOG
IAMC:
    LD   A,(MLLEN+1)   ;    LD   A,SALW  ;<<
    JR   ALOG
CLRETWT:
    PUSH HL
    LD   HL,MLLEN+2
    LD   A,(LEAGUE)
    CP   (HL) ;SNLE                      ;<<
    POP  HL
    JR   C,IAMC2
    LD   A,(MLLEN+2)    ;SNLE            ;<<
    JR   ALOG
IAMC2:
    LD   A,(MLLEN) ;    SUB  A
    JR   ALOG

PUTUPETWT:
;*** DATABASE NEED TO CHANGE THIS PROGRAM...
    LD   HL,TEXTEAST
    PUSH HL
    LD   HL,MLLEN+2
    LD   A,(LEAGUE)
    CP   (HL) ;SNLE                      ;<<
    JR   NC,INATLL
    DEC  HL
    CP   (HL) ;SALW                      ;<<
    POP  HL
    JR   C,UNAT
UWST:
    LD   HL,TEXTWEST
    JR   UNAT
INATLL:
    INC  HL
```

```
        CP      (HL)    ;SNLW
        POP     HL
        JR      C,UNAT
        JR      UWST

SMAIN:
        LD      HL,START
        LD      (POINTER),HL
        SUB     A
        LD      (KCHNG),A
        DEC     A
        LD      (KHIT),A        ;CLEAR KEY HIT FLAG FROM OUTCHR
MAIN:
        LD      DE,(POINTER)
        LD      A,(DE)          ;GET CHARACTER
        INC     DE
        LD      (POINTER),DE

LD      HL,MDLST
        LD      BC,ECMDLST-CMDLST
        CPDR
        JR      Z,GOTS

RST     OUTCH           ;SEND CHARACTER

JR      MAIN
GOTS:
; INC POINTER
        LD      A,C
        ADD     A,A             ;MULT BY 2

LD      HL,COMADD
        RST     CONV            ;GET JUMP TABLE VALUE

LD      A,(HL)
        INC     HL
        LD      H,(HL)
        LD      L,A

JP      (HL)            ;GOTO...

CMDLST:
        DB      '@$>+?*'
MDLST:
        DB      CR
ECMDLST:
COMADD:
        DW      GOTO
        DW      WAITSEC
        DW      THENIF
        DW      CLRSCREN
        DW      WAITKEY
        DW      CALLSUB
        DW      CARRIAGE
```

```
;****************************************
;****************************************
;****************************************
MULTPLY:
;****************************************
;****************************************
;****************************************
; 16*16 = 32 BIT RESULT
; HL * BC
; RESULTS => TMP3,2,1,0    +3=MSB,0=LSB
; USES   TMP (0,1,2,3   ,4,5,6,7)
;CLEAR MEMORY
      PUSH HL
; TMP LSB     OR 4
; TMP+1 MID      5
; TMP+2 MSB      6
; CLEAR MEMORY
      LD    HL,0
      LD    (TMP),HL
      LD    (TMP+2),HL
      LD    (TMP+4),HL
      LD    (TMP+6),HL

POP   HL

LD    (TMP+4),HL      ;SAVE VALUE

DMLT:
      SRL   B
      RR    C     ;SHIFT RIGHT
      JR    NC,NOADD

LD    HL,(TMP)
      LD    DE,(TMP+4)
      ADD   HL,DE
      LD    (TMP),HL
      LD    HL,(TMP+2)
      LD    DE,(TMP+6)
      ADC   HL,DE
      LD    (TMP+2),HL
NOADD:
      LD    DE,(TMP+6)
      LD    HL,(TMP+4)
; MULT * 2
      SLA   L
      RL    H
      RL    E
      RL    D
      LD    (TMP+6),DE
      LD    (TMP+4),HL

LD    A,B
      OR    C
      JR    NZ,DMLT

RET
```

```
;*******************************************
;*******************************************
;*******************************************
DIVIDE:
;*******************************************
;*******************************************
;*******************************************
;   VERY DIRTY...

; IY,IX CLEAN
; BC,HL,DE,AF DIRTY
; 32 BIT / 16 BIT
; WHERE 24 BIT = TMP(3,2,1,0) MSB , LSB
; HL = 16 BIT
; MEMORY
; TMP (3,2,1,0) = DIVSOR
; TMP (4,5,6,7) = HL*FACTOR
; TMP (8,9) FACTOR
; TMP (10,11) RESULT
;
;   RETURN ZERO IF ERROR!!!!!
;
      LD    A,L         ;TEST IF DIVIDE BY ZERO...
      OR    H
      RET   Z           ;RETURN IF ZERO

LD    (TMP+4),HL  ;4,5,6,7

LD    DE,0
      LD    (TMP+10),DE ;CLEAR RESULT
      LD    (TMP+6),DE

INC   DE          ;SET TO 1
      LD    BC,0
;
; MULT BY 24 OR 16 BITS..
;   *16 BITS OR
;
LOOPD:
      SLA   E           ;SHIFT THOSE BABY UP TO MAX.
      RL    D
; IF CARRY IS SET HERE WE MAXED OUT...
      JR    C,ALDN      ;ALL DONE. NOW!!!! MORE THAN 16 SHIFTS..

ADD   HL,HL
      RL    C
      RL    B

JP    M,WDNE      ;WE'RE DONE.

JR    LOOPD

ALDN:
      RR    D           ;DE,8000H
WDNE:
      LD    (TMP+4),HL  ;SAVE RESULTS
      LD    (TMP+6),BC
      LD    (TMP+8),DE  ;SAVE NUMBER
```

```
DLOOP:
       LD    HL,(TMP)     ;IS TMP-(TMP+3*FACTOR)
       LD    DE,(TMP+4)
       AND   A
       SBC   HL,DE        ;< RESULTS

PUSH HL     ;SAVE RESULTS

LD    HL,(TMP+2)
       LD    DE,(TMP+6)
       SBC   HL,DE
       JR    C,NSHFT      ; TMP+3*FACTOR IS >

LD    (TMP+2),HL
       POP   HL
       LD    (TMP),HL

LD    HL,(TMP+8)   ;GET VALUE

LD    DE,(TMP+10)
       ADD   HL,DE
       LD    (TMP+10),HL
       JR    NBALN        ;SKP POP
NSHFT:
       POP   HL           ;BALANCE STACK
NBALN:
       LD    HL,(TMP+4)
       LD    DE,(TMP+6)
       SRL   D
       RR    E
       RR    H
       RR    L
       LD    (TMP+6),DE
       LD    (TMP+4),HL
;
       LD    HL,(TMP+8)
       SRL   H
       RR    L
       LD    (TMP+8),HL

LD    A,L
       OR    H
       JR    NZ,DLOOP

LD    HL,(TMP+10)
       LD    A,1
       AND   A            ;NZ
       RET

POOP

;      ORG  4000H
; SUBROUTINES WITH TO SUPPORT TEXT...

; FN3- USED IN SCRN16,INITIALIZES (FLAG)
FN3:
```

```
        LD    A,(ACC)
        CP    FUN3
        JP    NZ,MAIN      ;RETURN
        LD    A,(FLAG)
        RES   SEL,A
        RES   SHOW,A
        LD    (FLAG),A
        LD    HL,SCRN20
        LD    (POINTER),HL
        JP    MAIN

; PUTFACT - PUTS UP FRACTION AS SHOWN BELOW
;    USED TO CALULATION OF ERA,BA,W%
PUTFACT:
; DATA IN HL, PUT UP AS 1.XXX
        SRL   H
        RR    L
        JR    NC,KEEP
; ROUND UP.....
        INC   HL
KEEP:
        LD    B,0          ;WILL NOT DISPLAY ZERO'S.
; RETURNS PERCENT IN HL
KEEPS:
        LD    DE,1000       ;HL CONTAINS NUMBER
                            ;DE / 1000
                            ;RETURNS HL REMAINER B = ASCII
                            ;NUMBER

CALL  BCDCONV

LD    B,1           ;BIT 0 NON-ZERO WILL DISPLAY ZERO'S

LD    A,'.'
        RST   OUTCH

LD    DE,100
        CALL  BCDCONV
        LD    DE,10
        CALL  BCDCONV
        LD    A,L
        ADD   A,'0'
        JP    OUTCH

;**DATABASE WILL CHANGE THIS CODE.
;PUTTSND - PUT UP TEAM STANDINGS.. ASSUMES WE DON'T OVERFLOW
;             TO NEXT SCREEN!!!!!
;FORMAT OF LINE IS AS FOLLOWS
;'CITYSS XX    XX   .XXX    XXX'

PUTTSND:
        CALL  GETLEAL       ;GET LEAGUES LENGTH
        LD    E,(HL)        ;TOTAL NUMBER OF TEAMS IN LEAGUE
        LD    C,0           ;LOOP COUNTER
```

```
        LD    A,(MLLEN+1)    ;SALW           ;<<
        CP    E
        JR    Z,PTSND        ;FULL SCREEN AMERICAN LEAGUE
; E TOTAL NUMBER IN LOOP
        CALL  DOCR           ;ALL LINE
; C LOOP COUNTER

PTSND:
        CALL  GETLEND        ;POINTS TO END OF LEAGUE
; HL POINTS OF OFFSET BYTE
        DEC   HL             ;OFFSET INTO LEAGUE..
; E CONTAINS NUMBER OF TEAMS
; HL POINTS TO TEAM NUMBER
        LD    A,(HL)         ;OFFSET INTO LEAGUE
; BEGINNING OF LIST
; OFFSET OF LEAGUE
        ADD   A,C            ;GET TEAM IN LIST

LD    HL,TSTND       ;TEAM STANDINGS
        RST   CONV           ;OFFSET INTO TEAM

LD    A,(HL)         ;GOT TEAM

LD    D,A            ;SAVE THE MOTHER
; GO THE TEAM NAME...
; MULT BY 3 TO GET NAME
        ADD   A,A
        ADD   A,D            ;MULT BY 3

LD    HL,LEG         ;3 DIGIT TEXT FOR LEAGUE
        RST   CONV

LD    B,3            ;THREE CHARACTER
STO:
        LD    A,(HL)
        RST   OUTCH          ;3 CHARACTER TEAM NAME
        INC   HL
        DJNZ  STO

LD    B,2
        CALL  SPCS
; GET WIN'S
        LD    A,D

LD    (TMP),A        ;TEAM NUMBER SAVED IN TMP

ADD   A,A

LD    HL,GAMSTND     ;WIN/LOSES
        RST   CONV

LD    A,(HL)         ;WINS

CALL  DSP100

LD    B,2
        CALL  SPCS
```

```
        INC   HL
        LD    A,(HL)          ;LOSES
        CALL  DSP100

LD    B,2
        CALL  SPCS            ;PCT

PUSH  HL              ;POINTING TO LOSES
        PUSH  DE
        PUSH  BC

LD    A,(TMP)
        CALL  GETPER
        CALL  PUTFACT

POP   BC
        POP   DE
        POP   HL

LD    B,2
        CALL  SPCS

LD    A,C
        AND   A
        JR    NZ,CALGB

LD    A,(HL)          ;GET WINS
        LD    (LOSES),A
        DEC   HL
        LD    A,(HL)
        LD    (WINS),A
DASHIT:
        LD    A,' '
        RST   OUTCH

LD    B,2
WDO:
        LD    A,'-'
        RST   OUTCH
        DJNZ  WDO

JR    EGB
CALGB:
; HL POINTS TO LOSES
        DEC   HL              ;POINT TO WINS

; WINS - OTHERGUYS WINS + OTHERGUYS LOSES - LOSES

LD    A,(WINS)    ;WINS
        SUB   (HL)        ;- OTHERGUYS LOSES
        INC   HL          ;GOTO LOSES
        ADD   A,(HL)          ;ADD OTHERGUYS LOSES
        LD    B,A         ;SAVE IT
        LD    A,(LOSES)   ;GET LOSES
        NEG               ;COMPLEMENT
        ADD   A,B         ;ADDIT.  SAME AS SUBTRACT LOSES
        JR    Z,DASHIT
```

```
        PUSH AF      ;SAVE IT

SRL  A            ;DIVIDE BY 2
        CALL DSP100
        POP  AF
        AND  01H          ;CHECK FOR HALF GAME
        JR   Z,EGB
        LD   A,HALFCHAR        ;IT'S HAVE
        RST  OUTCH             ;1/2 CHARACTER...
        JR   EGBB
EGB:
        CALL DOCR
EGBB:
        INC  C
        LD   A,C
        CP   E
        JP   NZ,PTSND

LD   HL,WKY19A
        LD   (POINTER),HL
        JP   MAIN
DSP100:

; D,A ,B  DISTORYED

LD   D,00
DP100:
; D,A,B DISTORYED

CALL DIV100   ;DIV BY 100 DISPLAY IT
DP10:
        CALL DIV10    ;DIV BY 10 DISPLAY
        ADD  A,'0'
        JP   OUTCH
DSP10:
        LD   D,0
        JR   DP10

SPCS:
        LD   A,' '
        RST  OUTCH
        DJNZ SPCS
        RET

DIV100:
        LD   B,100
        JR   DV1
DIV10:
        LD   B,10
DV1:
        PUSH AF
        LD   A,D
        AND  80H
        OR   '0'
        LD   D,A
        POP  AF
DV2
        SUB  B
```

```
        JR      C,NIN
        SET     7,D     ;SET FLAG TO DISPLAY DATA.
        INC     D
        JR      DV2
NIN:
        ADD     A,B
        PUSH    AF
        LD      A,D
        CP      '0'     ;IS IT ZERO
        JR      Z,OKSPC
        AND     7FH
        RST     OUTCH
        POP     AF
        RET
OKSPC:
        LD      A,' ';
        RST     OUTCH
        POP     AF
        RET

BITSET  EQU     08H
BITCLR  EQU     00H

;TEST BASED PROCESSOR

;+= END OF TEXT
;   KEY MASK BIT.. IF KEY HIT WHILE WAITING IT'S ABORTED
;
;?= WAIT FOR KEY WITH ACC = DATA
;>xx TEST IF ACC = xx WHERE XX = HEX NUMBER
;@= GOTO NEXT ADDRESS
;   DW ADDRESS
;$= WAIT
; DB XX ; WHERE XX = NUMBER OF SECONDS
;*= GOTO ASSEMBLY CODE POINTED TO BY NEXT TWO BYTES
;   DW XX
START:
        DB      '+'
        DB      0       ;DISABLE ALL KEYS...

DB      '          WELCOME TO'
        DB      CR

DB      CR
        DB      '           BASEBALL'
        DB      CR

DB      CR
        DB      '           STATISTICS'
        DB      CR

DB      CR

DB      CR
        DB      '     LAST UPDATE 04/25/89'

DB      '$'     ;TIME OUT FOR
        DB      1       ;10 SECONDS
```

```
        DB      '+'
        DB      0       ;DISABLE ALL KEYS...

DB      '      THE SILVER BULLET'
        DB      CR

DB      CR
        DB      '       WON'
        DB      2CH
        DB      'T SLOW YOU DOWN'
        DB·     CR

DB      CR
        DB      '      COORS LIGHT IS THE'
;       DB      CR
        DB      CR
        DB      '     RIGHT BEER FOR NOW!'
;       DB      CR

;       DB      CR
;       DB      '    LAST UPDATE 04/25/89'

DB      '$'     ;TIME OUT FOR
        DB      1       ;10 SECONDS

SCRN01:
        DB      '+'

DB      FUN1+FUN2+FUN3+CURDWN   ;ABLE ONLY THESE KEYS
;       DB      0FFH ;ENABLE ALL KEYS   ;CLEAR SCREEN

DB      '        PLEASE SELECT       ',CRDWN
;       DB      CR

DB      CR
        DB      '      1. PLAYER STATS'
        DB      CR
        DB      '      2. INFORMATION'
        DB      CR
        DB      '      3. TEAM STANDINGS'
        DB      CR

DB      CR

DB      CR
        DB      '1             2             3'
; WAIT FOR KEY....
WKY01:
        DB      '?'     ;WAIT FOR KEY
; IS IT FUNCTION 1
        DB      '>'
        DB      FUN1    ;THEN GOTO
        DW      SCRN20                  ;NEEDS PROCESSING..???
; IS IT FUNCTION 2
        DB      '>'
        DB      FUN2 ;02        ;IF THEN GOTO
        DW      TBD     ;???
; IS IT FUNCTION 3
```

```
        DB      '>'
        DB      FUN3    ;IF THEN GOTO
        DW      SCRN18
; CURSOR DOWN
        DB      '>'
        DB      CURDWN
        DW      SCRN02      ;GOTO SCREEN 2

DB      '@'     ;GOTO
        DW      WKY01
TBD:
        DB      '+'
        DB      FUN4
        DB      '*'
        DW      INTINFO
INTINFO:
; NEED TO REUSED MEMORY ... LISTP ??
; INFORMATION SCREENS...
; PUT NEWS OUT

LD      A,(MLLEN+2)     ;START OF NL
        LD      B,A
        LD      HL,ALNEWS ;AL NEWS
        LD      A,(LEAGUE)      ;AL OR NL
        CP      B
        JR      C,YESNEW
        LD      HL,NLNEWS ;POINT TO NLNEWS
YESNEW:
;HL IS POINTING TO START OF NEW
; FIRST BYTE IS NUMBER OF PAGES
        LD      A,(HL)
        AND     A
        JR      NZ,NEWTODY      ;YES NEW FOR TODAY
REMAN:
        LD      HL,SCRN01 ;RETURN ADDRESS
        LD      (POINTER),HL
        JP      MAIN
NEWTODY:
        INC     HL
        LD      (TXTPTR),HL     ;SAVE TEXT START POINTER

LD      (PAGNUM),A      ;NUMBER OF PAGES
        SUB     A
        LD      (CURPAG),A
;
LOPPAG:
;
; PUTS OUT PAGE REQUESTED...
; PAGES ARE SET UP
        CALL CLRSCRN            ;CLEAR SCREEN

LD      A,(CURPAG)
        LD      C,FUN4
; OK DETERMINE K MASK
        AND     A
        JR      Z,NUP
        LD      C,FUN4+CURUP
NUP:
        INC     A
        LD      B,A
```

```
        LD    A,(PAGNUM)
        CP    1
        JR    Z,THATSIT  ;THATS IT
        CP    B
        JR    Z,THATSIT
        LD    A,C
        OR    CURDWN
        LD    C,A
THATSIT:
        LD    A,C
        LD    (KMASK),A

LD    DE,(TXTPTR)
        LD    A,(CURPAG)
        AND   A
        JR    Z,GOTSCRN
LOOA:
        PUSH  AF    ;SAVE A
; GO UNTIL WE SEE A '+'
NOTPLUS:
        SET   1,C
        CALL  DELOOP     ;GET CHARACTER
        CP    '+'
        JR    NZ,NOTPLUS    ;GO TO NEXT SCREEN
        POP   AF
        DEC   A
        JR    NZ,LOOA

GOTSCRN:
        SET   1,C
        CALL  DELOOP
        CP    '+'
        JR    Z,FINFO   ;FINISHED WITH INFO
        CP    CR
        JR    Z,DCRD
        CP    LF
        JR    Z,GOTSCRN ;NO LF'S
        RST   OUTCH
        JR    GOTSCRN
DCRD:
        CALL  DOCR
        JR    GOTSCRN

FINFO:
;
; PUT DATA OUT...
;
;
; OK DETERMINE WHERE THE CURSOR GOES..
        SUB   A
        LD    (CURSOR),A
        LD    A,25
        LD    (CURSOR+1),A
        LD    A,(CURPAG)
        AND   A
        JR    NZ,CHKUPD ;CHECK DOWN OR MAYBE UP/DWN
; COULD BE DWN PUT MUST CHECK CURPAG AGAIN PAGNUM
; SET UP KEY MASK ALSO
        LD    C,CRDWN    ;CURSOR DOWN CHARACTER
```

```
        LD     A,(PAGNUM)
        CP     1
        JR     NZ,YESCUR  ;MORE THAN 1 PAGE?
; NO THEN ONLY 1 PAGE.. DONE..
        LD     A,' '      ;ONLY 1 PAGE..
        JR     YESCUR
CHKUPD:
; OBVIOUSLY CAN HAVE UP
        LD     C,CRUP
        LD     B,A        ;CURRENT PAGE
        LD     A,(PAGNUM)
        INC    B
        CP     B
        JR     Z,YESCUR   ;ONLY UP
        LD     C,CRUPDN
YESCUR:

LD     A,C
        RST    OUTCH
CANGO:
        LD     HL,WNEW
        LD     (POINTER),HL
        JP     MAIN
WNEW:
        DB     '?'        ;WAIT FOR KEY
        DB     '*'
        DW     TWNEW
TWNEW:
; GOT A KEY
        LD     A,(ACC)
        CP     FUN4
        JP     Z,REMAN            ;RETURN
; CHECK CURUP
        CP     CURUP              ;CAN WE GO UP?
        JR     NZ,KNWDWN  ;NOT UP
; OK CURSOR UP
        LD     A,(CURPAG)         ;R WE @ 0?
        AND    A
        JR     Z,CANGO            ;CAN'T GO UP
        DEC    A
ECURP:
        LD     (CURPAG),A

JP     LOPPAG
KNWDWN:
        CP     CURDWN
        JR     NZ,CANGO   ;NOT DWN WAIT FOR NEXT KEY
        LD     A,(PAGNUM)
        LD     B,A        ;TOTAL NUMBER OF PAGES..
        LD     A,(CURPAG)
        INC    A
        CP     B
        JR     NC,CANGO   ;NOPE @ THE END...
        JR     ECURP

SCRN02:
        DB     '+'
        DB     FUN1+FUN2+FUN3+FUN4+CURUP   ;ABLE ONLY THESE KEYS
;       DB     0FFH ;ENABLE ALL KEYS  ;CLEAR SCREEN
```

```
        DB      '        PLEASE SELECT       ',CRUP
;       DB      CR

DB      CR
        DB      '      4. CATEGORY LEADERS'
        DB      CR
        DB      '      5. UPDATE'
        DB      CR
        DB      '      6. MY TEAM'
        DB      CR

DB      CR

DB      CR
        DB      '4             5             6'
WKY02:
        DB      '?'     ;WAIT FOR KEY

DB      '>'     ;IS IT?
        DB      CURUP      ;CURSOR UP
        DW      SCRN01     ;GO BACK TO SCREEN 1
        DB      '>'
        DB      FUN4
        DW      SCRN01     ;EXTRA RETURN..
        DB      '>'
        DB      FUN1
        DW      SCRN17            ;CATEGORY LEADERS
        DB      '>'
        DB      FUN2
        DW      UPDATE            ;GOTO UPDATE
        DB      '>'     ;IS IT?
        DB      FUN3    ;FUNCTION 2 WHICH IS REALLY 4?
        DW      MYTEAM     ;GOTO TRIVIA???
        DB      '@'     ;GOTO
        DW      WKY02      ;LOOP

SCRN16:
        DB      '+'
        DB      FUN4+FUN1+FUN2+FUN3 ;0FFH        ;ENABLE ALL KEYS
        DB      '       CURRENT SEASON'
        DB      CR

DB      CR

DB      ' 1. CATAGORY LEADERS'
        DB      CR
        DB      ' 2. PLAYERS'
        DB      CR
        DB      ' 3. PITCHERS'
        DB      CR

DB      CR

DB      CR
        DB      '1             2             3'
```

```
WKY16:
        DB      '?'

DB      '>'
        DB      FUN4
        DW      SCRN01          ;RETURN TO SCRN 1

DB      '>'
        DB      FUN1
        DW      SCRN17

DB      '>'
        DB      FUN2
        DW      SCRN18

DB      '*'
        DW      FN3             ;GOTO SUBROUTINE FN3

;       DB      '>'
;       DB      FUN3
;       DW      SCRN20

DB      '@'
        DW      WKY16

SCRN17:
        DB      '+'
        DB      FUN1+FUN3+FUN4  ;0FFH           ;ENABLE ALL KEYS
        DB      '     CATAGORY LEADERS'
        DB      CR

DB      CR
        DB      '     1. BATTING'
        DB      CR
;       DB      '     2. FIELDING'
        DB      CR
        DB      '     2. PITCHING'
        DB      CR

DB      CR

DB      CR
        DB      '1                         2'

WKY17:
        DB      '?'
        DB      '>'
        DB      FUN4
        DW      SCRN02          ;RETURN TO SCRN 1

DB      '>'
        DB      FUN1
        DW      CATLEDBB

DB      '>'
        DB      FUN3
        DW      CATLEDPH
        DB      '@'
        DW      WKY17
```

```
SCRN18:
      DB    '+'
      DB    FUN1+FUN3+FUN4  ;0FFH        ;ENABLE ALL KEYS
      DB    '     TEAM STANDINGS'
      DB    CR

DB    CR

DB    CR
;     DB    '0123456789012345678901234 56'
      DB    '  1.  AMERICAN LEAGUE'
      DB    CR
      DB    '  2.  NATIONAL LEAGUE'
      DB    CR

DB    CR

DB    CR
      DB    '1                         2'

WKY18:
      DB    '?'  ;WAIT FOR KEY

DB    '>'
      DB    FUN4
      DW    SCRN01      ;RETURN BACK .. 1 MEMU

DB    '>'
      DB    FUN1
      DW    SETAMER     ;RETURN BACK .. 1 MEMU

DB    '>'
      DB    FUN3
      DW    SETNAT      ;RETURN BACK .. 1 MEMU

DB    '@'
      DW    WKY18
SETNAT:
      DB    '*'  ;SET BIT
      DW    SETALNL
      DB    '@'
      DW    SCRN18A
SETAMER:
      DB    '*'  ;SET BIT
      DW    CLRALNL
;*************
; WE SELECTED AL/NL NOW CHOOSE WHAT
SCRN18A:
      DB    '+'
      DB    FUN1+FUN3+FUN4  ;0FFH        ;ENABLE ALL KEYS
      DB    '     TEAM STATS'
      DB    CR

DB    CR
;     DB    '123456789012345678901234 56
      DB    '  1.  YESTERDAYS GAMES'
      DB    CR
      DB    CR
      DB    '  2.  CURRENT STANDINGS'
      DB    CR
```

```
        DB    CR

DB    CR
        DB    '1                              2'

WKY18A:
        DB    '?'

DB    '>'
        DB    FUN4
        DW    SCRN18        ;RETURN TO SCRN 1

DB    '>'
        DB    FUN1
        DW    SCRNYES       ;YESTERDAYS GAMES

DB    '>'
        DB    FUN3
        DW    SCRN19

DB    '@'
        DW    WKY18A

; ROUTINES TO SUPPORT YESTERDAYS GAME...

SETUPYES:
; WHERE IS THE DATA LOCATED
        LD    HL,NLRESULT   ;NATIONAL LEAGUE RESULTS
        LD    A,(MLLEN+2)
        LD    B,A
        LD    A,(LEAGUE)
        CP    B
        JR    NC,GOTNALT    ;GOT NATIONAL
        LD    HL,ALRESULT

GOTNALT:
; FIRST BYTE TELLS SYSTEM HOW MANY GAMES..OR RECORDS
        LD    A,(HL)
        LD    (TXTPTR),HL   ;POSITION OF DATA
        LD    (PAGNUM),A    ;TOTAL NUMBER OF PAGES
; IF PAGNUM = 0 THEN RETURN TO MAIN SCREEN
        AND   A
        JR    NZ,SURUP
        LD    HL,SCRN18A
        LD    (POINTER),HL
        JP    MAIN          ;RETURN TO MAIN SCREEN
SURUP:
        LD    C,FUN4+CURDWN
        CP    1             ;MORE THAN 1 PAGE
        JR    NZ,YEPPY      ;YEP

LD    C,FUN4
YEPPY:
        LD    (KMASK),A     ;KEY MASK
        SUB   A
        LD    (CURPAG),A    ;CLEAR CURRENT PAGE..

CALL  CLRSCRN       ;CLEAR SCREEN
```

```
        JP    MAIN

GETDATE:
        LD    HL,(TXTPTR)
        INC   HL
        PUSH  HL
        LD    L,(HL)
; MONTH
        LD    H,0
        CALL  BD10  ; GET MONTHS
        LD    A,'/'
        RST   OUTCH
        POP   HL
        INC   HL
        LD    L,(HL)
        LD    H,0
        CALL  BD10  ;DAY
; OK PUT UP CURSOR

LD    C,CRUP
        LD    A,(KMASK)
        AND   CURUP
        JR    NZ,YP       ;YES CURSOR UP MAYBE BOTH
; ON CURSOR UP
; MAYBE DOWN
        LD    C,CRDWN
        LD    A,(KMASK)
        AND   CURDWN
        JP    Z,MAIN      ;NOT UP OR DOWN ,, NO CHARACTER NEEDED
SCR:
        LD    A,25
        LD    (CURSOR+1),A
        SUB   A
        LD    (CURSOR),A
        LD    A,C
        RST   OUTCH
        JP    MAIN
YP:
; CHECK FOR DOWN HERE..
        LD    A,(KMASK)
        AND   CURDWN
        JR    Z,SCR
        LD    C,CRUPDN
        JR    SCR
UPAGYES:          ;PUT UP PAGE FOR YESTERDAY.
        LD    A,(PAGNUM)    ;TOTAL NUMBER OF GAMES
        AND   A             ;TEST FOR NO GAMES PLAYED
        JP    Z,MAIN        ;NOTHING TO PUT UP

LD    HL,(TXTPTR)   ;GET PASSED DATE,NUMBER PAGES
        LD    A,3
        RST   CONV          ;START OF DATA

LD    A,(CURPAG)    ;GET CURRENT PAGE
        LD    B,A           ;MULT BY 9    SAVE 1
; MULT BY 9
     ADD   A,A   ;*2
     ADD   A,A   ;*4
     ADD   A,A   ;*8
```

```
        ADD  A,B   ;+1 = 9 MULT BY 9
        RST  CONV  ;ADD TO HL WHICH IS POINTING TO DATA
; HL POINTING TO DATA...
        PUSH HL    ;SAVE ADDRESS IN IX
        POP  IX    ;SAVE IN IX...
; GET TEAM NAME
; DATABASE ORDER
; WINNING TEAM ID,RUNS,HITS,ERRORS,LOSING TEAM ID,RUNS,HITS,ERR,
; WINNGER PITCHERS ID,LOSING PITCHERS,SAVE
; DATABASE ORDER
; WINNING TEAM,RUN,HITS,ERRORS,LOSING TEAM,RUNS,HITS,ERRORS,WINNING
; PITCHERS,LOSING PITCHER,SAVE PITCHER
;

LD   A,(IX)
        AND  1FH   ;ONLY TEAM NAME
; MULT BY 3
        LD   B,A   ;SAVE 1 MULT BY 3
        ADD  A,A   ;*2
        ADD  A,B   ;+1 = 3
        LD   HL,LEG    ;TEXT FOR CITYS 3 LETTER
        RST  CONV  ;POINT HL TO LETTERS FOR CITY

LD   B,3   ;3 LETTERS
LCITY:
        LD   A,(HL)    ;GET LETTER OF CITY
        RST  OUTCH     ;OUT CHARACTER
        INC  HL    ;NEXT LETTER
        DJNZ LCITY     ;DEC NUMBER OF LETTERS IF <> 0 THEN GOTO LCITY

;
        LD   B,5   ;PUT OUT 5 SPACES
        CALL SPCS
;
        LD   E,(IX)    ;GET RUNS OF WINNING TEAM
        LD   D,(IX+1)

LD   B,5       ;SHIFT DE RIGHT 5 TIMES
        CALL DESHFTR   ;TO GET RUNS INTO E
        AND  3FH       ;HITS IS 6 BITS
        LD   L,A       ;BD10 NEEDS DATA IN HL
        LD   H,0
        CALL BD10      ;CONVERT TO BCD OUTPUT TO DISPLAY

LD   B,5       ;PUT OUT 5 SPACES
        CALL SPCS

LD   E,(IX+1)  ;GET HITS DATA
        LD   D,(IX+2)
        LD   B,3       ;SHIFT DE DOWN 3
        CALL DESHFTR
        AND  3FH       ;ONLY 6 BITS FOR HITS
        LD   L,A
        LD   H,0
        CALL BD10      ;SEND DATA TWO DIGITS TO DISPLAY

LD   B,5
        CALL SPCS      ;OUTPUT 5 SPACES
        LD   A,(IX+2)  ;GET ERRORS
```

```
        RRA                 ;SHIFT ONLY RIGHT
        AND     0FH         ;MAX ERRORS 15
        LD      L,A
        LD      H,0
        CALL    BD10        ;DISPLAY DIGITS

CALL    DOCR        ;DO CARRIAGE RETURN

; NEXT TEAM NAME
        LD      E,(IX+2)    ;GET LOSING TEAMS
        LD      D,(IX+3)
        LD      B,5         ;NEED TO SHIFT DATA 5 TIME TO RIGHT
        CALL    DESHFTR

AND     1FH         ;ONLY 5 BITS
        LD      E,A         ;SAVE DATA
        ADD     A,A         ;*2
        ADD     A,E         ;+1 = 3   <<MULT>>
        LD      HL,LEG          ;GET CITY NAME
        RST     CONV
        LD      B,3         ; PUT OUT ALL THREE CHARACTER
LCO:
        LD      A,(HL)
        RST     OUTCH
        INC     HL
        DJNZ    LCO
;
        LD      B,5         ;5 SPACES TO RUN
        CALL    SPCS
        LD      A,(IX+3)    ;GET RUNS INFO
        RRA
        RRA
        AND     3FH         ;ONLY 6 BITS
        LD      L,A
        LD      H,0
        CALL    BD10        ;OUTPUT 2 DIGITS IN BCD
        LD      B,5
        CALL    SPCS        ;OUTPUT 5 SPACES
        LD      A,(IX+4)    ;GET HITS INFO
        AND     3FH
        LD      L,A
        LD      H,0
        CALL    BD10
        LD      B,5         ;OUTPUT 5 SPACES
        CALL    SPCS
        LD      E,(IX+4)    ;GET ERRORS
        LD      D,(IX+5)
        LD      B,6         ;SHIFT 6 TIMES TO RIGHT
        CALL    DESHFTR
        LD      A,E
        AND     0FH         ;MASK OFF ONLY 4 BITS
        LD      L,A
        LD      H,0
        CALL    BD10        ;OUTPUT 2 DIGITS.
        CALL    DOCR        ;RETURN
; GET PITCHER NAME
        LD      A,'W'
        RST     OUTCH
        LD      A,'P'
```

```
    RST  OUTCH
    LD   B,3
    CALL SPCS
SCRNYES:
    DB   '*'
    DW   SETUPYES     ;SETUP FOR YESTERDAYS RESULTS
;
YESSCRN:
;   DB   '+'
;   DB   CURUP+CURDWN+FUN4    ;0FFH     ;ENABLE ALL KEYS
;   DB   '12345678901234567890123456
    DB   '    RESULTS OF '
    DB   '*'
    DW   GETDATE             ;GET DATE OF RESULTS
    DB   ' '
    DB   '*'
    DW   PUTUPALNL
    DB   CR
    DB   'TEAM    R    H    E'
    DB   CR
    DB   '*'
    DW   UPAGYES             ;PUT UP PAGE FOR YESTERDAY.

CALL DESHFTR             ;SHIFT DATA 4 TIME RIGHT
    LD   A,D
    AND  01H        ;ONLY 9 BITS
    LD   D,A
    LD   (PLAYER),DE         ;SAVE ID NUMBER
    EX   DE,HL               ;HL CONTAINS PLAYERS NUMBER
;
    LD   DE,(NUMPITS)        ;MAX NUMBER OF PLAYERS.. PITCHERS
    AND  A
    SBC  HL,DE
    JP   NC,MAIN             ;ID IF > MAX PLAYER  HE'S NOT A PLAYER
                             ;RETURN , DON'T DISPLAY ANY THING

LD   A,'S'
    RST  OUTCH
    LD   A,'P'
    RST  OUTCH
    LD   B,3
    CALL SPCS
    LD   HL,(PLAYER)
    CALL SETNAMS
    LD   A,20
    LD   (CURSOR+1),A        ;NUMBER OF SAVES POSITION
    LD   A,SVDATA
    CALL GETDATA             ;GET DATA...
    CALL BD10
    JP   MAIN                ;GET TO MAIN
DESHFTR:
    SRL  D
    RR   E
    DJNZ DESHFTR
    LD   A,E
    RET
```

```
        LD    E,(IX+5)    ;GET WINNING PITCHER
        LD    D,(IX+6)
        LD    B,2
        CALL  DESHFTR      ;SHIFT DATA RIGHT 2 TIMES
        LD    A,D          ; ONLY 9 BITS ALLOWED FOR ID
        AND   01
        LD    D,A
        LD    (PLAYER),DE  ;SAVE PITCHERS ID IN PLAYER
        SUB   A
        LD    (TYPE),A     ;CURRENT SEASON FOR DATABASE ACCESS
        EX    DE,HL        ;HL HAS ID NUMBER
        CALL  SETNAMS
; PUT NAME OUT... OK NOW
; OK GET W - LOSES...
        LD    A,20
        LD    (CURSOR+1),A
; GET WINDATA
        LD    A,WINDATA
        CALL  GETDATA      ;GET WINS
        CALL  BD10
        LD    A,'-'
        RST   OUTCH
        LD    A,LOSDATA
        CALL  GETDATA
        CALL  BD10
;
        CALL  DOCR
        LD    A,'L'
        RST   OUTCH
        LD    A,'P'
        RST   OUTCH

LD    B,3
        CALL  SPCS

LD    E,(IX+6)    ;LOSING PITCHER
        LD    D,(IX+7)
        LD    B,3          ;SHIFT DATA 3 TIME RIGHT
        CALL  DESHFTR
        LD    A,D          ;ID ONLY 9 BITS
        AND   01
        LD    D,A
        LD    (PLAYER),DE  ;SAVE ID NUMBER
        EX    DE,HL        ;HL HAS ID NUMBER
        CALL  SETNAMS
; PUTS OUT NAME
        LD    A,20
        LD    (CURSOR+1),A ;POSITION CURSOR ON COLUMN 20
        LD    A,WINDATA    ;GET WIN DATA
        CALL  GETDATA
        CALL  BD10         ;OUTPUT WIN DATA
        LD    A,'-'        ;
        RST   OUTCH
        LD    A,LOSDATA
        CALL  GETDATA
        CALL  BD10
;
        CALL  DOCR
;
```

```
        LD    E,(IX+7)    ;GET SAVE PITCHERS ID
        LD    D,(IX+8)
        LD    B,4
WYES:
        DB    '?'
        DB    '>'
        DB    FUN4
        DW    SCRN18A
        DB    '*'
        DW    KYES
KYES:
        LD    A,(ACC)
        CP    CURUP
        JR    NZ,YCURUP
; OK CURSOR UP...
        LD    A,(CURPAG)
        AND   A
        JR    Z,SUPKMSK   ;SET UP CURSOR MASK , CAN GO UP
        DEC   A
ESUPK:
        LD    (CURPAG),A
SUPKMSK:
        LD    C,FUN4+CURUP
        LD    A,(CURPAG)    ;LOOK @ CURRENT PAGE
        AND   A             ;WE @ PAGE 0
        JR    NZ,CUPOK      ;NO, WE CAN GO UP
; WE ARE @ PAGE ZERO WE CAN'T GO UP
; HOW ABOUT DOWN
        LD    C,FUN4+CURDWN
        LD    A,(PAGNUM)    ;TOTAL NUMBER OF PAGE
        CP    1             ;IS IT > THAN 1?
        JR    NZ,ERUT       ;YES SET KEY MASK TO CURSOR DOWN
; NOPE CAN'T DO DOWN EITHER, JUST RETURN
        LD    C,FUN4
ERUT:
        LD    A,C
        LD    (KMASK),A

CALL  CLRSCRN

LD    HL,YESSCRN    ;GOTO SCREEN NUMBER
        LD    (POINTER),HL

JP    MAIN
; OK MORE THAN 1 PAGE SO UP IS OK, CAN WE GO DOWN ALSO?
CUPOK:
        LD    A,(CURPAG)    ;GET CURRENT PAGE
        INC   A
        LD    B,A
        LD    A,(PAGNUM)
        CP    B
        JR    Z,ERUT        ;NOPE ONLY UP
        LD    C,FUN1+CURDWN+CURUP
        JR    ERUT
YCURUP:
; HOW ABOUT CURSOR DOWN?
        CP    CURDWN
        JP    NZ,MAIN       ;WASN'T CURSOR UP EITHER???? SHOULD BE.
        LD    A,(CURPAG)
        INC   A
```

```
        LD    B,A
        LD    A,(PAGNUM)
        CP    B
        JP    Z,SUPKMSK  ;CAN'T DO IT JUST DO KEY MASK STUFF
        LD    A,B
        JR    ESUPK
        LD    E,(IX+5)   ;GET WINNING PITCHER
        LD    D,(IX+6)
        LD    B,2
        CALL  DESHFTR    ;SHIFT DATA RIGHT 2 TIMES
        LD    A,D        ; ONLY 9 BITS ALLOWED FOR ID
        AND   01
        LD    D,A
        LD    (PLAYER),DE  ;SAVE PITCHERS ID IN PLAYER
        SUB   A
        LD    (TYPE),A   ;CURRENT SEASON FOR DATABASE ACCESS
        EX    DE,HL      ;HL HAS ID NUMBER
        CALL  SETNAMS
; PUT NAME OUT... OK NOW
; OK GET W - LOSES...
        LD    A,20
        LD    (CURSOR+1),A
; GET WINDATA
        LD    A,WINDATA
        CALL  GETDATA    ;GET WINS
        CALL  BD10
        LD    A,'-'
        RST   OUTCH
        LD    A,LOSDATA
        CALL  GETDATA
        CALL  BD10
;
        CALL  DOCR
        LD    A,'L'
        RST   OUTCH
        LD    A,'P'
        RST   OUTCH

LD    B,3
        CALL  SPCS

LD    E,(IX+6)   ;LOSING PITCHER
        LD    D,(IX+7)
        LD    B,3        ;SHIFT DATA 3 TIME RIGHT
        CALL  DESHFTR
        LD    A,D        ;ID ONLY 9 BITS
        AND   01
        LD    D,A
        LD    (PLAYER),DE  ;SAVE ID NUMBER
        EX    DE,HL      ;HL HAS ID NUMBER
        CALL  SETNAMS
; PUTS OUT NAME
        LD    A,20
        LD    (CURSOR+1),A  ;POSITION CURSOR ON COLUMN 20
        LD    A,WINDATA  ;GET WIN DATA
        CALL  GETDATA
        CALL  BD10       ;OUTPUT WIN DATA
        LD    A,'-'      ;
```

```
        RST  OUTCH
        LD   A,LOSDATA
        CALL GETDATA
        CALL BD10
;
        CALL DOCR
;
        LD   E,(IX+7)    ;GET SAVE PITCHERS ID
        LD   D,(IX+8)
        LD   B,4
        CALL DESHFTR        ;SHIFT DATA 4 TIME RIGHT
        LD   A,D
        AND  01H         ;ONLY 9 BITS
        LD   D,A
        LD   (PLAYER),DE    ;SAVE ID NUMBER
        EX   DE,HL          ;HL CONTAINS PLAYERS NUMBER
;
        LD   DE,(NUMPITS)   ;MAX NUMBER OF PLAYERS.. PITCHERS
        AND  A
        SBC  HL,DE
        JP   NC,MAIN        ;ID IF > MAX PLAYER  HE'S NOT A PLAYER
                            ;RETURN , DON'T DISPLAY ANY THING

LD   A,'S'
        RST  OUTCH
        LD   A,'P'
        RST  OUTCH
        LD   B,3
        CALL SPCS
        LD   HL,(PLAYER)
        CALL SETNAMS
        LD   A,20
        LD   (CURSOR+1),A   ;NUMBER OF SAVES POSITION
        LD   A,SVDATA
        CALL GETDATA        ;GET DATA...
        CALL BD10
        JP   MAIN           ;GET TO MAIN
DESHFTR:
        SRL  D
        RR   E
        DJNZ DESHFTR
        LD   A,E
        RET

SCRNYES:
        DB   '*'
        DW   SETUPYES    ;SETUP FOR YESTERDAYS RESULTS
;
YESSCRN:
;       DB   '+'
;       DB   CURUP+CURDWN+FUN4    ;0FFH      ;ENABLE ALL KEYS
;       DB   '12345678901234567890123456
        DB   '    RESULTS OF '
        DB   '*'
        DW   GETDATE          ;GET DATE OF RESULTS
        DB   ' '
        DB   '*'
        DW   PUTUPALNL
```

```
        DB      CR
        DB      'TEAM         R     H       E'
        DB      CR
        DB      '*'
        DW      UPAGYES             ;PUT UP PAGE FOR YESTERDAY.
;************
SCRN19:
        DB      '+'
        DB      FUN1+FUN3+FUN4 ;0FFH        ;ENABLE ALL KEYS
        DB      '       TEAM STANDINGS    '

DB      '*'
        DW      PUTUPALNL
;       DB      CR

DB      CR

DB      CR
        DB      '        1.  EAST'
        DB      CR
        DB      '        2.  WEST'
        DB      CR

DB      CR

DB      CR
        DB      '1                                 2'
WKY19:
        DB      '?'     ;WAIT FOR KEY

DB      '>'
        DB      FUN4
        DW      SCRN18A    ;RETURN BACK .. 1 MEMU

DB      '>'
        DB      FUN1
        DW      SETEAST    ;RETURN BACK .. 1 MEMU

DB      '>'
        DB      FUN3
        DW      SETWEST    ;RETURN BACK .. 1 MEMU

DB      '@'
        DW      WKY19
SETEAST:
        DB      '*'   ;SET BIT
        DW      CLRETWT
        DB      '@'
        DW      SCRN19A
SETWEST:
        DB      '*'   ;SET BIT
        DW      SETETWT

SCRN19A:

; SHOULD HAVE MEMU FOR SELECTING YESTERDAYS GAME..

DB      '+'
```

```
        DB      FUN4   ;0FFH         ;ENABLE ALL KEYS
        DB      'TEAM    W    L    PCT    GB'
        DB      CR
        DB      '*'
        DW      PUTTSND              ;PUT UP TEAM IN STANDING ORDER
;       DB      'CITYSS XX   XX   .XXX   XXXX'
;       DB      CR
;       DB      'CITYSS XX   XX   .XXX   XXXX'
;       DB      CR
;       DB      'CITYSS XX   XX   .XXX   XXXX'
;       DB      CR
;       DB      'CITYSS XX   XX   .XXX   XXXX'
;       DB      CR
;       DB      'CITYSS XX   XX   .XXX   XXXX'
;       DB      CR
;       DB      'CITYSS XX   XX   .XXX   XXXX'
;       DB      CR
;       DB      'CITYSS XX   XX   .XXX   XXXX'

WKY19A:
        DB      '?'

DB      '>'
        DB      FUN4
        DW      SCRN19        ;SCREEN 18

DB      '@'
        DW      WKY19A

SCRN20:
        DB      '+'
        DB      FUN1+FUN3+FUN4 ;0FFH         ;ENABLE ALL KEYS
        DB      '        TEAM ROSTERS'
        DB      CR

DB      CR

DB      CR
        DB      '   1.   AMERICAN LEAGUE'
        DB      CR
        DB      '   2.   NATIONAL LEAGUE'
        DB      CR

DB      CR

DB      CR
        DB      '1                       2'
WKY20:
        DB      '?'

DB      '>'
        DB      FUN1
        DW      STAL

DB      '>'
        DB      FUN3
        DW      STNL
```

```
        DB      '>'
        DB      FUN4
        DW      ESCAP

DB      '@'
        DW      WKY20
ESCAP:
        DB      '*'
        DW      RESUB

RESUB:
        LD      HL,MYTEAM
        LD      A,(FLAG)
        BIT     SEL,A
        JR      NZ,RESEL
        LD      HL,SCRN16
RESEL:
        LD      (POINTER),HL
        JP      MAIN

STNL:
        DB      '*'     ;SET BIT
        DW      SETALNL
        DB      '@'
        DW      SCRN20A
STAL:
        DB      '*'     ;SET BIT
        DW      CLRALNL
SCRN20A:
        DB      '+'
        DB      FUN1+FUN3+FUN4 ;0FFH       ;ENABLE ALL KEYS
        DB      '       TEAM ROSTERS       '
        DB      '*'
        DW      PUTUPALNL ;PUT UP THE LEAGUE
;       DB      CR

DB      CR

DB      CR
        DB      '       1.  EAST'
        DB      CR
        DB      '       2.  WEST'
        DB      CR

DB      CR

DB      CR
        DB      '1                      2'
;       DB      '123456789012345678901234567'
WKY20A:
        DB      '?'

DB      '>'
        DB      FUN4
        DW      SCRN20

DB      '>'
        DB      FUN1
        DW      STEAST
```

```
        DB      '>'
        DB      FUN3
        DW      STWEST

DB      '@'
        DW      WKY20A

STWEST:
        DB      '*'     ;SET BIT
        DW      SETETWT
        DB      '@'
        DW      SCRN21
STEAST:
        DB      '*'     ;SET BIT
        DW      CLRETWT
SCRN21:
        DB      '+'
        DB      FUN1+FUN2+FUN3+FUN4+CURDWN+CURUP        ;0FFH           ;ENABLE ALL
KEYS
USCRN21:
        DB      'TEAMS              '
        DB      '*'
        DW      PUTUPALNL
        DB      '  '

DB      '*'
        DW      PUTUPETWT
CTN21:
        DB      CR

DB      CR
        DB      '*'
        DW      PUTTEAMS

;       DB      '    1. XXXXXXXX'
;       DB      CR
;       DB      '    2. XXXXXXXX'
;       DB      CR
;       DB      '    3. XXXXXXXX'
;       DB      CR
;       DB      '       '
;       DB      CR
;       DB      CR
;       DB      '1           2           3'

WKY21:
        DB      '?'

;       DB      '>'
;       DB      FUN1
;       DW      SCRN22
;       DB      '>'
;       DB      FUN2
;       DW      SCRN22
;       DB      '>'
;       DB      FUN3
;       DW      SCRN22
```

```
        DB    '*'           ;WE KNOW IT'S
                            ;EITHER UP/DOWN
        DW    CKCUR   ; AND ESCAPE
; AND FUNCTION KEYS
; CHECKS CURSOR POSITION...
CKCUR:

LD    A,(ACC)
        CP    FUN4          ;ESCAPE?
        JR    Z,RETAN
        CP    CURUP         ;IS IT CURSOR UP?
        JR    Z,SCRTUP   ;YES GO.
        CP    CURDWN
        JR    Z,SCRTDWN
; MUST BE FUN1,2,OR 3
; GET WEIGHTED VALUE.. BY CHOICE
        CALL  CHOOSE        ;WEIGHTS VALUE OF FUN1,2,3
        JR    NZ,SCRTDWN
; CHOICE SHOULD BE 0,1,2...
        LD    B,A
        LD    A,(LEAGUE)
        ADD   A,B
        LD    (WLEAGUE),A
        LD    HL,SCRN22
        LD    (POINTER),HL
        JP    MAIN

; MUST BE CURSOR DOWN...
SCRTDWN:
        CALL  GETLEND    ;GET START OF NEXT LEAGUE LEAGUES LENGTH   HL
POINTS TO
        LD    A,(LEAGUE)
        ADD   A,3
        CP    (HL)       ;CHECK UPPER LIMIT?
        JR    C,YGOT          ;< UPPER LIMIT.
NOTHN:
        LD    HL,WKY21      ;NEXT CHARACTER
EXPR:
        LD    (POINTER),HL
        JP    MAIN
RETAN
        LD    HL,MYTEAM
        LD    A,(FLAG)
        BIT   SHOW,A
        JR    NZ,EXPR
        LD    HL,SCRN20A
        JR    EXPR
YGOT:
        LD    (LEAGUE),A
; NEED TO REDRAW STUFF.
        LD    HL,SCRN21
        LD    (POINTER),HL
        JP    MAIN
SCRTUP:
        CALL  GETLEND
        DEC   HL         ;START OF SECTION
```

```
        LD    A,(LEAGUE)
        SUB   03H     ;SUBTRACT 3??
        JR    C,NOTHN ;NOPE ROLL OVER....
        CP    (HL)    ;SEE IF AT START
        JR    NC,YGOT ;YEP OK

JR    NOTHN
SCRN22:
; OK WHICH ONE WAS PUSHED.
        DB    '+'
        DB    FUN1+FUN2+FUN3+FUN4+CURDWN+CURUP   ;0FFH    ;ENABLE ALL
KEYS

DB    '*'
        DW    PUTEAM

;       DB    'TEAMNAME'
        DB    CR

DB    CR
;       DB    '12345678901234567890123456

DB    '*'
        DW    UPLAY1

;       DB    '1. PLAYERS ,NAMEXX NU   POS'
;       DB    CR
;       DB    '2. LAST NAM,FIRST   MB  ITI'
;       DB    CR
;       DB    '3. E FIST  ,NAME L ER   ON '
;       DB    CR
WKY22:
        DB    '?'

DB    '*'
        DW    WK22S   ;DO KEY DECODE

DB    '@'
        DW    WKY22

; DO KEYS FOR
TWHR:
        SUB   A
        LD    (ROSTOFF),A    ;TOP OF STACK

LD    HL,SCRN21
        LD    A,(FLAG)
        BIT   SHOW,A
        JP    Z,RESEL  ;SETS SCREN NUMBER
        LD    HL,MYTEAM
        JP    RESEL
```

```
CHOOSE:
        LD    A,(CHOICE)
        LD    B,A
        LD    C,0
        LD    A,(ACC)
        CP    FUN1
        JR    Z,FUNN
        INC   C
        CP    FUN2
        JR    Z,FUNN
        INC   C
        CP    FUN3
        RET   NZ          ;NONE OF THE ABOVE RETURN.
FUNN:
        LD    A,B         ;0,1,2
        ADD   A,A         ;0,2,4
        ADD   A,B         ;0,3,6 ??
        ADD   A,C         ;+0,1,2
        LD    HL,TCHOIC
        RST   CONV

LD    A,(HL)      ;GET ADD VALUE TO (ROSTOFF)
CP    (HL)
RET               ;SET ZERO FLAG

WK22S:
        LD    A,(ROSTOFF)
        LD    D,A
        LD    A,(CHOICE)    ;0,1,2
        LD    B,A           ;CHOICE VALUE IN B
        LD    C,0
        LD    A,(ACC)
        CP    CURUP
        JP    Z,HR2         ;DEC ROSTER OFFSET
        CP    CURDWN
        JP    Z,HR1         ;INC ROSTER OFFSET
        CP    FUN4  ;RETURN??
        JR    Z,TWHR        ;ESCAP

CALL CHOOSE
        JP   NZ,MAIN
; WEIGHTED RESULT 0-2

ADD  A,D         ;+ OFFSET OF ROSTER
; OK LET'S GO GET PLAYERS NUMBER
        ADD  A,A    ;*2 FOR NUMBER OF BYTES
        PUSH AF
        CALL GETROFF
        POP  AF
        RST  CONV
        LD   A,(HL)
        INC  HL
        LD   H,(HL)
        LD   L,A
        LD   (PLAYER),HL      ;POINT TO PLAYER NUMBER..
; OK DETERMINE IF SELECTING OF WHAT
        LD   A,(FLAG)
        BIT  SEL,A
```

```
;       LD      (TMLEG+TLEG),A          ;REMOVE A GUY..

PUSH IX
        POP  HL         ; LOCATION TO FILL TO
        PUSH HL
        POP  DE
        INC  HL
        INC  HL
; HL POINTS TO FILL FROM.
; B CONTAIN NUMBERPLAY TOTAL - T HIM
        DEC  B
        JP   Z,REDRAW
        LD   A,B
        ADD  A,A
        LD   C,A
        LD   B,0
        LDIR
        JP   REDRAW

; MOVE FROM HL -> DE FOR BC # BYTES
ISHE:
        LD   A,(WLEAGUE)
        PUSH AF
        LD   A,(MLLEN+NUMDIV)   ;TLEG
        LD   (WLEAGUE),A
        CALL GETROFF            ;GET START OF ROSTER.
        LD   (TMP),HL   ;SAVE START OF ROSTER
        POP  AF
        LD   (WLEAGUE),A

LD   DE,TMLEG

LD   A,(MLLEN+NUMDIV)   ;MAX NUMBER OF TEAMS
        ADD  A,E
        JR   NC,NIDD
        INC  D
NIDD:
        LD   E,A
        LD   A,(DE)             ;GET ROSTER LENGTH

;       LD   A,(TMLEG+TLEG)  ;NUMBER OF PLAYER ON MY TEAM

LD   B,A            ;TOTAL NUMBER OF PLAYERS

LD   DE,(PLAYER)    ;GOT PLAYERS NAME
        PUSH HL
        POP  IX             ;IX POINTS TO START OF ROSTER.

LD   A,B
        AND  A
        JR   Z,OBODY        ;FIRST PLAYER MUST ADD

; START SEARCH
LOOKING:
        LD   L,(IX)
        LD   H,(IX+1)
        AND  A
        SBC  HL,DE
        JR   Z,FHIM     ;FOUND HIM
        INC  IX
```

```
        INC     IX
        DJNZ    LOOKING
OBODY:
        SUB     A
        RET
FHIM
        LD      A,0FFH
        AND     A
        RET
MTU:
        DB      '*'
        DW      HR2             ;CALL SUBROUTINE

MTD:
        DB      '*'
        DW      HR1
HR1:
        LD      A,(ROSTOFF)
        ADD     A,3             ;CAN WE GET THREE?
        LD      B,A

LD      A,(WLEAGUE)
        LD      HL,TMLEG
        RST     CONV
        LD      A,B     ;GET CURRENT LEN
        SUB     (HL)    ;MAX LENGTH
        JR      NC,NOMORE ;POSITIVE RESULT THAN NO MORE PLAYERS
        LD      A,B
DIT:
        LD      (ROSTOFF),A
NOMORE:
        LD      HL,SCRN22       ;GOTO ...
        LD      (POINTER),HL
        JP      MAIN
HR2:
        LD      A,(ROSTOFF)
        AND     A
        JR      Z,NOMORE        ;@ START OF ROSTER.
        SUB     3
        JR      DIT
UPLAY1:
        LD      C,0
        LD      A,(ROSTOFF)
        LD      D,A
        LD      B,3

LD      A,(WLEAGUE)
        LD      HL,TMLEG
        RST     CONV
        LD      A,(HL)          ;NUMBER OF PLAYERS IN LIST
        AND     A               ;IF ZERO THAN NOTHING
        JP      Z,MAIN          ;NO PLAYER ON THIS TEAM...
        SUB     D
        SUB     3               ;CAN WE DISPLAY 3
        JR      NC,SPLYR
        ADD     A,3
        LD      B,A             ;< 3
; COMPLEMENT OF IT.
SPLYR:
        LD      A,B
```

```
        DEC  A
        LD   (CHOICE),A      ;CHOICE OF 3 TYPE DISPLAY FORMATS
NPLYR:

LD   A,B
        CP   1               ;IF ONE THAN INSET CR
        JR   NZ,NTLNE

CALL DOCR            ;TWO LINES
        CALL DOCR
NTLNE:
; WHAT IS PLAYER. IS HE ON MY TEAM?

; GOT THE LENGTH NOW, ADD UP ALL LENGTHS TO SEE
; WHERE DATA STARTS
; USING WLEAGUE AS TEAM NUMBER
; EXITS WITH
        PUSH BC

CALL GETROFF    ;RETURN WITH

POP  BC

LD   A,(ROSTOFF)
        ADD  A,C
        ADD  A,A
        RST  CONV       ;GET NEW PLAYER
        LD   A,(HL)
        INC  HL
        LD   H,(HL)
        LD   L,A
        LD   (PLAYER),HL          ;SAVE PLAYERS NAME
; CHECK MY TEAM TO SEE IF HE'S ON MINE!
        PUSH BC         ;SAVE BC
        CALL ISHE       ;IS HE?
        POP  BC
        LD   (REVID),A  ;IF FOUND HE A = FF

LD   A,(ROSTOFF)
        ADD  A,C
        INC  A          ;1 MORE ZERO IS NOT NICE
        PUSH BC
        CALL DSP10
        LD   A,'.'
        RST  OUTCH
        LD   A,' '
        RST  OUTCH

POP  BC
        PUSH BC
; OK GOT NAME??

LD   HL,(PLAYER)     ;GET PLAYER NUMBER
        CALL SETNAMS
```

```
        LD      (TMP),DE    ;END OF SPOOL

POP     BC
        PUSH    BC

LD      A,(WLEAGUE)
; MULTPLY BY 3
        LD      B,A
        ADD     A,A
        ADD     A,B
        ADD     A,C
        CALL    DSP100
        LD      B,2
        CALL    SPCS
        LD      DE,(TMP)
        LD      A,(DE)
        AND     0FH
        ADD     A,A
        LD      HL,POSNUM
        RST     CONV
        LD      A,(HL)
        RST     OUTCH
        INC     HL
        LD      A,(HL)
        RST     OUTCH
        CALL    DOCR
        POP     BC          ;RESTORE C
        INC     C
; IF B = 2 AND C = 2 THEN ADD CR
        LD      A,B
        CP      2
        JR      NZ,NTWO

LD      A,C
        CP      1           ;JUST PRINTER FIRST LINE

CALL    Z,DOCR      ;ADD EXTRA IF ONLY 2 ON SCREEN
NTWO:
        LD      A,B         ;NUMBER OF THINGS TO PUT UP
        CP      C
        JP      NZ,NPLYR

;PROCESS BOTTOM LINE
; B CONTAINS LIMITS + 1
        LD      C,0         ;0-2
NVA:

; SET CURSOR UP FOR CHOICES
        LD      D,B
        DEC     D

LD      A,D

ADD     A,A
        ADD     A,D         ;MULT BY 3

ADD     A,C         ;+ OFFSET
        ADD     A,A         ;GET CURSOR ADDRESS
```

```
        LD     HL,TNUMB
        RST    CONV
        LD     A,(HL)
        INC    HL
        LD     H,(HL)
        LD     L,A
;
        LD     (CURSOR),HL      ;SAVE CURSOR POSITION

PUSH   BC

LD     A,(ROSTOFF)
        ADD    A,C
        INC    A
        CALL   DSP10

POP    BC

INC    C
        LD     A,C
        CP     B
        JR     C,NVA

JP     MAIN
; NUMBER POSITION ADDRESS FOR CURSOR..
; THREE DIFFERENT FORMAT
;
;           1
; 1                 2
; 1         2       3

TNUMB:
        DW     0D07H
        DW     0D07H
        DW     0D07H

DW     0007H
        DW     1807H
        DW     1807H

DW     0007H
        DW     0D07H
        DW     1807H

; USED WITH CHOICE TO
TCHOIC:
        DB     00      ;FUNCTION #1
        DB     00      ;FUNCTION #2
        DB     00      ;FUNCTION #3

DB     00      ;FUNCTION #1
        DB     01      ;FUNCTION #2
        DB     01      ;FUNCTION #3

DB     00      ;FUNCTION #1
        DB     01      ;FUNCTION #2
        DB     02      ;FUNCTION #3
PPNAM:
        CALL HEADER     ;PLAYERS NAME & CITY
```

```
        JP      MAIN

SCRN23:
        DB      '+'
        DB      FUN4+FUN1+FUN2+FUN3+CURLFT+CURRGHT  ;0FFH        ;ENABLE ALL
KEYS
;       DB      '12345678901234567890123456
        DB      '*'
        DW      PPNAM

;       DB      'X.LAST NAME              POS'
;       DB      CR
;       DB      'CITY,TEAMNAME             ##'
;       DB      CR
        DB      '   AB      BA      BB      SO'
        DB      '*'
        DW      PUTAB
;       DB      CR
;       DB      '####    .###    ####    ####'
;       DB      CR
        DB      '    H      2B      3B      HR'
;       DB      CR
        DB      '*'
        DW      PUTH
;       DB      '####    ####    ####    ####'
;       DB      CR

DB      CR
        DB      '1989       TREND       LIFE'
WKY23:
        DB      '?'
        DB      '>'
        DB      FUN4
        DW      SCRN22

DB      '*'
        DW      SETTYPE
        DB      '>'
        DB      FUN1
        DW      SCRN23

DB      '>'
        DB      FUN2
        DW      TREND

DB      '>'
        DB      FUN3
        DW      SCRN23

DB      '>'
        DB      CURRGHT
        DW      SCRN25

DB      '>'
        DB      CURLFT
        DW      SCRN24

DB      '@'
        DW      WKY23
```

```
SCRN23A:
        DB      '+'
        DB      FUN4+FUN1+FUN2+FUN3+CURLFT+CURRGHT  ;0FFH       ;ENABLE ALL
KEYS
;       DB      '12345678901234567890123456
        DB      '*'
        DW      PPNAM

;       DB      'X.LAST NAME              POS'
;       DB      CR
;       DB      'CITY,TEAMNAME            ##'
;       DB      CR
;       DB      '12345678901234567890123456
        DB      '   IP      HA      K      WA'
        DB      '*'
        DW      PUTIP
;       DB      CR
;       DB      '####123####123####1234####'
;       DB      CR
        DB      '    G      W       L      ERA'
;       DB      CR
        DB      '*'
        DW      PUTGWL
;       DB      '####123###123###1234#.####'
;       DB      CR

DB      CR
        DB      '1989        TREND       LIFE'
WKY23A
        DB      '?'

DB      '>'
        DB      FUN4
        DW      SCRN22

DB      '*'
        DW      SETTYPE

DB      '>'
        DB      FUN1
        DW      SCRN23A

DB      '>'
        DB      FUN2
        DW      TRENDP

DB      '>'
        DB      FUN3
        DW      SCRN23A

DB      '>'
        DB      CURRGHT
        DW      SCRN25A

DB      '>'
        DB      CURLFT
        DW      SCRN24A

DB      '@'
        DW      WKY23A
```

```
SETTYPE:
        LD      A,(ACC)
        CP      FUN1
        JR      Z,CLRTYPE
        CP      FUN2
        JR      Z,TWOTYPE
        CP      FUN3
        JP      NZ,MAIN
        LD      A,1
ETYPE:
        LD      B,A
        LD      A,(TYPE)
        CP      B
        JR      Z,CLRACC    ;CLEAR ACC
        LD      A,B
        LD      (TYPE),A    ;LIFETIME STAT'S
        JP      MAIN
CLRACC:
        SUB     A           ;ALREADY IN THAT MODE.
        LD      (ACC),A     ;CLEAR KEY
        JP      MAIN
TWOTYPE:
        LD      A,2         ;TREND INFORMATION
        JR      ETYPE
CLRTYPE:
        SUB     A
        JR      ETYPE       ;CLEAR TO CURRENT SEASON STAT
;       DB      '   IP     HA    K      WA'
;       DB      '####12####123####1234####'
PUTIP:
        LD      A,IPDATA
        CALL    GETDATA
        PUSH    HL          ;SAVE 3*IPDATE
        LD      (TMP),HL
        LD      HL,0
        LD      (TMP+2),HL
        LD      HL,3
        CALL    DIVIDE
        PUSH    HL          ;SAVE HL INT(IPDATE/3)
        CALL    BD1000
; OK LETS DO THE .1 IR .2 OF
        LD      C,' '       ;SPACE
        LD      A,(TMP)     ;GET FACTIONAL
        AND     A
        JR      Z,PAC
        ADD     A,IPP-1
        LD      C,A
PAC:
        LD      A,C
        RST     OUTCH       ;PUT OUT FACTIONAL PART OF IP

LD      B,2
        CALL    SPCS
        LD      A,HADATA
        CALL    GETDATA
        CALL    BD1000
        LD      B,3
        CALL    SPCS
        LD      A,KDATA
```

```
        CALL GETDATA
        CALL BD1000
        LD   B,4
        CALL SPCS
        LD   A,WADATA
        CALL GETDATA
        CALL BD1000
        JP   MAIN

;       DB   '    G    W    L      ERA'
;       DB   '####123###123###12345#.###'
PUTGWL
        LD   A,GDATA
        CALL GETDATA
        CALL BD1000
        LD   B,3
        CALL SPCS
        LD   A,WINDATA
        CALL GETDATA
        CALL BD100
        LD   B,3
        CALL SPCS
        LD   A,LOSDATA
        CALL GETDATA
        CALL BD100
        LD   B,5
        CALL SPCS
        CALL CALERA
        JP   MAIN

; CALULATE ERA
; #.###
; OR ##.##
CALERA:

; ERA CALULATION
        LD   A,ERDATA
        CALL GETDATA
        PUSH HL
        LD   A,IPDATA
        CALL GETDATA
        POP  DE            ;GET ER DATA
        PUSH HL            ;SAVE IP*3
        EX   DE,HL         ;HL NOW HAS ER
        LD   BC,2000*3*9   ;* 6000
        CALL MULTPLY
        POP  HL            ;DIVIDE BY IP*3
        CALL DIVIDE
;
;9.999
        PUSH HL
        LD   DE,20000
        AND  A
        SBC  HL,DE
        POP  HL
        JR   C,PLT
; DATA IN HL, PUT UP AS 1.XXX
        SRL  H
        RR   L
```

```
        JR    NC,RNDUP
; ROUND UP.....
        INC   HL
RNDUP:
        LD    DE,10000
        LD    B,1
        CALL  BCDCONV
        LD    DE,1000
        CALL  BCDCONV
        LD    A,'.'
        RST   OUTCH
        LD    DE,100
        CALL  BCDCONV
        LD    DE,10
        CALL  BCDCONV
        RET

JP    MAIN
PLT:
        CALL  PUTFACT
        RET

JP    MAIN

SCRN24A:
        DB    '+'
        DB    FUN4+FUN1+FUN2+FUN3+CURRGHT    ;0FFH       ;ENABLE ALL KEYS
;       DB    '12345678901234567890123456
        DB    '*'
        DW    PPNAM

;       DB    'X.LAST NAME            POS'
;       DB    CR
;       DB    'CITY,TEAMNAME           ##'
;       DB    CR
        DB    '   ID          H       BA'
;       DB    '####1234567890####123#.###'
;       DB    CR

DB    '*'
        DW    PUTHBA

DB    '                 SO    BB'
;       DB    '                ####  ####'
        DB    '*'
        DW    PUTSO

DB    CR
        DB    '1989       TREND      LIFE'
WKY24A:
        DB    '?'

DB    '>'
        DB    FUN4
        DW    SCRN22
```

```
        DB      '*'
        DW      SETTYPE

DB      '>'
        DB      CURRGHT
        DW      SCRN23A

DB      '>'
        DB      FUN1
        DW      SCRN24A

DB      '>'
        DB      FUN2
        DW      TRENDP

DB      '>'
        DB      FUN3
        DW      SCRN24A

DB      '@'
        DW      WKY24A

;       DB      '   ID              H         BA'
;       DB      '####1234567890####123#.###'
;       DB      CR
PUTHBA:
        LD      HL,(PLAYER)
        CALL    BD1000
        LD      B,10
        CALL    SPCS
        LD      A,HDATA
        CALL    GETDATA
        PUSH    HL              ;SAVE HITS
        CALL    BD1000
        LD      B,3
        CALL    SPCS

LD      A,ABDATA
        CALL    GETDATA

POP     DE              ;RESTORE HITS
        PUSH    HL              ;SAVE @BATS
        EX      DE,HL           ;HL CONTAINS HITS

LD      BC,2000         ;* 2000
        CALL    MULTPLY
        POP     HL              ;DIVIDE BY AB
        CALL    DIVIDE
        CALL    PUTFACT
        JP      MAIN
;       DB      '                    SO      BB'
;               '0123456789012345
;       DB      '0                      ####123####'
```

```
PUTSO:
        LD      A,15
        LD      (CURSOR+1),A    ;SET CURSOR POSITION
        LD      A,SODATA
        CALL    GETDATA
        CALL    BD1000
        LD      B,3
        CALL    SPCS
        LD      A,BBDATA
        CALL    GETDATA
        CALL    BD1000
        JP      MAIN
SCRN25A:
        DB      '+'
        DB      FUN4+FUN1+FUN2+FUN3+CURLFT      ;0FFH     ;ENABLE ALL KEYS
;       DB      '12345678901234567890123456
        DB      '*'
        DW      PPNAM

;       DB      'X.LAST NAME            POS'
;       DB      CR
;       DB      'CITY,TEAMNAME           ##'
;       DB      CR
        DB      '    GS     SHO     SV'
;       DB      '###1234###123###1234#.###
        DB      CR
        DB      '*'
        DW      PUTGS
        DB      CR
        DB      '    CG       W%'
        DB      CR
;       DB      '1###12#.###
        DB      '*'
        DW      PUTCG
        DB      CR

DB      CR
        DB      '1989       TREND       LIFE'
WKY25A:
        DB      '?'

DB      '>'
        DB      FUN4
        DW      SCRN22
        DB      '*'
        DW      SETTYPE

DB      '>'
        DB      CURLFT
        DW      SCRN23A

DB      '>'
        DB      FUN1
        DW      SCRN25A

DB      '>'
        DB      FUN2
        DW      TRENDP
```

```
        DB    '>'
        DB    FUN3
        DW    SCRN25A

DB    '@'
        DW    WKY25A

;       DB    '  GS    SHO    SV'
;       DB    '####1234###123###1234#.###
PUTGS:
        LD    A,GSDATA
        CALL  GETDATA
        CALL  BD1000
        LD    B,4
        CALL  SPCS
        LD    A,SHODATA
        CALL  GETDATA
        CALL  BD100
        LD    B,3
        CALL  SPCS
        LD    A,SVDATA
        CALL  GETDATA
        CALL  BD100
        JP    MAIN
;       DB    '  CG    W%'
;       DB    '1###12#.###
PUTCG:
        LD    A,' '
        RST   OUTCH
        LD    A,CGDATA
        CALL  GETDATA
        CALL  BD100
        LD    A,' '
        RST   OUTCH
        RST   OUTCH
        LD    A,WINDATA
        CALL  GETDATA
        PUSH  HL            ;SAVE IT
        LD    A,LOSDATA
        CALL  GETDATA
        POP   DE            ;GET WINS
        ADD   HL,DE
        PUSH  HL            ;WIN+LOSES
        EX    DE,HL
        LD    BC,2000
        CALL  MULTPLY
        POP   HL
        CALL  DIVIDE        ;RESULT IN HL
        CALL  PUTFACT
        JP    MAIN

;       DB    '  AB    AVR    BB    SO'
;       DB    '####   #.###   ###   ###
;       DB    '*'
```

```
BD10000:
        LD      DE,10000
        LD      B,0             ;SPACES IN FRONT
        LD      DE,10000
        CALL    BCDCONV
I1000:
        LD      DE,1000
        CALL    BCDCONV
I100:
        LD      DE,100
        CALL    BCDCONV
I10:
        LD      DE,10
        CALL    BCDCONV
        LD      A,L
        ADD     A,30H
        JP      OUTCH
BD1000:
        LD      B,0
        JR      I1000
BD100:
        LD      B,0
        JR      I100
BD10:
        LD      B,0
        JR      I10

PUTAB:
        LD      A,ABDATA        ;NEED @ BATS
        CALL    GETDATA
        PUSH    HL              ;SAVE AB FOR CALULATION OF AVR
; RETURNS IN HL
        CALL    BD10000
; CALULATE BATTING AVERAGE...
        LD      B,3
        CALL    SPCS
        LD      A,HDATA
        CALL    GETDATA
        LD      BC,2000         ;MULT BY 2000
        CALL    MULTPLY
        POP     HL              ;GET @ AB
        CALL    DIVIDE
; RETURNS IN HL
        CALL    PUTFACT         ;PUT UP FACTION FOR BA
        LD      B,3
        CALL    SPCS
        LD      A,BBDATA
        CALL    GETDATA
        CALL    BD1000
        LD      A,' '
        RST     OUTCH
        RST     OUTCH
        LD      A,SODATA
        CALL    GETDATA
        CALL    BD1000
        JP      MAIN
PUTH:
;       DB      '12345678901234567890123456'
;       DB      '    H      2B     3B    HR'
;       DB      '####123456###1234###123###'
```

```
        LD    A,HDATA
        CALL  GETDATA
        CALL  BD1000
        LD    B,6
        CALL  SPCS
        LD    A,B2DATA
        CALL  GETDATA
        CALL  BD100
        LD    B,4
        CALL  SPCS
        LD    A,B3DATA
        CALL  GETDATA
        CALL  BD100
        LD    B,3
        CALL  SPCS
        LD    A,HRDATA
        CALL  GETDATA
        CALL  BD100
        JP    MAIN

;       DB    CR
;       DB    '12345678901234567890123456'
;       DB    '#####   #.###    ####    ####'
;       DB    CR
        DB    '   H       2B      3B     HR'
;       DB    CR
        DB    '*'
        DW    PUTH
;       DB    '####    ####    ####    ####'

SCRN24:
        DB    '+'
        DB    FUN4+FUN1+FUN2+FUN3+CURRGHT      ;0FFH         ;ENABLE ALL KEYS
;       DB    '12345678901234567890123456

DB    '*'
        DW    PPNAM

;       DB    'X.LAST NAME           POS'
;       DB    CR
;       DB    'CITY,TEAMNAME          ##'
;       DB    CR
        DB    '  ID            G         E'
;       DB    '####           ####     ####'
;       DB    '              G         E'
;       DB    CR
        DB    '*'
        DW    PUTG

;       DB    '         ####      ####'
;       DB    CR
;       DB    '                   CHA'
        DB    CR
;       DB    '                  #####'
        DB    CR

DB    CR
        DB    '1989       TREND      LIFE'
```

```
WKY24:
        DB      '?'

DB      '>'
        DB      FUN4
        DW      SCRN22

DB      '*'
        DW      SETTYPE

DB      '>'
        DB      CURRGHT
        DW      SCRN23

DB      '>'
        DB      FUN1
        DW      SCRN24

DB      '>'
        DB      FUN2
        DW      TREND

DB      '>'
        DB      FUN3
        DW      SCRN24

DB      '@'
        DW      WKY24

PUTG:
;       ID                      G       E
;'####1234567890####1234####'
        LD      HL,(PLAYER)
        CALL    BD1000
        LD      B,10
        CALL    SPCS
        LD      A,GDATA
        CALL    GETDATA
        CALL    BD1000
        LD      B,4
        CALL    SPCS
        LD      A,EDATA
        CALL    GETDATA
        CALL    BD1000
        JP      MAIN
;       DB      '####123456###1234###123###'
;       DB      '                G       E'
;       DB      '                ####    ####'

SCRN25:
        DB      '+'
        DB      FUN4+FUN1+FUN2+FUN3+CURLFT       ;0FFH           ;ENABLE ALL KEYS
;       DB      '12345678901234567890123456
        DB      '*'
        DW      PPNAM
;       DB      'X.LAST NAME              POS'
;       DB      CR
```

```
;       DB      'CITY,TEAMNAME              ##'
;       DB      CR
;           DB      '12345678901234567890123456'
        DB      '    R       SB'
        DB      CR
        DB      '*'
        DW      PUTR

;       DB      '####       ###'
        DB      CR
        DB      ' RBI       CS     SLG'
        DB      CR
        DB      '*'
        DW      PUTRBI

;       DB      '####    ####   #.###'
        DB      CR
        DB      '                         '
        DB      CR
        DB      '1989       TREND      LIFE'

WKY25:
        DB      '?'

DB      '>'
        DB      FUN4
        DW      SCRN22

DB      '*'
        DW      SETTYPE

DB      '>'
        DB      CURLFT
        DW      SCRN23

DB      '>'
        DB      FUN1
        DW      SCRN25

DB      '>'
        DB      FUN2
        DW      TREND

DB      '>'
        DB      FUN3
        DW      SCRN25
        DB      '@'
        DW      WKY25

TRENDP:
        DB      '+'
        DB      FUN4
;       DB      '12345678901234567890123456
        DB      '*'
        DW      PPNAM
;       DB      'X.LAST NAME         POS'
        DB      CR
```

```
;       DB      'CITY,TEAMNAME              ##'
;       DB      CR
;               DB      '12345678901234567890123456'
        DB      '   ERA     K      WA     PR'
;       DB      '#.###123####123####123####
;
;       DB      '#.###123####123####123####

DB      '*'
        DW      PUTTERA
        DB      '?'
        DB      '*'             ;GET ME BACK... TO CURRENT
        DW      RFTRDA
RFTRDA:
        SUB     A
        LD      (TYPE),A
        LD      HL,SCRN23A
        JP      SPTN
PUTTERA:
        SUB     A
LTERA:
        LD      (TYPE),A
        CALL    CALERA          ;CALULATE ERA
        LD      B,3
        CALL    SPCS
        LD      A,KDATA
        CALL    GETDATA
        CALL    BD1000
        LD      B,3
        CALL    SPCS
        LD      A,WADATA
        CALL    GETDATA
        CALL    BD1000
        LD      B,3
        CALL    SPCS
; PITCHING RATIO.... WHAT A PAIN...
        LD      A,HADATA
        CALL    GETDATA
        PUSH    HL
        LD      A,WADATA
        CALL    GETDATA
        POP     DE
        ADD     HL,DE
; TEST FOR ZERO HERE
        LD      A,L
        OR      H
        JR      Z,ERRPR         ;SUPER STAR ON HIT OR WALKS
NSPRSTR:
        PUSH    HL              ;WA + HA  SAVE IT  * 3
        POP     DE
        ADD     HL,HL
        ADD     HL,DE
        PUSH    HL              ;SAVE (WA+HA) * 3

SUB     A
        LD      (DPP),A         ;DEMICAL POINT PLACEMENT = 3 NO DP
        LD      HL,2
FDP:
        LD      (CONT),HL
```

```
        POP  HL
        PUSH HL

LD   (TMP),HL        ;(WA+HA)*3

LD   HL,0
        LD   (TMP+2),HL

LD   A,IPDATA
        CALL GETDATA
        LD   BC,(CONT)
        CALL MULTPLY
        POP  HL
        PUSH HL         ;IP
        CALL DIVIDE
        LD   DE,200
        AND  A
        SBC  HL,DE
        JR   NC,NMULT10
        LD   A,(DPP)
        CP   3
        JR   NC,NMULT10     ;DONE..
        INC  A
        LD   (DPP),A
; GET CONSTANT MULT BY 10
        LD   HL,(CONT)  ;NEED CONSTANT
; MULT BY 10
        ADD  HL,HL
        PUSH HL
        POP  DE
        ADD  HL,HL
        ADD  HL,HL
        ADD  HL,DE
        JR   FDP
; NUMBER TOOOOOO BIG...... MORE THAN 3 DIGITS
ERRPR:
        LD   A,'-'
        RST  OUTCH
        RST  OUTCH
        RST  OUTCH
        RST  OUTCH
        JR   FOP
NMULT10:
        ADD  HL,DE

SRL  H          ;ROUND UP
        RR   L
        JR   NC,RNDUPA
; ROUND UP.....
        INC  HL
RNDUPA:
        POP  DE         ;BALANCE STACK
        LD   DE,100
        LD   B,1
        CALL CKDP
        CALL BCDCONV
        LD   DE,10
        CALL CKDP
        CALL BCDCONV
```

```
        CALL  CKDP
        LD    A,L
        ADD   A,30H
        RST   OUTCH
FOP:
        LD    A,(TYPE)
        AND   A
        JP    NZ,MAIN
        CALL  DOCR
        LD    A,2
        JP    LTERA

CKDP:
        LD    A,(DPP)
        CP    3
        JR    NZ,DT

LD    A,'.'
        RST   OUTCH

LD    A,3
DT:
        INC   A
        LD    (DPP),A
        RET

TREND:
; NON-PITCHER TREND SCREEN

DB    '+'
        DB    FUN4
;       DB    '12345678901234567890123456
        DB    '*'
        DW    PPNAM
;       DB    'X.LAST NAME             POS'
        DB    CR
;       DB    'CITY,TEAMNAME            ##'
;       DB    CR
;           DB    '12345678901234567890123456'
        DB    '   BA    HR    SB    RBI'
;       DB    '#.###123####123####123####
;
;       DB    '#.###123####123####123####

DB    '*'
        DW    PUTTBA
        DB    '?'
        DB    '*'           ;GET ME BACK... TO CURRENT
        DW    RFTRD
RFTRD:
        SUB   A
        LD    (TYPE),A
        LD    HL,SCRN23
        JP    SPTN
;       DB    '   BA    HR    SB    RBI'
;       DB    '#.###123####123####123####
```

```
PUTTBA:
     SUB   A
NLTRND:
     LD    (TYPE),A    ;SET TO CURRENT SEASON
; GET HITS
     LD    A,HDATA
     CALL  GETDATA
     PUSH  HL          ;SAVE HITS
     LD    A,ABDATA
     CALL  GETDATA
     POP   DE          ;RESTORE HITS IN DE
     PUSH  HL          ;SAVE @ BATS
     EX    DE,HL       ;HL CONTAINS HITS

LD    BC,2000     ;* 2000
     CALL  MULTPLY     ;2000*HITS

POP   HL          ;POP

CALL  DIVIDE
     CALL  PUTFACT     ;PUT UP BA #.###
     LD    B,3
     CALL  SPCS
     LD    A,HRDATA
     CALL  GETDATA
     CALL  BD1000
     LD    B,3
     CALL  SPCS
     LD    A,SBDATA
     CALL  GETDATA
     CALL  BD1000
     LD    B,3
     CALL  SPCS
     LD    A,RBIDATA
     CALL  GETDATA
     CALL  BD1000
     LD    A,(TYPE)
     AND   A
     JR    NZ,FSH
     CALL  DOCR
     LD    A,2         ;TRENDS DATA
     JR    NLTRND
FSH:
     JP    MAIN

;    DB    '12345678901234567890123456'
;    DB    '   R      SB'
;    DB    '####1234###'
PUTR:
     LD    A,RDATA
     CALL  GETDATA
     CALL  BD1000
     LD    B,4
     CALL  SPCS
     LD    A,SBDATA
     CALL  GETDATA
     CALL  BD100
     JP    MAIN
;    DB    ' RBI     CS      SLG'
```

```
;       DB      '####123####12#.###'
PUTRBI:
        LD      A,RBIDATA
        CALL    GETDATA
        CALL    BD1000
        LD      B,3
        CALL    SPCS
        LD      A,CSDATA
        CALL    GETDATA
        CALL    BD1000
        LD      B,2
        CALL    SPCS
; OK SLUGGING PERCENTAGE..
        LD      A,HDATA
        CALL    GETDATA
        PUSH    HL      ;SAVE HL
        LD      A,B2DATA
        CALL    GETDATA
        EX      DE,HL
        POP     HL
        ADD     HL,DE
        PUSH    HL
        LD      A,B3DATA
        CALL    GETDATA
        EX      DE,HL
        POP     HL
        ADD     HL,DE
        ADD     HL,DE
        PUSH    HL
        LD      A,HRDATA
        CALL    GETDATA
        EX      DE,HL
        POP     HL
        ADD     HL,DE
        ADD     HL,DE
        ADD     HL,DE
        PUSH    HL              ;SAVE TOP OF SLG VALUE

LD      A,ABDATA
        CALL    GETDATA
        POP     DE              ;RESTORE TOP VALUE
        PUSH    HL              ;SAVE DIVISOR
        EX      DE,HL

; HL NOW HAS IPDATA...
; GET

LD      BC,2000
        CALL    MULTPLY
        POP     HL
        CALL    DIVIDE

CALL    PUTFACT
        JP      MAIN
UPDATE:
        DB      '+'
        DB      0FFH    ;DISABLE ALL KEYS
;       DB      '12345678901234567890123456'
        DB      '    UPDATE PROGRAM'
        DB      CR
        DB      CR
```

```
        DB      '  ATTACH PICKUP TO PHONE'
        DB      CR
        DB      CR
        DB      CR
        DB      CR
        DB      CR
        DB      ' PRESS ANY KEY WHEN READY'
        DB      '?'
        DB      '>'
        DB      FUN4
        DW      SCRN02          ;GOTO MAIN SCREEN
UPDAIL:
        DB      '+'
        DB      0FFH    ;ENABLE RETURN ONLY....
        DB      '         UPDATE PROGRAM'
        DB      CR
        DB      '         PLEASE DIAL'
        DB      CR
        DB      CR
        DB      '    AL      1-900-456-1234'
        DB      CR
        DB      '    NL      1-900-456-6789'
        DB      CR
        DB      CR
        DB      CR
        DB      ' PRESS ANY KEY WHEN DIALED'
        DB      '?'
        DB      '>'
        DB      FUN4
        DW      SCRN01

DB      '+'             ;CLEAR SCREEN
        DB      FUN4    ;ONLY ALLOW FUNTION 4 TO PASS
; ENABLE FUN4 ONLY
        DB      '$'     ;LOAD TIMER
        DB      150     ;2.5 MINUTES

DB      '+'
        DB      00
        DB      CR,CR,CR,CR
        DB      '      DOWNLOAD COMPLETE'
        DB      '$'
        DB      5       ;5 SECONDS
        DB      '@'
        DW      SCRN01          ;MAIN SCREEN.

; LET DO THE MODEM SOFTWARE... NOW...
MYTEAM:
        DB      '+'
        DB      FUN1+FUN3+FUN4
        DB      '            MY TEAM'
        DB      CR
        DB      CR
        DB      '    1. CREATE/EDIT TEAM'
        DB      CR
        DB      CR
        DB      '    2. SHOW TEAM'
        DB      CR,CR,CR
        DB      '1                          2'
LMYTM:
```

```
        DB      '?'     ;GET KEY
        DB      '*'
        DW      SELWICH

;       DB      '>'
;       DB      FUN1
;       DW      CRTEAM          ;CREAT TEAM
;       DB      '>'
;       DB      FUN3
;       DW      SHTEAM          ;SHOW TEAM
        DB      '@'
        DW      LMYTM                   ;GOTO LMYTM
SELWICH:
        SUB     A
        LD      --(FLAG),A      ;CLEAR ALL FLAGS

LD      HL,SCRN02       ;BACK UP 1 SCREEN
        LD      A,(ACC)
        CP      FUN4
        JR      Z,SPTN          ;GOTO SCRN02

CP      FUN1
        JR      Z,SETSEL
        CP      FUN3
        JR      Z,SETSHW
        JP      MAIN

SETSEL:
        LD      A,(FLAG)
        SET     SEL,A
        RES     SHOW,A
        LD      (FLAG),A        ;SET SELECT FLAG
        LD      HL,SCRN20
SPTN:
        LD      (POINTER),HL    ;GOTO ROSTER STUFF.
        JP      MAIN
SETSHW:
        SUB     A
        LD      (ROSTOFF),A     ;SET TO BEGIN OF ROSTER
        LD      (ACC),A         ;PUTEAM DOES CAN DATA

LD      A,(FLAG)
        SET     SHOW,A
        RES     SEL,A
        LD      (FLAG),A        ;SET SELECT FLAG

LD      A,(MLLEN+NUMDIV)        ;TLEG           ;LEAGUE NUMBER MAX..
        LD      (WLEAGUE),A     ;POINTERS TO MY ROSTER
        LD      HL,SCRN22
        LD      (POINTER),HL
        JP      MAIN            ;PUT UP ROSTER..
CATLEDBB:
        DB      '+'
        DB      FUN1+FUN2+FUN3+CURDWN+FUN4      ;0FFH   ;ENABLE  ALL
KEYS    ;CLEAR SCREEN
        DB      '    CURRENT SEASON         '
        DB      CRDWN
;       DB      CR
        DB      '    BATTING LEADERS'
        DB      CR
```

```
        DB      CR
;       DB      '12345678901234567890123456
        DB      '  1. BATTING AVERAGE - BA'
        DB      CR
        DB      '  2. HOME RUNS - HR'
        DB      CR
        DB      '  3. RUNS BATTED IN - RBI'
        DB      CR
        DB      CR
        DB      '1              2              3'
WCATLEDBB:
        DB      '?'
        DB      '>'
        DB      FUN4
        DW      SCRN17
        DB      '>'
        DB      CURDWN
        DW      CNTBB                   ;SORTED BAS
        DB      '*'
        DW      LEDBB
        DB      '@'
        DW      WCATLEDBB
LEDBB:
        LD      A,(ACC)
        CP      FUN1
        JP      Z,SRTBA
        CP      FUN2
        JP      Z,SRTHR
        CP      FUN3
        JP      Z,SRTRBI
        JP      MAIN
CNTBB:
        DB      '+'
        DB      FUN1+FUN3+CURUP+FUN4    ;0FFH          ;ENABLE ALL KEYS
;CLEAR SCREEN
        DB      '      CURRENT SEASON      '
        DB      CRUP
;       DB      CR
        DB      '      BATTING LEADERS'
        DB      CR
        DB      CR
;       DB      '12345678901234567890123456
        DB      '  4. STOLEN BASES - SO'
        DB      CR
        DB      CR
        DB      '  5. HIT - H'
        DB      CR
        DB      CR
        DB      '4                          5'
WBB:
        DB      '?'
        DB      '>'
        DB      CURUP
        DW      CATLEDBB                ;SORTED BAS
        DB      '>'
        DB      FUN4
        DW      SCRN17
        DB      '*'
        DW      CWBB
        DB      '@'
```

```
        DW    WBB
CWBB:
        LD    A,(ACC)
        CP    FUN1
        JP    Z,SRTSO
        CP    FUN2
        JP    Z,SRTH
        CP    FUN3
        JP    Z,SRTH
        JP    MAIN

SRTHR:
        LD    A,6
        JR    SRT
SRTRBI:
        LD    A,7
        JR    SRT
SRTH:
        LD    A,9
        JR    SRT
SRTSO:
        LD    A,8
        JR    SRT
SRTERA:
        SUB   A
        JR    SRT
SRTK:
        LD    A,1
        JR    SRT
SRTSV:
        LD    A,2
        JR    SRT

SRTRP:
        LD    A,4
        JR    SRT
SRTWL:
        LD    A,3
        JR    SRT

SRTBA:
        LD A,5    ;BATTING AVERAGE
SRT:
; INTERRUPT SHOULD BE DISABLE HERE
        DI

CALL WHOQUAL

EI

LD    A,0FFH
        LD    (KMASK),A  ;CLEAR KEY MASK

; INIT TOP OF SCREEN...
        SUB   A
NCATL:
        LD    (CATLEDS),A      ;INIT TOP OF CATAGORY LEADS

CALL CLRSCRN
```

```
; FALL INTO CATALORY LISTS...
; LISTP HAS LIST OF PLAYERS
; NLIST HAS NUMBER OF PLAYER IN LIST
; FIRST PUT UP HEADER..
      LD    HL,CTITLE       ;CATAGORY LEADER IN
LDOP:
      LD    A,(HL)
      CP    CR
      JR    Z,SLTIT
      RST   OUTCH
      INC   HL
      JR    LDOP

SLTIT:
      LD    C,0
      LD    HL,LTITLES      ;LIST OF TITLES HEADINGS
LFTITLE:
      LD    A,(CATSCRN)     ;WHICH SCREEN
      CP    C
      JR    Z,GCATS         ;GOT THE SCREEN
      INC   C
; FIND CARRIGE RETURN
NCR:
      LD    A,(HL)
      INC   HL
      CP    CR
      JR    NZ,NCR
      JR    LFTITLE
GCATS:
      LD    A,(HL)
      INC   HL
      CP    CR
      JR    Z,DCATS
      RST   OUTCH
      JR    GCATS
DCATS:
      CALL  DOCR
      CALL  DOCR
; LIST PLAYERS.....
; OK LIST PLAYERS....
; FORMAT IS
; NAME,CITY, DATA...

LD    A,(CATLEDS)

LD    C,A
; LIST COUNTER

AHEY:
      LD    A,(NLIST)  ;NUMBER OF PLAYERS IN LIST
      AND   A
      JP    Z,NPLYERS  ;NO PLAYERS TO LIST
      CP    C          ;DONE:
      JP    Z,NPLYERS  ;DONE...
      LD    A,(CATLEDS)
      ADD   A,5
      CP    C
      JP    Z,NPLYERS

LD    A,C
      ADD   A,A        ;MULTPLY BY 2
```

```
        LD      HL,LISTP
        RST     CONV
        LD      A,(HL)
        INC     HL
        LD      H,(HL)
        LD      L,A
        LD      (PLAYER),HL
; HL CONTAINS PLAYERS ID NUMBER
        PUSH    BC
        CALL    SETNAMS

LD    A,15   ;SET CURRSOR X POSITION
      LD    (CURSOR+1),A    ;MSB
      SUB   A
      LD    (TYPE),A        ;GET CITY NAME
      LD    A,TMDATA        ;GET TEAM DATA
      CALL  GETDATA         ;GET DATA
      LD    A,L
      AND   1FH             ;ONLY LOOK @ TEAM
      LD    B,A
      ADD   A,A
      ADD   A,B
      LD    HL,LEG          ;POINT TO CITY
      RST   CONV
      LD    B,3
OCR:
      LD    A,(HL)
      RST   OUTCH
      INC   HL
      DJNZ  OCR
; DISPLAY SORTED VALUE
      LD    A,19
      LD    (CURSOR+1),A    ;COLUMN
      CALL  GETDFUNC

CALL  DOCR

POP   BC
      INC   C
      JP    AHEY
GETDFUNC:
      CALL  GETFUNC   ;GET FUNCTION IN QUESTION
      EX    DE,HL
      LD    A,(CATSCRN)
      ADD   A,A
      LD    HL,LDFUNC ;LIST OF DISPLAY FUNCTIONS
      RST   CONV
      LD    A,(HL)
      INC   HL
      LD    H,(HL)
      LD    L,A
      PUSH  HL
      EX    DE,HL
      RET           ;GOTO...
LDFUNC:
      DW    PUTFACT   ;ERA
      DW    BD10000   ;K'S
      DW    BD10000   ;SAVES
      DW    BD10000   ;WINS
      DW    PUTFACT   ;PITCHING RATIO
      DW    PUTFACT   ;BATTING AVERAGE
```

```
        DW      BD10000         ;HR
        DW      BD10000         ;RBI
        DW      BD10000         ;SO
        DW      BD10000         ;HITS

NPLYERS:
; DETERMINE CURSOR POSITION
        LD      H,26
        LD      L,0
        LD      (CURSOR),HL
; POINT CURSOR TO TOP LEFT HAND CORNER
        LD      C,CRUP
        LD      A,(CATLEDS)
        AND     A
        JR      NZ,SETCURS
; OK BUT IS IT DOWN OR NOTHING
        LD      C,CRDWN
        LD      B,A
        LD      A,(CATLEDS)
        ADD     A,5
        CP      B
        JR      NC,SETCURS
        LD      C,' '           ;NOTHING
SETCURS:
        LD      A,C
        RST     OUTCH

LD      HL,WKEYSB
        LD      (POINTER),HL
        JP      MAIN
WKEYSB:
        DB      '?'     ;WAIT FOR KEY
; OK GOT A KEY
        DB      '*'
        DW      CATS
CATS:
        LD      A,(ACC)
        CP      CURUP
        JR      NZ,NCRP

LD      A,(CATLEDS)
        AND     A
        JR      Z,NPLYERS ;NOPE
        SUB     A               ;LIST FROM TOP
        JP      NCATL
NCRP:
        CP      CURDWN
        JR      NZ,NCRDWN
;
        LD      A,(NLIST) ;TOTAL NUMBER OF PLAYERS ON LIST
        LD      B,A
        LD      A,(CATLEDS)
        ADD     A,5
        CP      B
        JR      NC,NPLYERS
        LD      A,5
        JP      NCATL
NCRDWN:
        CP      FUN4
        JR      NZ,NPLYERS
        LD      A,(CATSCRN)
```

```
        ADD   A,A
        LD    HL,READDS  ;RETURN ADDRESSES
        RST   CONV
        LD    A,(HL)
        INC   HL
        LD    H,(HL)
        LD    L,A
        LD    (POINTER),HL
        JP    MAIN
READDS:
        DW    CATLEDPH
        DW    CATLEDPH
        DW    CATLEDPH
        DW    CNTPH
        DW    CNTPH
        DW    CATLEDBB
        DW    CATLEDBB
        DW    CATLEDBB
        DW    CNTBB
        DW    CNTBB

CTITLE:
;       DB    '12345678901234567890123456

DB    'CATAGORY LEADERS IN '
        DB    CR
LTITLES:
        DB    'ERA'
        DB    CR
        DB    'K'
        DB    CR
        DB    'SV'
        DB    CR
        DB    'WINS'
        DB    CR
        DB    'PR'
        DB    CR
        DB    'BA'
        DB    CR
        DB    'HR'
        DB    CR
        DB    'RBI'
        DB    CR
        DB    'SO'
        DB    CR
        DB    'H'
        DB    CR

LD    BC,26      ;NUMBER OF CHARACTERS
CATLEDPH:
        DB    '+'
        DB    FUN1+FUN2+FUN3+CURDWN+FUN4   ;0FFH      ;ENABLE ALL KEYS ;CLEAR SCREEN
        DB    '    CURRENT SEASON    '
        DB    CURDWN
```

```
        DB     CR
        DB     '    PITCHING LEADERS'
        DB     CR
;       DB     '12345678901234567890123456
        DB     CR
        DB     ' 1. EARNED RUN AVERAGE-ERA'
;       DB     CR
        DB     ' 2. STIKE OUTS - K'
        DB     CR
        DB     ' 3. SAVES - SV'
        DB     CR
        DB     CR
        DB     '1              2              3'
WCATLEDPH:
        DB     '?'
        DB     '>'
        DB     CURDWN
        DW     CNTPH

DB     '>'
        DB     FUN4
        DW     SCRN17
        DB     '*'
        DW     BCNTPH
        DB     '@'
        DW     WCATLEDPH
BCNTPH:
        LD     A,(ACC)
        CP     FUN1
        JP     Z,SRTERA
        CP     FUN2
        JP     Z,SRTK
        CP     FUN3
        JP     Z,SRTSV
        JP     MAIN

CNTPH:
        DB     '+'
        DB     FUN1+FUN3+CURUP+FUN4        ;0FFH       ;ENABLE ALL KEYS
;CLEAR SCREEN
        DB     '    CURRENT SEASON    '
        DB     CURUP
        DB     '    PITCHING LEADERS'
        DB     CR
;       DB     '12345678901234567890123456
        DB     CR
        DB     ' 4. WINS & LOSES'
        DB     CR
        DB     CR
        DB     ' 5. PITCHING RATIO - RP'
        DB     CR
        DB     CR
        DB     '4                            5'
WPH:
        DB     '?'
        DB     '>'
        DB     CURUP
        DW     CATLEDPH

DB     '>'
```

```
        DB      FUN4
        DW      SCRN17
        DB      '*'
        DW      BWPH
        DB      '@'
        DW      WPH
BWPH:
        LD      A,(ACC)
        CP      FUN1
        JP      Z,SRTWL
        CP      FUN2
        JP      Z,SRTRP
        CP      FUN3
        JP      Z,SRTRP
        JP      MAIN

POOP
;*************************************
;*************************************
; START OF USER MEMORY  8000-FFFF
;*************************************
;*************************************
        ORG     8000H
STRAM:
; CHARACTERS 40X8 CHARACTER BY LINES.
; SAME AS KEY EXECPT BIT SET WHEN CHANGED.
;*************************************
;*************************************
; START OF DISPLAY MEMORY
DSPADD:
;       EQU     9000H
;
;
;*************************************
DISPLAY DS      20*64
; DISPAY - TEAM STANDING TO CALULATION
;          OF TEAM STANDING
;
REMEM   EQU     1
TDAT EQU        5       ;OFFSET INTO DISPLAY
SDAT EQU        7       ;OFFSET INTO DISPLAY USED IN SORT
PRT1 EQU        10
PRT2 EQU        11
DBUFFER EQU     12
EDISP:
DISIZE  EQU     EDISP-DISPLAY

CATLEDS DS      1       ;USED IN CATAGORY FOR LIST LENGTHS
CATSCRN DS      1       ;WHICH CATAGORY WE ARE LISTING

FUNCTION DS     2
TSORT   DS      1

NLIST   DS      1       ;LENGTH OF SORT
CURPAG  EQU     NLIST           ;USED IN INFO/YESTERDAYS GAMES
LISTP   DS      10*2    ;LIST OF 10 PLAYERS ID'S USED
                        ;IN ALL CATAGORY STANDING STUFF
                                ;(1 BYTE USED IN INFO/YESTERDAYS GAME
PAGNUM  EQU     LISTP                   SAME AS ABOVE
TXTPTR  EQU     LISTP+1  ;(2 BYTES)
TBASE   DS      1       ;USED IN GETDATA ROUTINE AND WRTDATA ROUTINE
```

```
             ; INTERFACE TO DATABASE
CONT DS    2      ;USED IN CALULATION OF PITCHING RATIO.
DPP  DS    1      ;USED IN CALULATION FOR TRENDS, PITCHING RATIO
FLAG DS    1      ;USED TO GENERATE/DISPLAY MY TEAM
SEL  EQU   0      ;ALLOW EDITING AND SELECTING TEAM
SHOW EQU   1      ;ALLOWS TO DISLAY MY TEAM
REQUEST    DS   1    ;USED IN GETDATA ROUTINE TO FIND DATA
PLAYER     DS   2    ;CONTAINS PLAYERS ID
CHOICE     DS   1    ;CHOICE OF 3 FORMATS
SPITCH     DS   2    ;START OF PITCHING ID'S
WDATA      DS   1    ;WHAT IS IT YOU WANT... TYPE DATA
;            SEE TABLE   ODATA,MDATA,ETC... FOR DETAILS
TYPE DS    1      ;USEDIN DATABASE CODE  IN GETSTUFF
; BIT 0 1/0 PITCH/NONPITCHER
; BIT 2,1   0,0   CURRENT DATA
;           0 1   LIFE TIME DATA
;           1 0   TREND INFO
PTR  DS    2      ;PLAYER POINTER USED IN GETSTUFF
WINS DS    1      ;USED IN TEAM STANDINGS (TEMP) CAL SCREEN
LOSES      DS    1    ;USED IN TEAM STANDINGS (TEMP) CAL SCREEN

WLEAGUE    DS    1    ;WORK REG OF LEAGUE
LEAGUE     DS    1    ;SEE SALE,SALW,SNLE,SNLW ETC
ROSTOFF    DS    1    ;ROSTER OFFSET

POINTER    DS    2    ;TEXT POINTER FOR INTERRUPTOR
ACC  DS    1      ;USED IN KEY ROUTINE AND PART OF TEXT
                  ;INTERRUPTOR

KMASK      DS    1    ;ANDED WITH CHNGED KEY TO DETERMINE
                     ;IF KEY HIT... WHILE OUTPUTING CHARACTER
                     ;ELSE IGNORE OUTPUTING CHARACTERS

KHIT DS    1      ;OUTCHR ROUTINE 'THOUGHT' WE GOT A HIT.

TMP  DS    12

LATCH      DS    1

; INTERRUPT DRIVEN
ITIME      DS    1
HERTZ      DS    1       ;COUNT 50HZ'S
KEY  DS    1
FUN1 EQU   10H
FUN2 EQU   20H
FUN3 EQU   40H
FUN4 EQU   80H
CURUP      EQU   01H
CURDWN     EQU   02H
CURLFT     EQU   04H
CURRGHT    EQU   08H
; ACTIVE LOW SENSE
;0 - UP
;1 - DOWN
;2 - LEFT
;3 - RIGHT
;4 - F1
;5 - F2
;6 - F3
;7 - F4
```

```
KCHNG       DS    1
; INTERRUPT WRITTEN ABOVE

XY          DS    2       ;WHERE IF LD   BC,(XY)
                          ; B = X POSITION (0-159)
                          ; C = Y POSITION (0-63)
CURSOR      DS    2       ; WHERE IF LD  BC(CURSOR)
                          ; B = X CHARACTER POSITION (0-19)
                          ; C = Y LINE NUMBER 0-7
REVID       DS    1       ;CONTAIN XOR MASK FOR CGEN
;MASK       DS    1       ;CONTAINS MASK OF SCREEN BYTE

; ALL DATA TO LCD IS XOR WITH THIS BYTE

SCREEN      DS    8*SCRNWID ;ASCII VALUES FOR SCREEN

SCRNSIZ     EQU   8*SCRNWID

CHARPO      DS    2              ;TEMP USED IN CHARACTER OUTPUT
                          ;CGEN POSITION ADDRESS

; TEAM STANDINGS....

;GAMSTND    DS    2*MXTM   ;TOTLEG  WIN/LOSES IN ORDER BY LEAGUE

TSTND       DS    MXTM ;TOTLEG    ;TEAM STANDING

TMLEG       DS    MXTM+1   ;LIST OF TEAM LENGTHS

ROSTER      DS    1000*2
            DS    MYNUMPLY*2      ;NUMBER OF PLAYERS
ERAM:
ERRT:
;********************
;********************
RSDATAB     EQU   9000H      ;START OF DATABASE
INFRIG      EQU   RSDATAB-ERRT   ;HOPEFULLY WILL GENERATE ERROR
                          ;IF OPERATING SYSTEM INFRINGS ON DATABASE
;********************
;********************
; SEE I???? VALUES FOR DEFINITIONS OF DATA
LEGLENS     EQU   ILEGLENS-SDATAB+RSDATAB
MLLEN       EQU   IMLLEN-SDATAB+RSDATAB
NPNAM       EQU   INPNAM-SDATAB+RSDATAB
PNAM  EQU   IPNAM-SDATAB+RSDATAB
NPD   EQU   INPD-SDATAB+RSDATAB
PD    EQU   IPD-SDATAB+RSDATAB
TEAMNAMES EQU   ITEAMNAMES-SDATAB+RSDATAB
GAMSTND     EQU   IINITWL-SDATAB+RSDATAB
LEG   EQU   ILEG-SDATAB+RSDATAB
ALNEWS      EQU   IALNEWS-SDATAB+RSDATAB
NLNEWS      EQU   INLNEWS-SDATAB+RSDATAB
ALRESULT    EQU   IALRES-SDATAB+RSDATAB
NLRESULT    EQU   INLRES-SDATAB+RSDATAB
NUMNON      EQU   INUMNON-SDATAB+RSDATAB
NUMPITS     EQU   INUMPITS-SDATAB+RSDATAB
   ;********************
   ;********************
   ;********************
   ;********************
         END
```

V PREVIOUS KEY
(CAT LIST)

(UPDATE)
```
 ---------------------------
| o SET ERROR FLAG IN CURRENT |
|   PLAYERS DATABASE ACCESS  |
|   BY LEAGUE ROSTER         |
 ---------------------------
              |
              v
```

(NOTX)
```
      /----------------------\  YES
     <   TEST PREVIOUS KEY  ? >---> (POWER UP)
      \----------------------/
              | NO
              v
 ---------------------------
| o CLEAR "CHECKSUM"         |
| o CLEAR "CYCLE COUNTER"    |
| o SET "BPOINTER"=0         |
| o SET "BIT COUNTER"=START  |
 ---------------------------
              |
              v
```

(GETCYC)
```
 ---------------------------
| o CLEAR "COUNT"            |
 ---------------------------
              |
              v
      /----------------------\  YES
----><   TEST MODEM INPUT = 0? >--->-----
|     \----------------------/          |
|             | NO                      |
|             v                         |
|     ---------------------------       |
|    | o INCREMENT "COUNT"       |      |
|     ---------------------------       |
|             |                         |
|             v                         |
| NO  /----------------------\  YES     |
-----<   TEST "COUNT" = 0    >--->- (NOTX)
      \----------------------/          |
                                        |
        --------------------------------
       |
       v
      /----------------------\  YES
----><   TEST MODEM INPUT = 1? >--->-----
|     \----------------------/          |
|             | NO                      |
|             v                         |
|     ---------------------------       |
|    | o INCREMENT "COUNT"       |      |
|     ---------------------------       |
|             v                         |
| NO  /----------------------\  YES     |
-----<   TEST "COUNT" = 0    >--->- (NOTX)
      \----------------------/
```

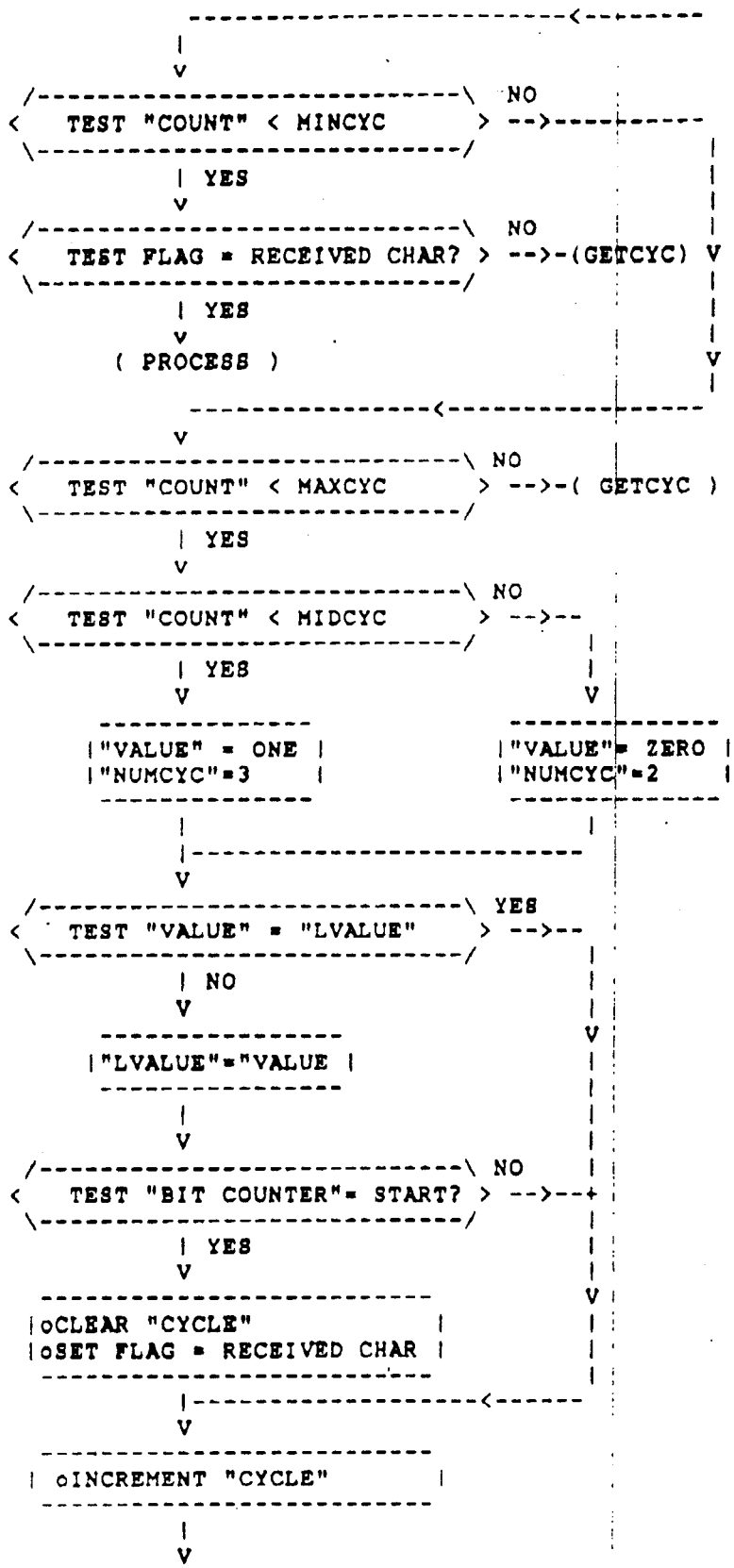

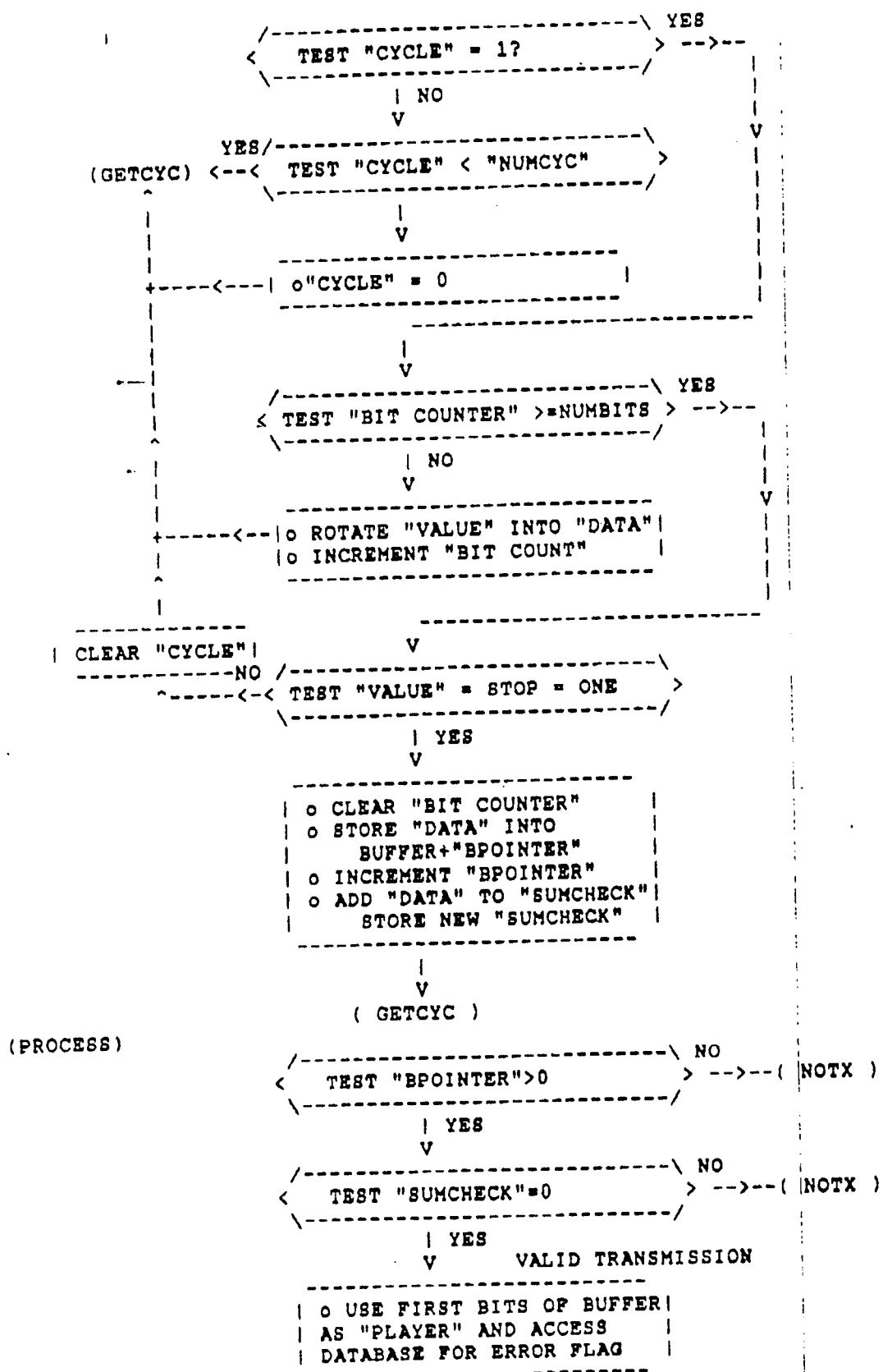

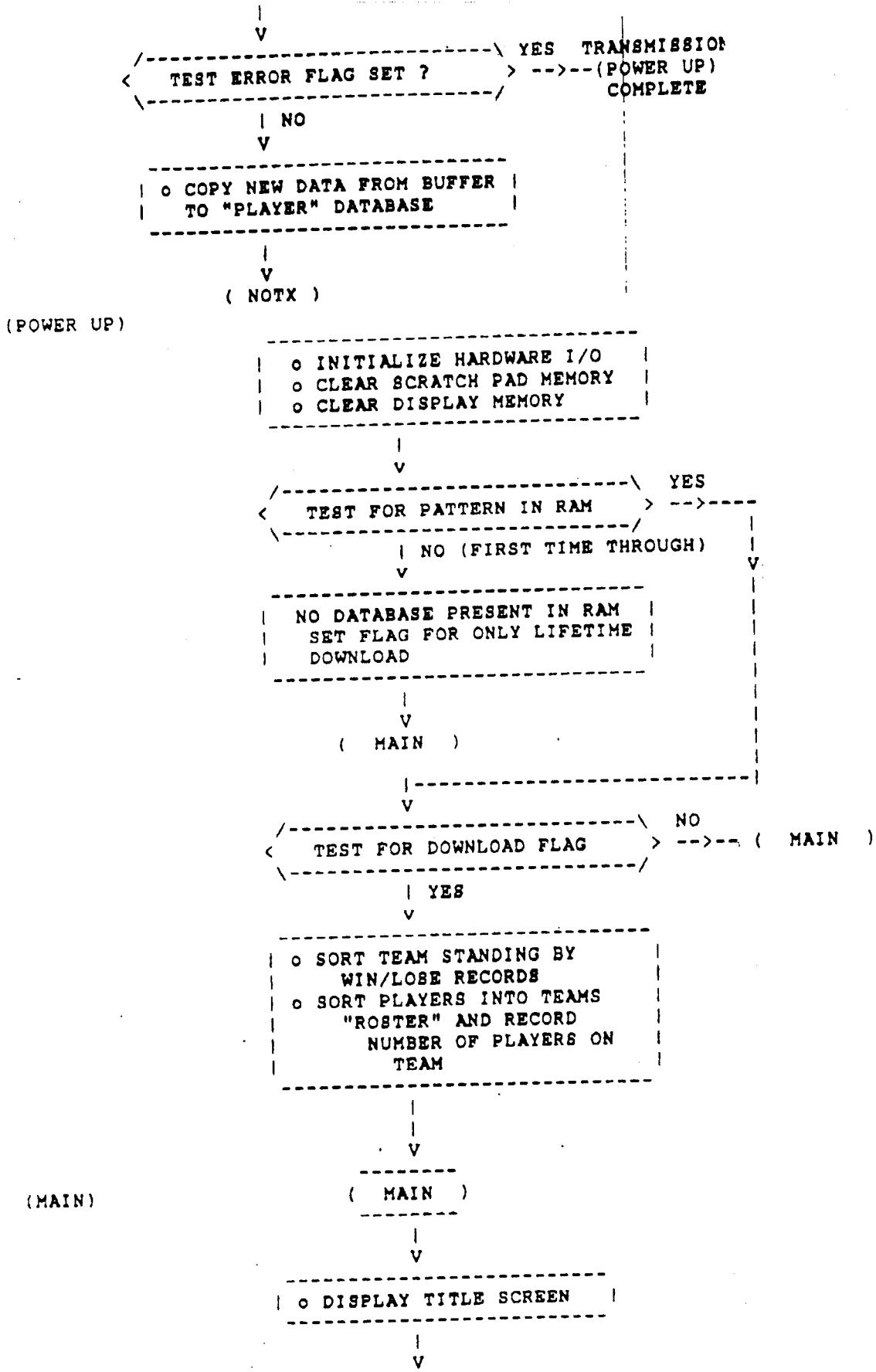

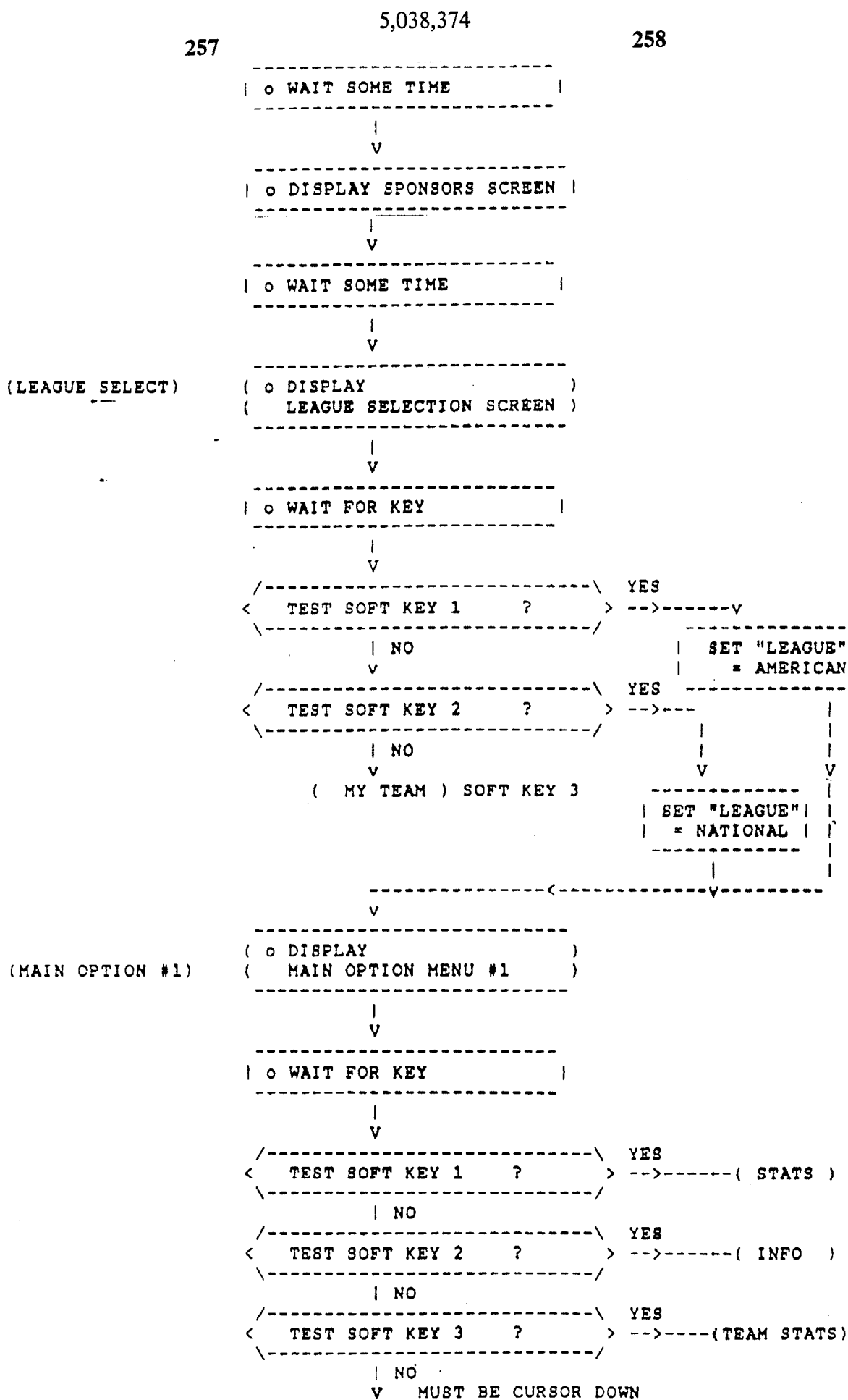

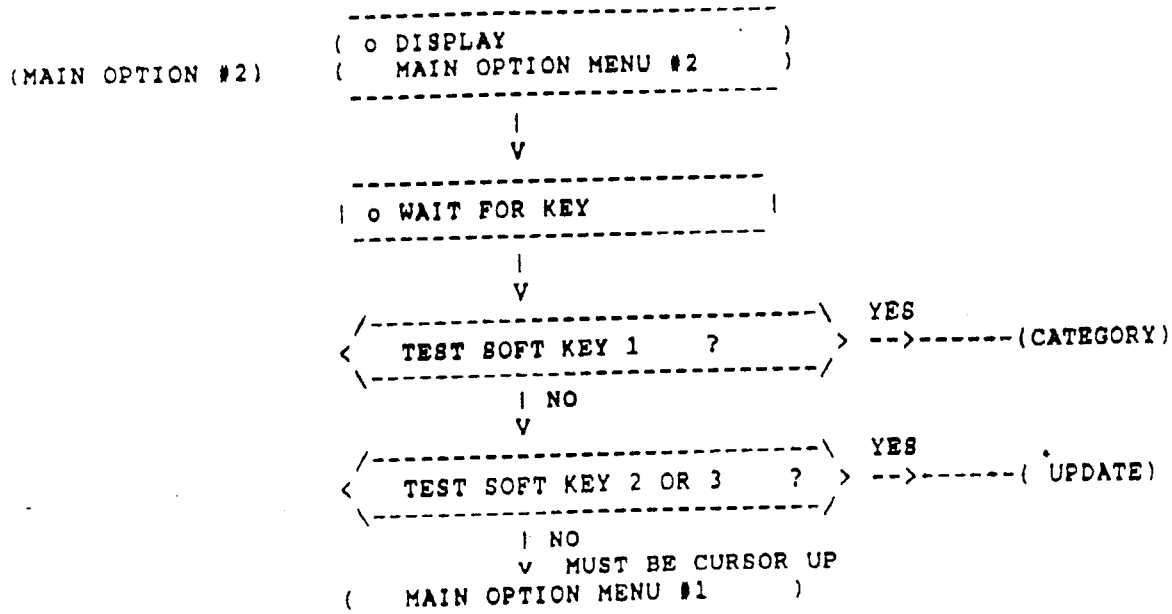
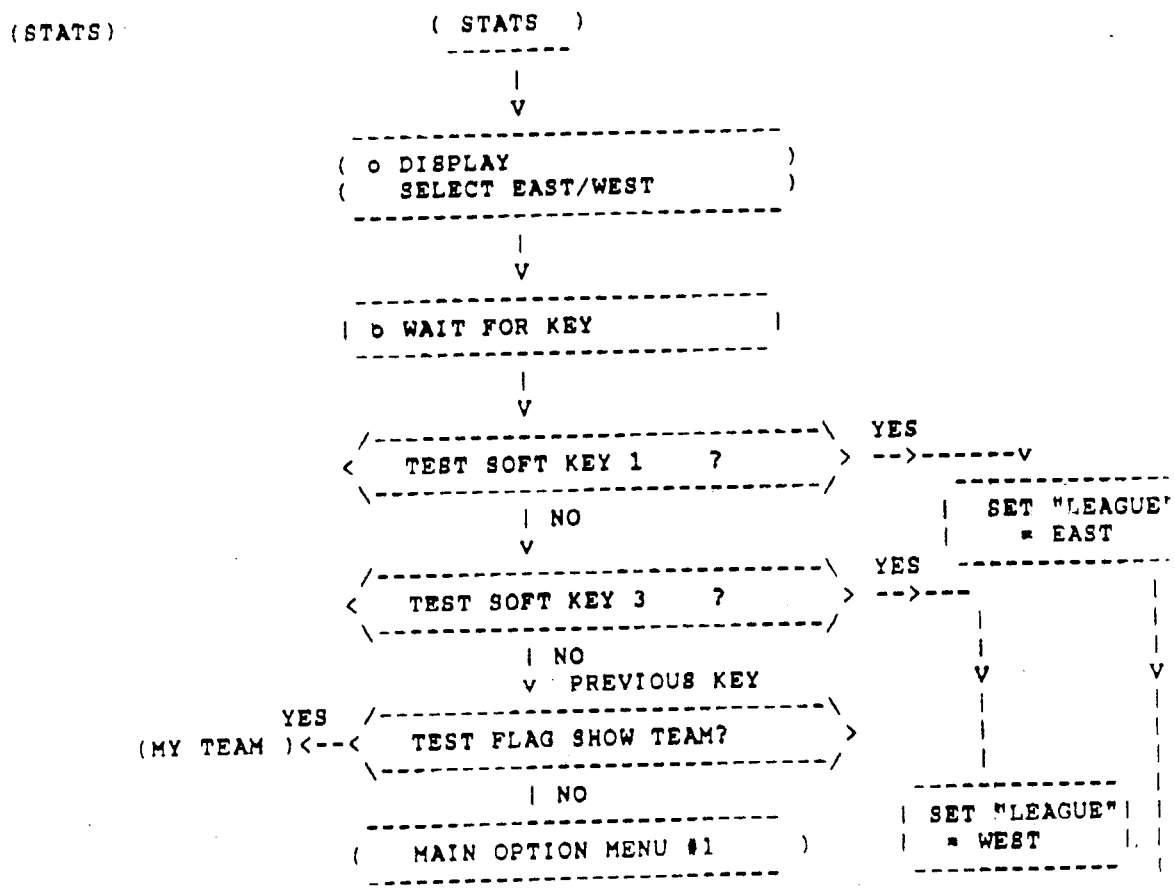

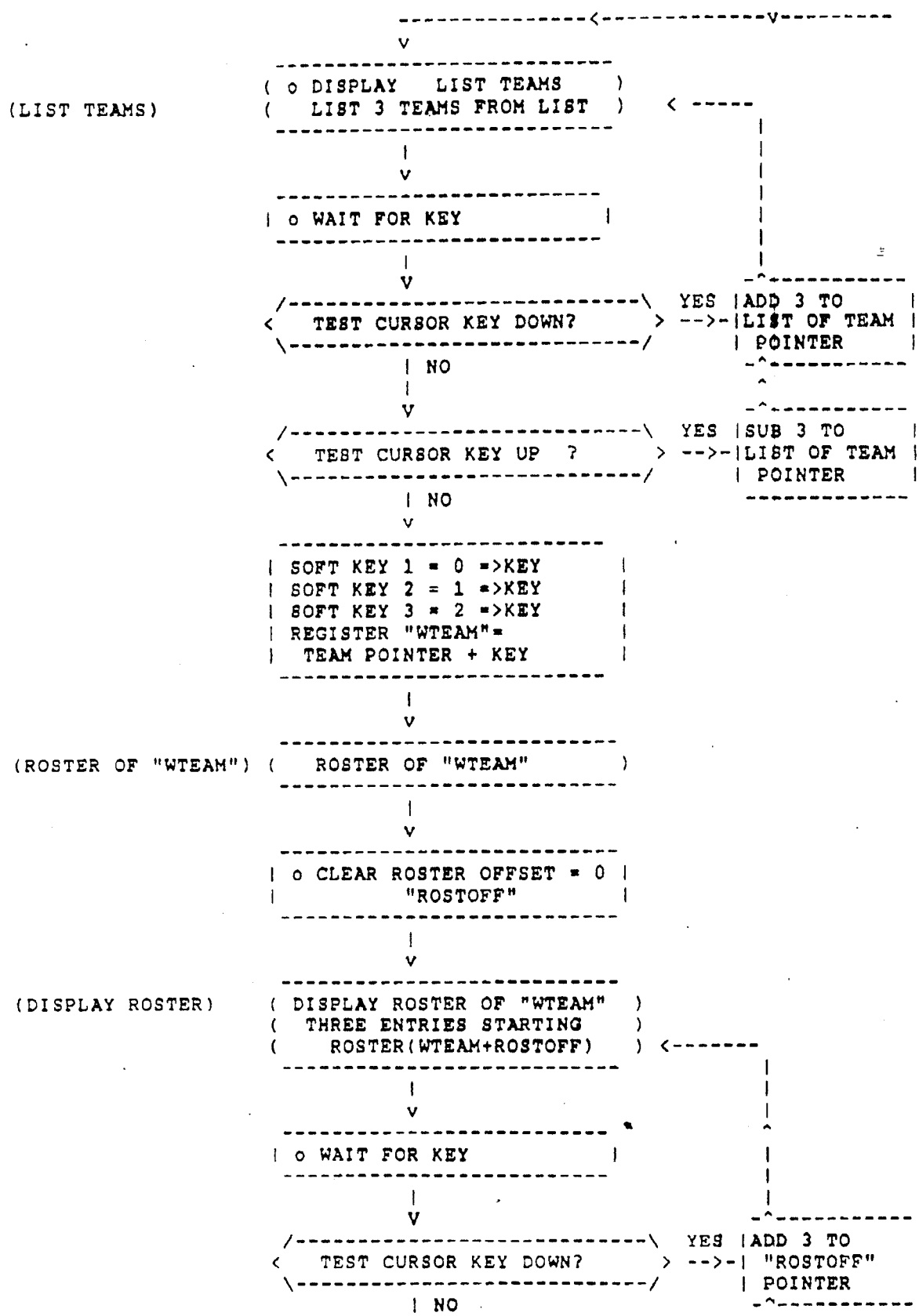

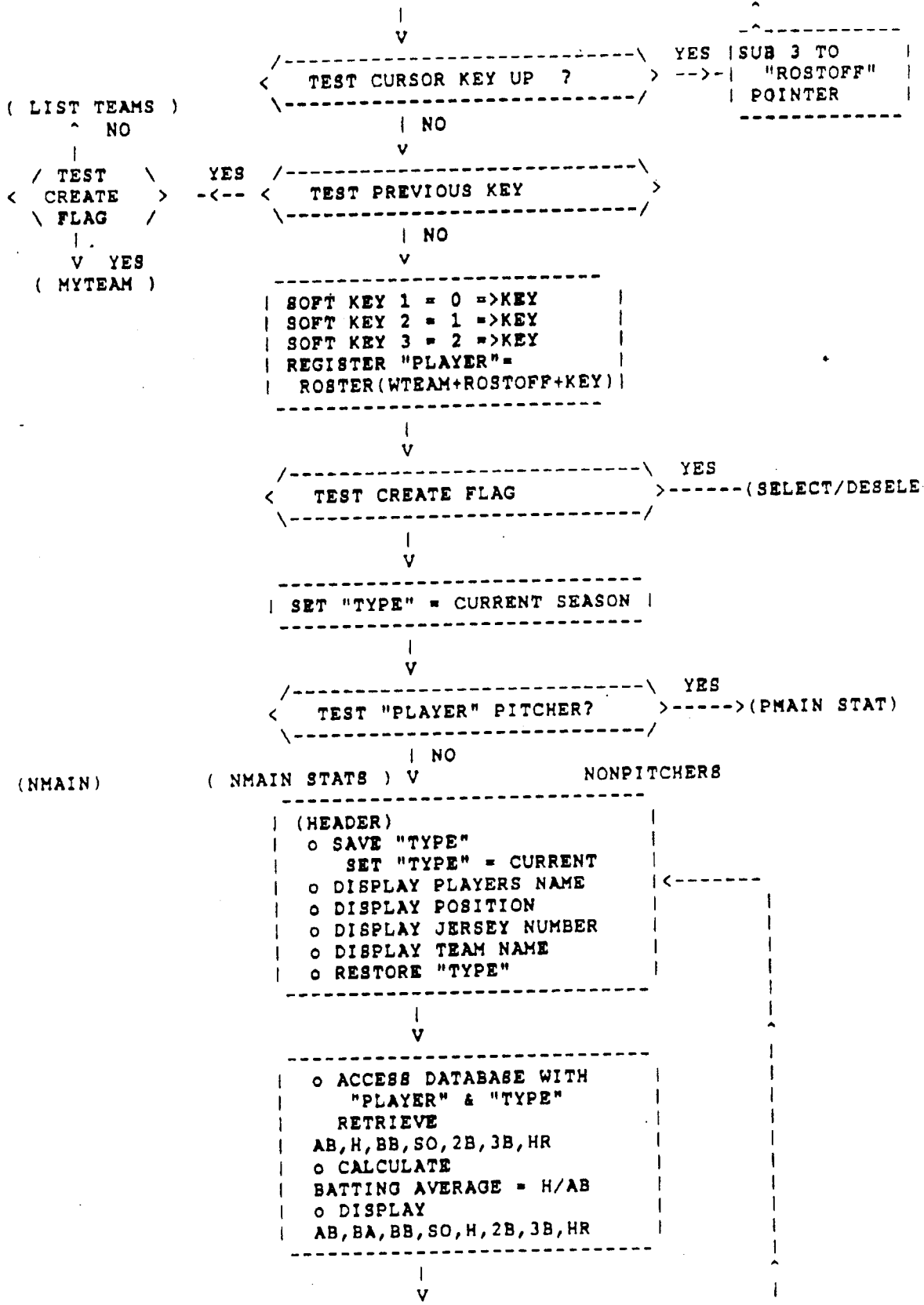

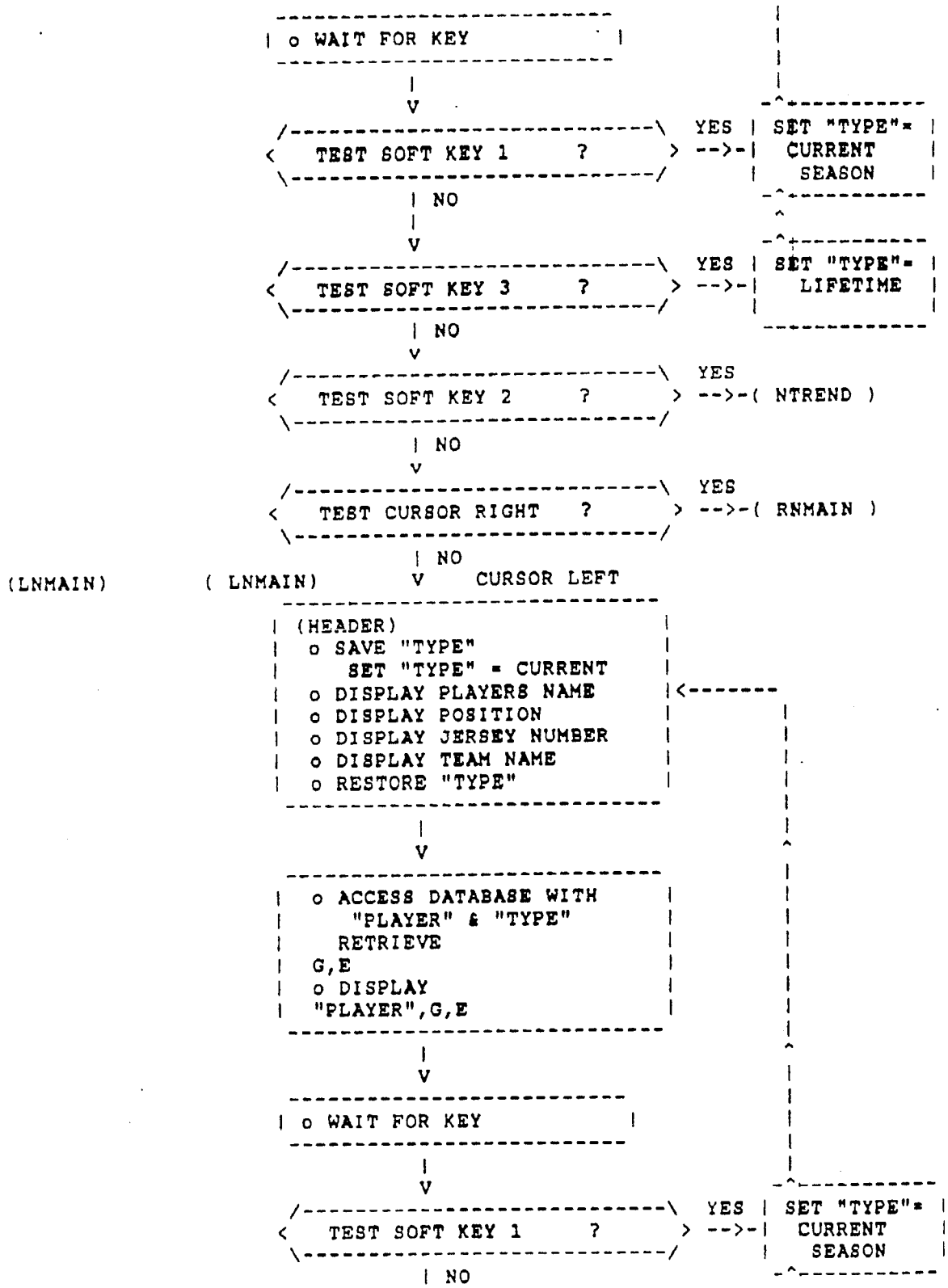

```
                              |
                              v
         /------------------------------\  YES   -------------
         <   TEST SOFT KEY 3      ?     > -->-| SET "TYPE"= |
         \------------------------------/      |   LIFETIME   |
                       | NO                    -------------
                       v
         /------------------------------\  YES
         <   TEST SOFT KEY 2      ?     > -->-( NTREND )
         \------------------------------/
                       | NO
                       v    CURSOR RIGHT
                 ( NMAIN STATS )
```

(SELECT/DESELECT)

```
                 ------------------------------
               / TEST "PLAYER" = ANY PLAYER \ NO
              <   IN MY TEAM ROSTER?          >----------
               \                             /           |
                 ------------------------------          |
                              |YES                       v
                              v                          |
         ----------------------------       ----------------------------
        | REMOVE "PLAYER" FROM       |     | INSERT "PLAYER" IN         |
        | MY TEAM ROSTER             |     | MY TEAM ROSTER             |
         ----------------------------       ----------------------------
                    |                                    |
                    ----->-----------+-----<-------
                                     |
                                     v
                            (DISPLAY ROSTER )
```

( RNMAIN)

```
         ------------------------------------
        | (HEADER)                           |
        |   o SAVE "TYPE"                    |
        |     SET "TYPE" = CURRENT           |
        |   o DISPLAY PLAYERS NAME           |<--------
        |   o DISPLAY POSITION               |        |
        |   o DISPLAY JERSEY NUMBER          |        |
        |   o DISPLAY TEAM NAME              |        |
        |   o RESTORE "TYPE"                 |        |
         ------------------------------------         |
                       |                              |
                       v                              |
         ------------------------------------         |
        |   o ACCESS DATABASE WITH           |        |
        |     "PLAYER" & "TYPE"              |        |
        |     RETRIEVE                       |        |
        |   R,SB,RBI,CS,H,2B,3B,HR,AB        |        |
        |   o CALCULATE                      |        |
        |     SLUGGING PERCENTAGE =          |        |
        |   [H+(2B)+2*(3B)+3*(HR)]/AB        |        |
        |   o DISPLAY                        |        |
        |   R,SB,RBI,CS,SLG                  |        |
         ------------------------------------         |
                       |                              |
                       v                              |
         ------------------------------------         |
        | o WAIT FOR KEY                     |        |
         ------------------------------------         |
                       |                              |
                       v
```

```
        /-------------------------\  YES  | SET "TYPE"=
       <   TEST SOFT KEY 1     ?   > -->- |  CURRENT
        \-------------------------/       |  SEASON
                    | NO                  -^----------
                    |                       ^
                    V                     -^----------
        /-------------------------\  YES  | SET "TYPE"=
       <   TEST SOFT KEY 3     ?   > -->- |  LIFETIME
        \-------------------------/       |
                    | NO                  -+----------
                    V
        /-------------------------\  YES
       <   TEST SOFT KEY 2     ?   > -->-( NTREND )
        \-------------------------/
                    | NO
                    V  CURSOR LEFT
              ( NMAIN STATS )

( NTREND )
                    ------------------------------
                    | (HEADER)                   |
                    |  o SAVE "TYPE"             |
                    |    SET "TYPE" = CURRENT    |
                    |  o DISPLAY PLAYERS NAME    |
                    |  o DISPLAY POSITION        |
                    |  o DISPLAY JERSEY NUMBER   |
                    |  o DISPLAY TEAM NAME       |
                    |  o RESTORE "TYPE"          |
                    ------------------------------
                                  |
                                  V
                    ------------------------------
                    |  o ACCESS DATABASE WITH    |
                    |      "PLAYER" &  CURRENT   |
                    |      RETRIEVE              |
                    |  H,AB,HR,SB,RBI            |
                    |  o CALCULATE               |
                    |  BATTING AVERAGE = H/AB    |
                    |  o DISPLAY                 |
                    |  BA,HR,SB,RBI              |
                    |  o ACCESS DATABASE WITH    |
                    |      "PLAYER" &  TREND     |
                    |      RETRIEVE              |
                    |  H,AB,HR,SB,RBI            |
                    |  o CALCULATE               |
                    |  BATTING AVERAGE = H/AB    |
                    |  o DISPLAY                 |
                    |  BA,HR,SB,RBI              |
                    ------------------------------
                                  |
                                  V
                    ------------------------------
                    | o WAIT FOR KEY             |       ( NMAIN STATS)
                    ------------------------------             ^
                                  |                            |
                                  V                         -^----------
        /-------------------------\  YES  | SET "TYPE"=
       <   TEST SOFT KEY 1     ?   > -->- |  CURRENT
        \-------------------------/       |  SEASON
                    | NO                  -^----------
```

```
                        |
                        v
        /------------------------------\   YES   | SET "TYPE"= |
       <    TEST SOFT KEY 3      ?      >  -->-  |  LIFETIME   |
        \------------------------------/         |             |
                       | NO
                       v  SOFT KEY 2
                    ( NTREND )
_____

( PMAIN STATS )              PITCHERS
                    ------------------------------
                    | (HEADER)                   |
                    |  o SAVE "TYPE"             |
                    |    SET "TYPE" = CURRENT    |
                    |  o DISPLAY PLAYERS NAME    |<--------
                    |  o DISPLAY POSITION="P"    |        |
                    |  o DISPLAY JERSEY NUMBER   |        |
                    |  o DISPLAY TEAM NAME       |        |
                    |  o RESTORE "TYPE"          |        |
                    ------------------------------        |
                                 |                        |
                                 v                        |
                    ------------------------------        |
                    |  o ACCESS DATABASE WITH    |        |
                    |    "PLAYER" & "TYPE"       |        |
                    |    RETRIEVE                |        |
                    |    ER,IP,HA,K,WA,G,W,L     |        |
                    |  o CALCULATE               |        |
                    |    ERA = 9*ER/IP           |        |
                    |  o DISPLAY                 |        |
                    |    IP,HA,K,WA,G,W,L,ERA    |        |
                    ------------------------------        |
                                 |                        |
                                 v                        |
                    ------------------------------        |
                    | o WAIT FOR KEY             |        |
                    ------------------------------        |
                                 |                        |
                                 v                        |
        /------------------------------\   YES   | SET "TYPE"= |
       <    TEST SOFT KEY 1      ?      >  -->-  |  CURRENT    |
        \------------------------------/         |  SEASON     |
                       | NO
                       v
        /------------------------------\   YES   | SET "TYPE"= |
       <    TEST SOFT KEY 3      ?      >  -->-  |  LIFETIME   |
        \------------------------------/         |             |
                       | NO
                       v
        /------------------------------\   YES
       <    TEST SOFT KEY 2      ?      >  -->-( PTREND )
        \------------------------------/
                       | NO
                       v
        /------------------------------\   YES
       <    TEST CURSOR RIGHT    ?      >  -->-( RPMAIN )
        \------------------------------/
                       | NO
                       v   CURSOR LEFT
(LPMAIN)
```

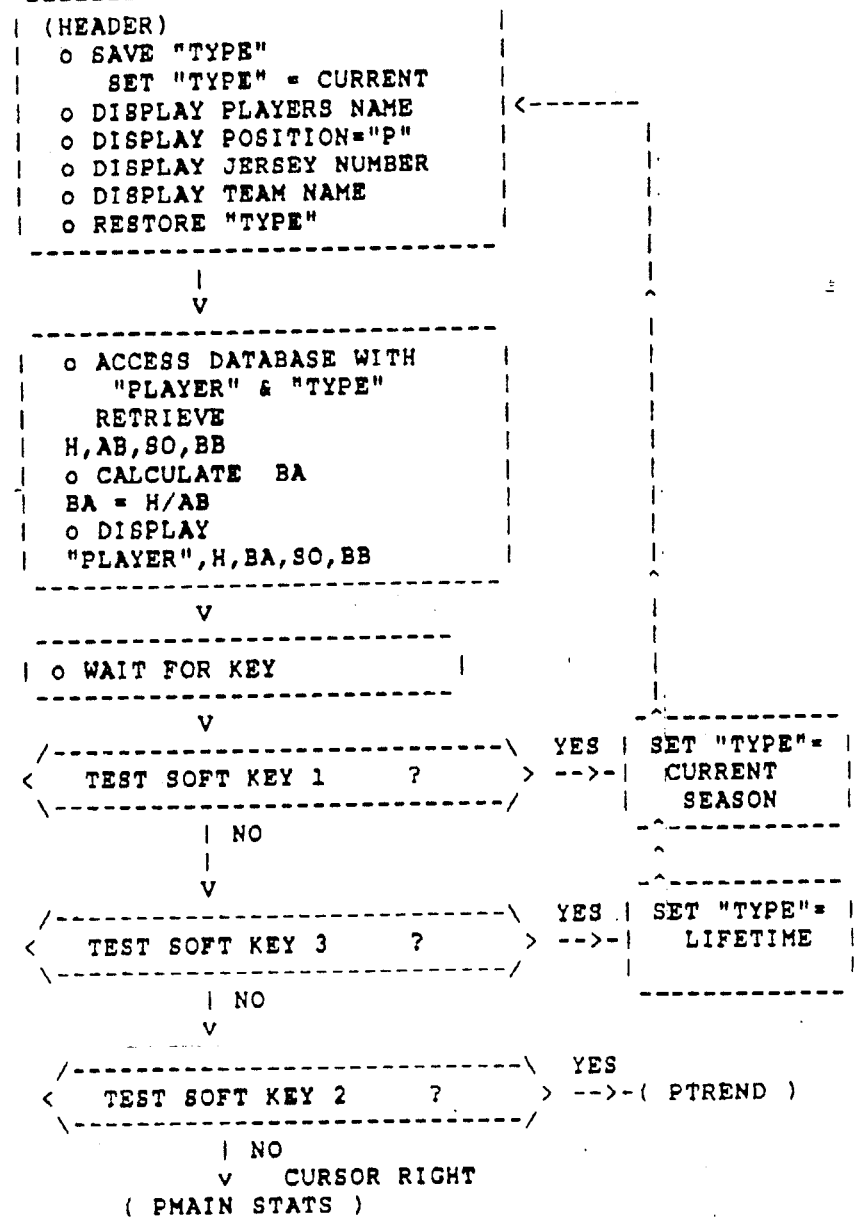
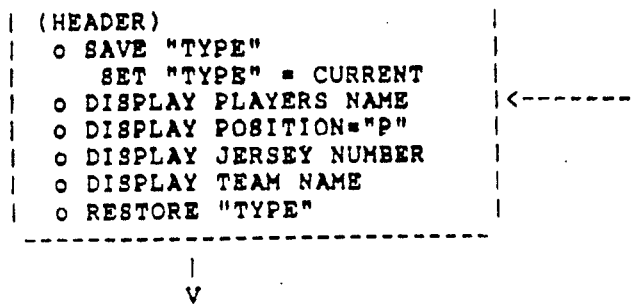

```
         275                                        276
    ---------------------------
    | o ACCESS DATABASE WITH   |
    |     "PLAYER" & "TYPE"    |
    |   RETRIEVE               |
    | GS,SHO,SV,CG,W,L,HA,WA,IP|
    | o CALCULATE              |
    | W%  = W/W+L              |
    | PR  = IP/(HA+WA)         |
    | o DISPLAY                |
    | GS,SHO,SV,CG,W%,PR       |
    ---------------------------
                |
                v
    ---------------------------
    | o WAIT FOR KEY          |
    ---------------------------
                |
                v
    /--------------------------\   YES    -^+-----------
   <    TEST SOFT KEY 1      ?  > -->-| SET "TYPE"=   |
    \--------------------------/       | CURRENT       |
                | NO                   | SEASON        |
                |                      -^-------------
                v
    /--------------------------\   YES    -^+-----------
   <    TEST SOFT KEY 3      ?  > -->-| SET "TYPE"=   |
    \--------------------------/       | LIFETIME      |
                | NO                   ---------------
                v
    /--------------------------\   YES
   <    TEST SOFT KEY 2      ?  > -->-( PTREND )
    \--------------------------/
                | NO
                v   CURSOR LEFT
          ( PMAIN STATS )

( PTREND )
              ---------------------------
              | (HEADER)                |
              |  o SAVE "TYPE"          |
              |      SET "TYPE" = CURRENT|
              |  o DISPLAY PLAYERS NAME |
              |  o DISPLAY POSITION     |
              |  o DISPLAY JERSEY NUMBER|
              |  o DISPLAY TEAM NAME    |
              |  o RESTORE "TYPE"       |
              ---------------------------
                          |
                          v
              ---------------------------
              | o ACCESS DATABASE WITH  |
              |     "PLAYER" &  CURRENT |
              |   RETRIEVE              |
              | ER,IP,W,SV,HA,WA        |
              | o CALCULATE             |
              | ERA = ER*9/IP           |
              | PR  = IP/(HA+WA)        |
              | o DISPLAY               |
              | ERA,W,SV,PR             |
              | o ACCESS DATABASE WITH  |
              |     "PLAYER" &  TREND   |
              |   RETRIEVE              |
              | ER,IP,W,SV,HA,WA        |
              | o CALCULATE             |
              | ERA = ER*9/IP           |
              | PR  = IP/(HA+WA)        |
              | o DISPLAY               |
              | ERA,W,SV,PR             |
              ---------------------------
```

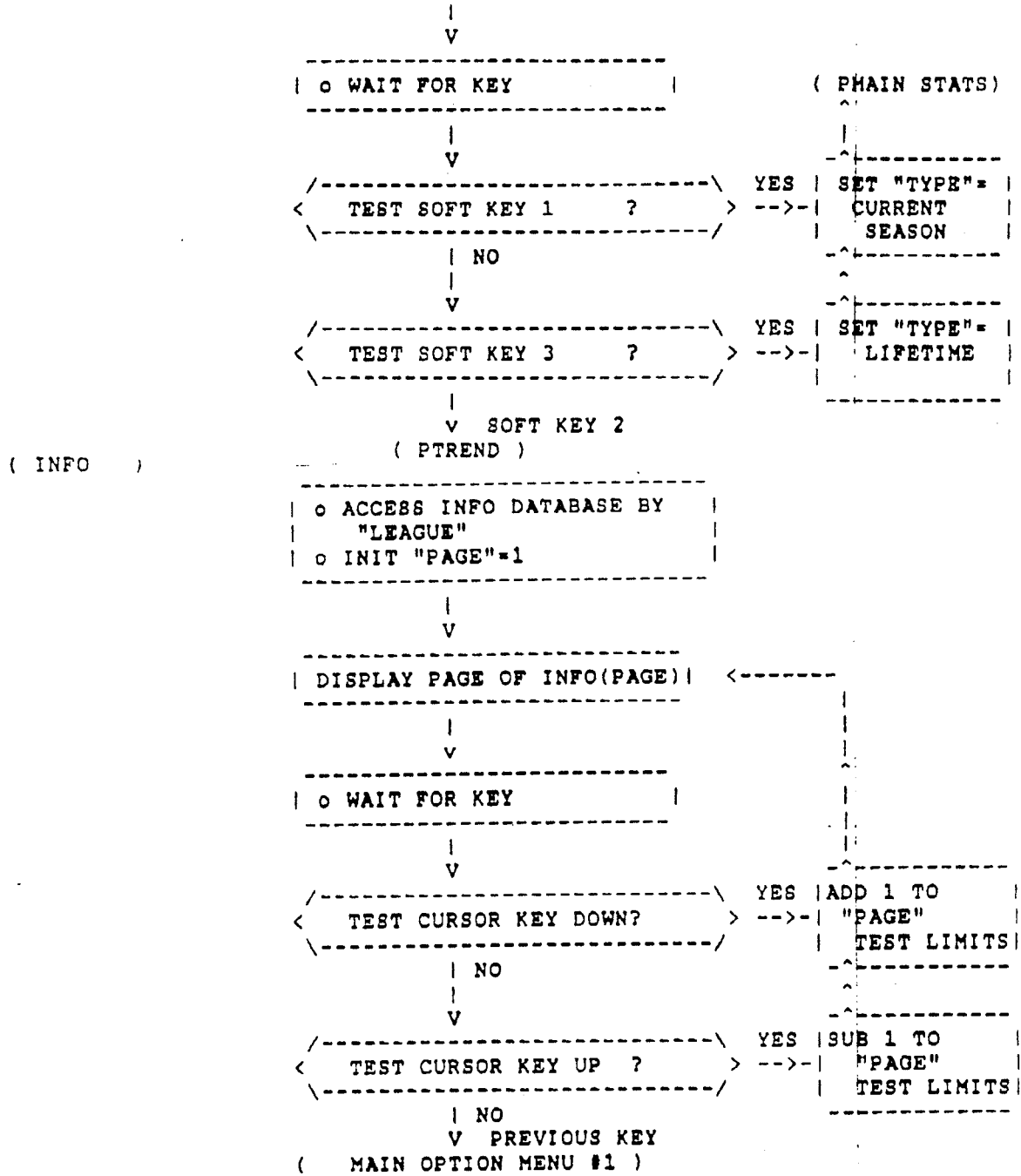
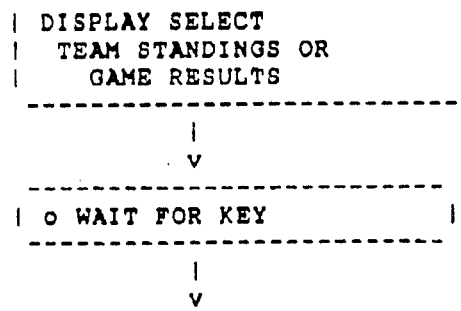

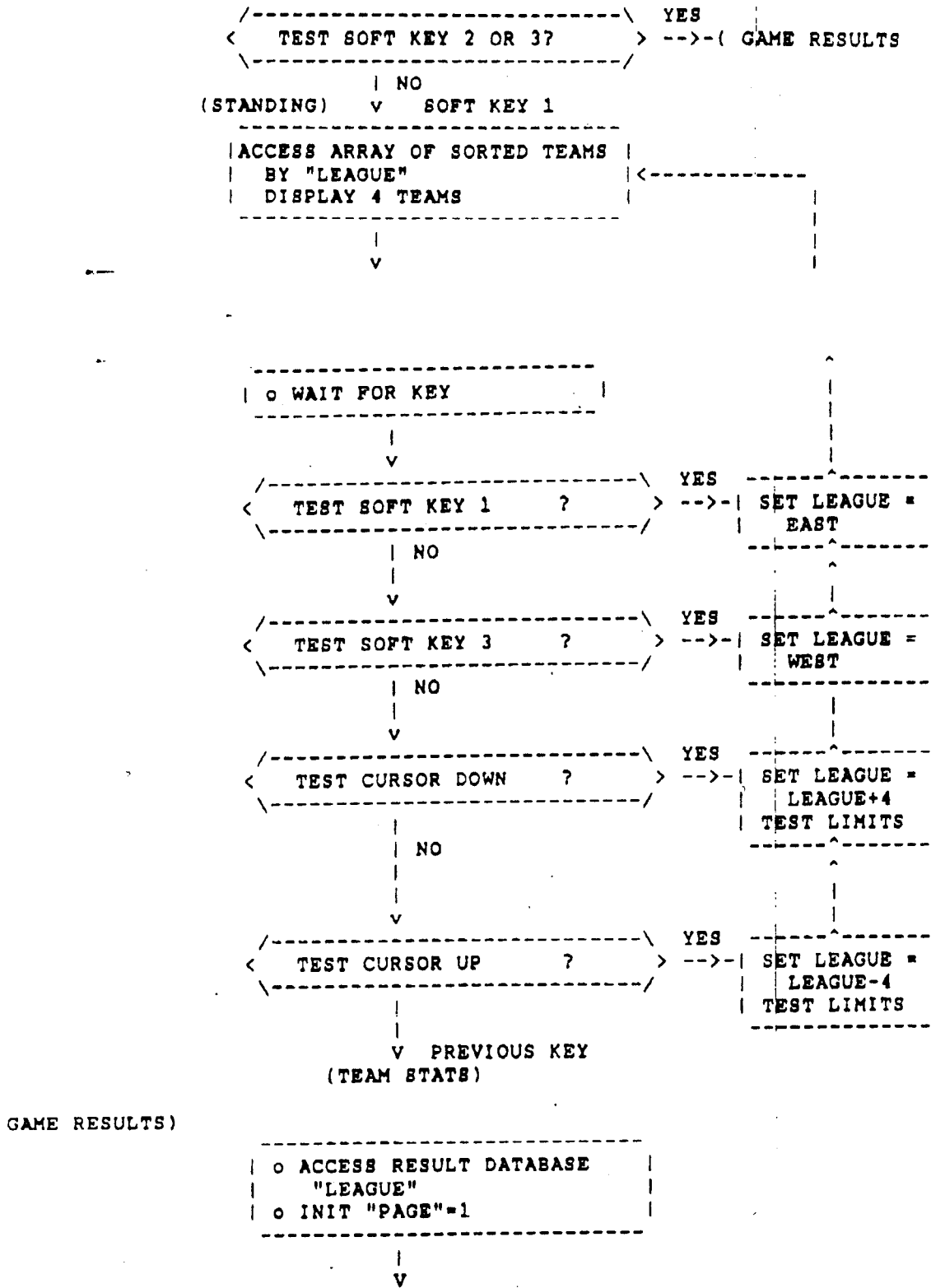

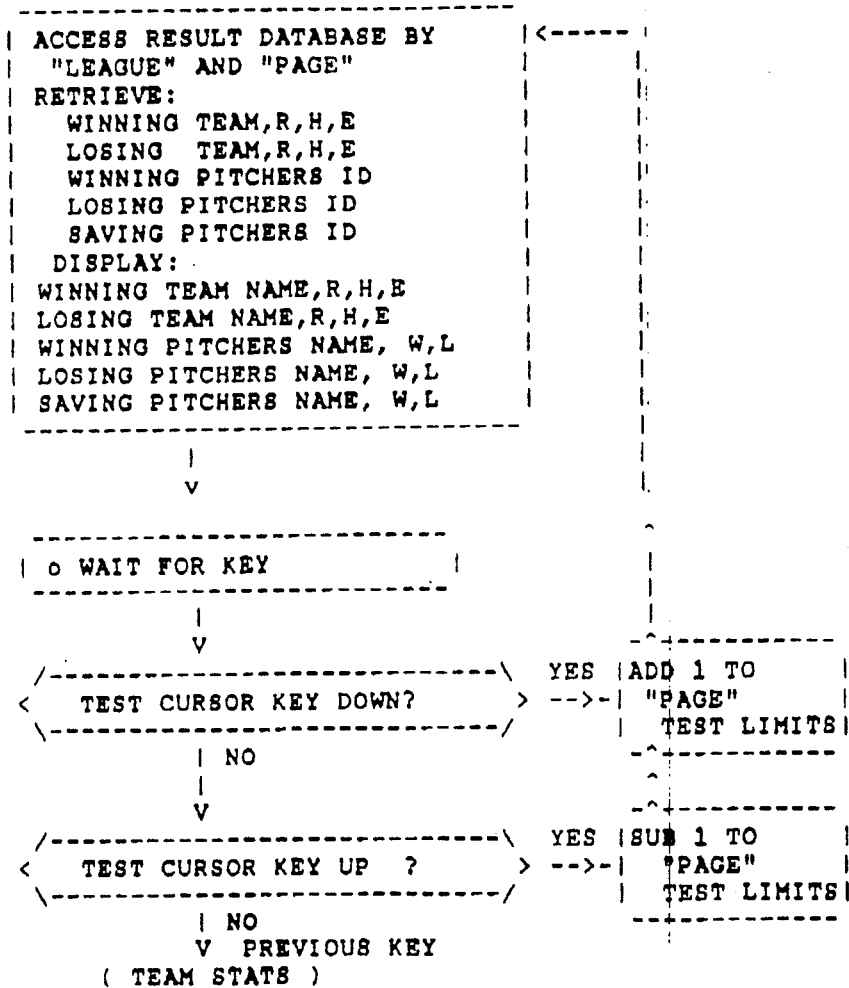
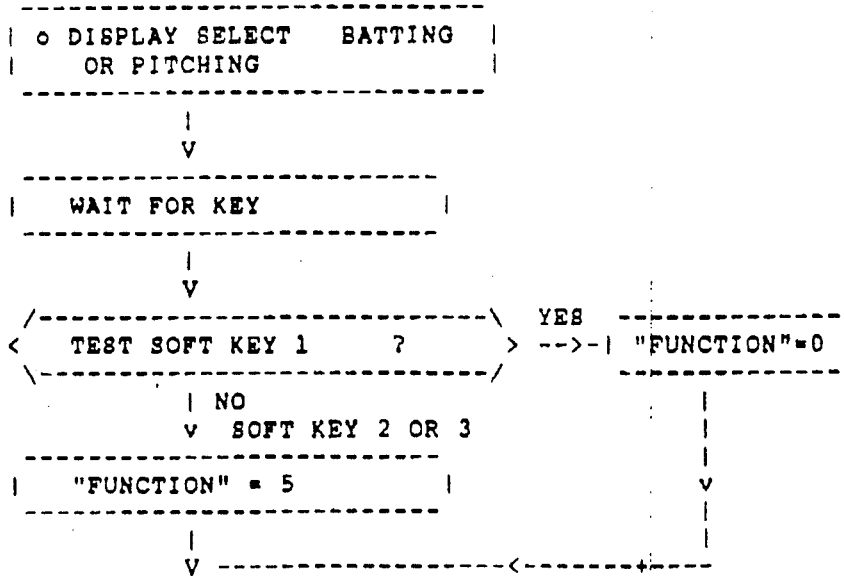

(CAT LIST)

```
-------------------------------
| DISPLAY LIST OF FUNCTIONS   |
|  TO SORT ON LISTED BY       |
|    "FUNCTION"               |
|  DISPLAYING ONLY 3          |
|   FUNCTION AT A TIME        |
|                             |
|   0. BATTING AVERAGE        |
|   1. HOME RUNS              |
|   2. RUNS BATTED IN         |
|   3. STOLEN BASES           |
|   4. HITS                   |
|   5. EARN RUN AVERAGE       |
|   6. STRIKE OUTS            |
|   7. SAVES                  |
|   8. WINS                   |
|   9. PITCHING RATIO         |
-------------------------------
              |
              v
-------------------------------
| o WAIT FOR KEY              |
-------------------------------
              |
              v
/-----------------------------\   YES    ------------
<   TEST CURSOR KEY DOWN?     >  -->-|  ADD 3 TO    |
\-----------------------------/      | "FUNCTION"   |
              | NO                   | TEST LIMITS  |
              |                       ------------
              v
/-----------------------------\   YES    ------------
<   TEST CURSOR KEY UP  ?     >  -->-|  SUB 3 TO    |
\-----------------------------/      | "FUNCTION"   |
              | NO                   | TEST LIMITS  |
                                      ------------
-------------------------------
| SOFT KEY 1 = 0 =>KEY        |
| SOFT KEY 2 = 1 =>KEY        |
| SOFT KEY 3 = 2 =>KEY        |
| REGISTER "FUNCTION"=        |
|  FUNCTION+KEY               |
-------------------------------
              |
              v
-------------------------------
|oACCESS CURRENT DATABASE     |
|  GET PLAYERS THAT QUALIFY   |
|oRETRIEVE DATA REQUIRED FOR  |
| "FUNCTION"INDICATED         |
|oGENERATE CORRESPONDING      |
|  DATA WITH QUALIFYING       |
|  PLAYERS ARRAY              |
|oSORT DATA AND QUALIFYING    |
|  PLAYERS ARRAY              |
|o COPY TOP TEN PLAYERS       |
|   TO CATEGORY BUFFER        |
|o  INIT "CATOFF"=0           |
-------------------------------
              |
              v
```

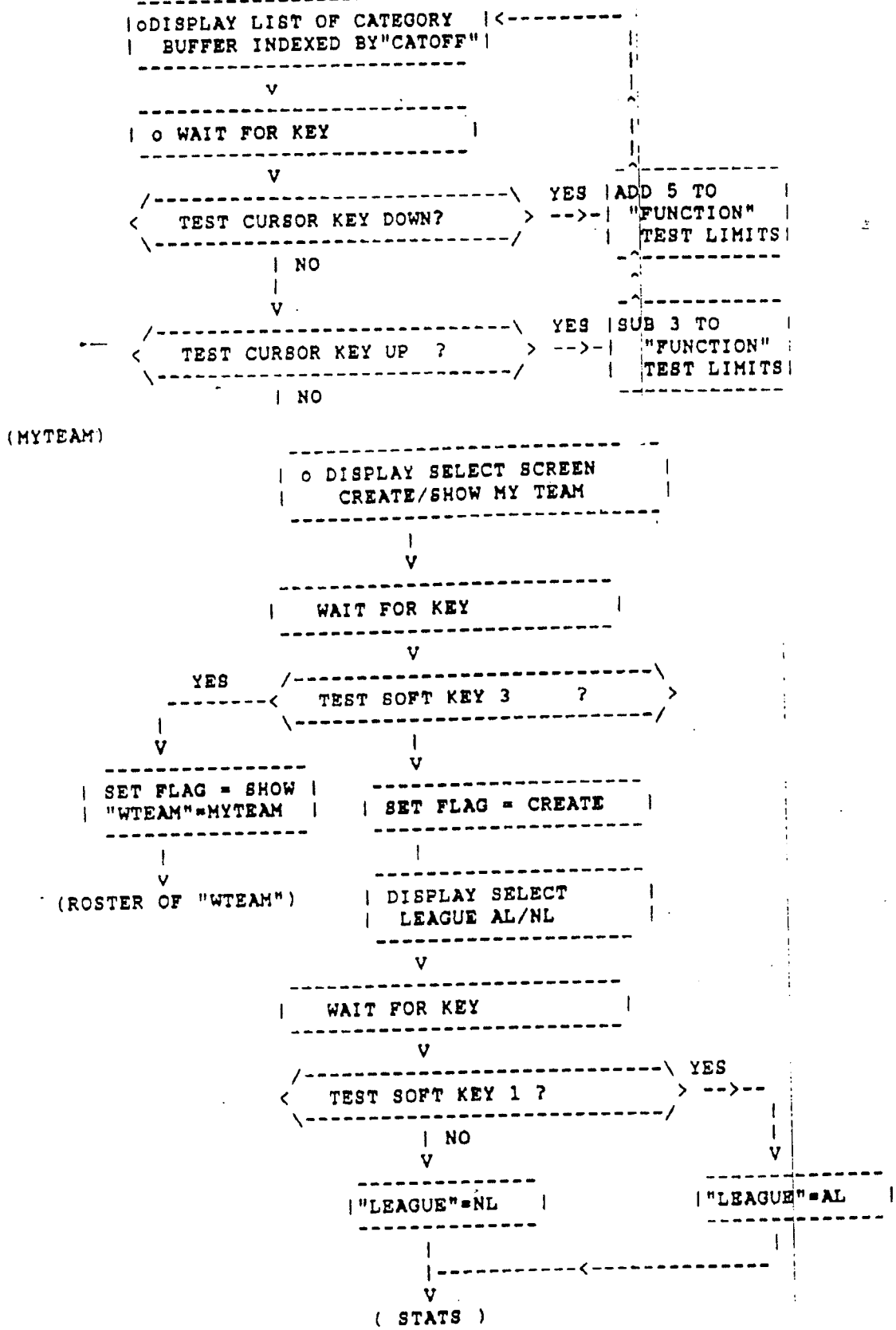

What is claimed is:

1. A method for accessing data comprising the steps of:
   storing a data base in binary form at a central location, the data base being arranged in data groups having addresses;
   connecting one or more telephone lines to the central location;
   modulating and coupling the data base in a prescribed sequence of data groups to one of the telephone lines responsive to a call-up signal;
   sending a call-up signal to one of the telephone lines from a telephone terminal at a remote location, there being resident at the remote location a computer having a memory for storing a data base in data groups at the addresses specified at the central location, each data group of the memory having a flag bit that is alternately in a set or reset state, a screen for selectively displaying the stored data base, a plurality of input controls, and a microprocessor coupled to the telephone terminal and programmed to retrieve from the memory and display on the screen data selected by operation of the input controls;
   setting the flag bit of all the data groups when the call-up signal is sent to the central location by the telephone terminal;
   receiving the data base transmitted from the central location at the telephone terminal when the telephone line is called up;
   demodulating the received data base;
   coupling the demodulated data base from the telephone terminal to the memory of the computer to update the data base stored in the memory one data group at a time by storing such data group at the specified address and resetting the flag bit at such address;
   signaling the end of transmission after all the flag bits have been reset; and
   operating the input controls to access the data stored in the memory of the computer.

2. The method of claim 1 in which the step of coupling the data base to the memory of the computer comprises checking the flag bit at the specified address of each data group and overwriting the data stored at said specified address with the demodulated data group only if the flag bit is set at the time of checking.

3. The method of claim 2 in which the step of coupling the data base to the memory of the computer additionally comprises initiating the signaling step if the flag bit is reset at the time of checking.

4. The method of claim 3 in which the signaling step comprises displaying a visual indication on the screen.

5. The method of claim 3 in which the data groups stored at the central location also have error checks, the method additionally comprising the steps of inspecting the error checks in the microprocessor prior to the coupling step; checking the flag bits of the displayed data groups, and indicating on the screen that a displayed data group is not updated when the flag bit of said displayed data group is set, the coupling step comprising overwriting the data group stored at said specified address with the demodulated data group and resetting the flag bit only when the error checks are verified by the inspection.

6. The method of claim 3 in which the signaling step comprises disconnecting the telephone line from the telephone terminal at the remove location.

7. The method of claim 1 in which the step of coupling the data base to the memory of the computer additionally comprises initiating the signaling step if the flag bit is reset at the time of checking.

8. The method of claim 1 in which the data groups stored at the central location also have error checks, the method additionally comprising the steps of inspecting the error checks in the microprocessor prior to the coupling step; checking the flag bits of the displayed data groups, and indicating on the screen that a displayed data group is not updated when the flat bit of said displayed data group is set, the coupling step comprising overwriting the data group stored at said specified address with the demodulated data group and resetting the flag bit only when the error checks are verified by the inspection.

9. The method of claim 1 in which the setting and resetting steps are software controlled.

10. A method for accessing data comprising the steps of:
    storing a data base in binary form at a central location;
    connecting one or more telephone lines to the central location;
    modulating and coupling the data base in an encoded form to one of the telephone lines responsive to a call-up signal;
    sending a call-up signal to one of the telephone lines from a telephone terminal at a remote location, there being resident at the remote location a computer having a memory for storing a data base, a screen for selectively displaying the stored data base, a plurality of input controls, and a microprocessor with a data input port and an internal clock, the microprocessor being programmed to retrieve from the memory and display on the screen data selected by operation of the input controls;
    receiving the data base transmitted from the central location at the telephone terminal when the telephone line is called up;
    shaping the received data base to be compatible with the data input port of the microprocessor;
    coupling the shaped received data base from the telephone terminal to the microprocessor, the microprocessor being programmed to demodulate and store in the memory the received data base; and
    operating the input controls to access the data stored in the memory of the computer.

11. A method for accessing data comprising the steps of:
    storing a data base in binary form at a central location;
    connecting one or more telephone lines to the central location;
    modulating and coupling the data base to one of the telephone lines responsive to a call-up signal;
    sending a call-up signal to one of the telephone lines from a telephone terminal having a handset with speaker at a remote location, there being also resident at the remote location a computer having a memory for storing a data base, a screen for selectively displaying the stored data base, a plurality of input controls, a microprocessor, the microprocessor being programmed to retrieve from the memory and display on the screen data selected by operation of the input controls, and an acoustic coupler;

placing the acoustic coupler close to the speaker of the handset to receive the data base transmitted from the central location when the telephone line is called up;
connecting the acoustic coupler to the microprocessor, the microprocessor being programmed to store in the memory the received data base; and
operating the input controls to access the data stored in the memory of the computer.

* * * * *